United States Patent [19] [11] Patent Number: 4,783,803
Baker et al. [45] Date of Patent: Nov. 8, 1988

[54] SPEECH RECOGNITION APPARATUS AND METHOD

[75] Inventors: James K. Baker, West Newton; Paul G. Bamberg, Framingham; Mark F. Sidell, Cambridge; Robert S. Roth, Brighton, all of Mass.

[73] Assignee: Dragon Systems, Inc., Newton, Mass.

[21] Appl. No.: 797,249

[22] Filed: Nov. 12, 1985

[51] Int. Cl.⁴ .............................................. G10L 1/00
[52] U.S. Cl. ........................................ 381/42; 381/43
[58] Field of Search .................................. 381/42, 43

[56] References Cited

U.S. PATENT DOCUMENTS

| 4,247,947 | 1/1981 | Miyamoto | 381/43 |
| 4,400,788 | 8/1983 | Myers et al. | 381/43 |
| 4,489,434 | 12/1984 | Moshier | 381/43 |
| 4,559,604 | 12/1985 | Ichikawa et al. | 381/43 |
| 4,587,670 | 5/1986 | Levinson et al. | 381/43 |
| 4,658,425 | 4/1987 | Julstrom | 381/42 |

OTHER PUBLICATIONS

Baker, James K., "Stochastic Modeling for Automatic Speech Understanding", Speech Recognition, edit. D. R. Reddy, pp. 521–542, 1972.
Baker, James K., "A Parallel Architecture for Pattern Analysis," RC 7473, IBM Thomas J. Watson Research Center, Jan. 1979.

Primary Examiner—Patrick R. Salce
Assistant Examiner—Anita M. Ault
Attorney, Agent, or Firm—Edward W. Porter

[57] ABSTRACT

A system is disclosed for recognizing a pattern in a collection of data given a context of one or more other patterns previously identified. Preferably the system is a speech recognition system, the patterns are words and the collection of data is a sequence of acoustic frames. During the processing of each of a plurality of frames, for each word in an active vocabulary, the system updates a likelihood score representing a probability of a match between the word and the frame, combines a language model score based on one or more previously recognized words with that likelihood score, and prunes the word from the active vocabulary if the combined score is below a threshold. A rapid match is made between the frames and each word of an initial vocabulary to determine which words should originally be placed in the active vocabulary. Preferably the system enables an operator to confirm the system's best guess as to the spoken word merely by speaking another word, to indicate that an alternate guess by the system is correct by typing a key associated with that guess, and to indicate that neither the best guess nor the alternate guesses was correct by typing yet another key. The system includes other features, including ones for determining where among the frames to look for the start of speech, and a special hardware processor for computing likelihood scores.

127 Claims, 13 Drawing Sheets

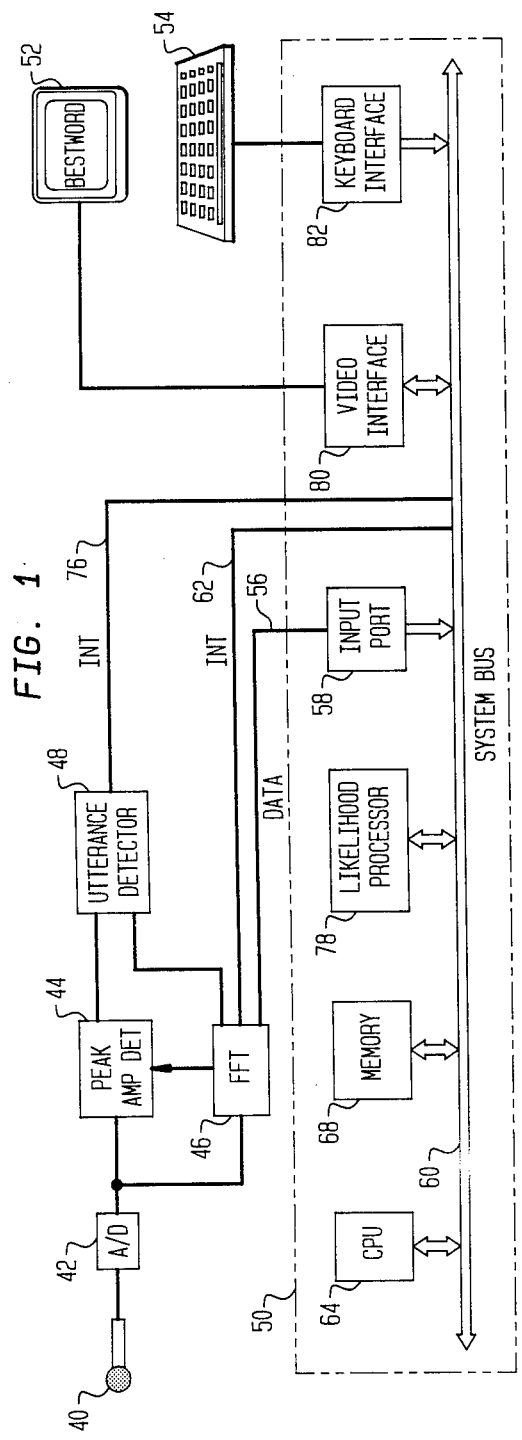
FIG. 1
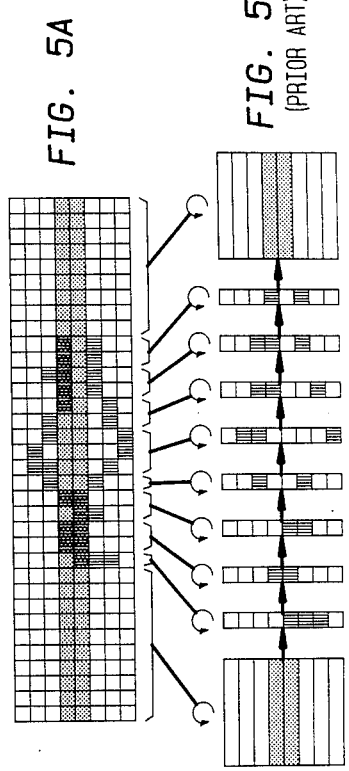
FIG. 5A
FIG. 5B (PRIOR ART)
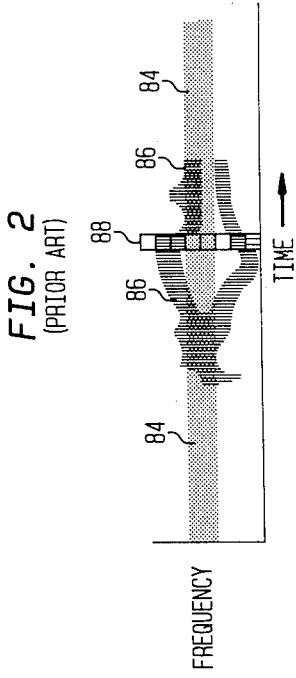
FIG. 2 (PRIOR ART)

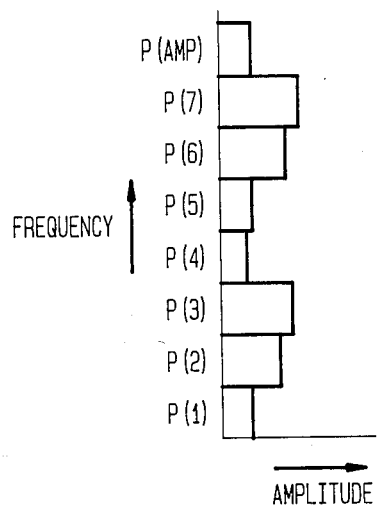
FIG. 3A
(PRIOR ART)
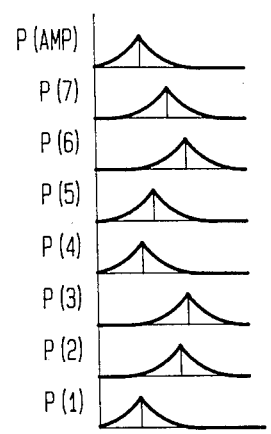
FIG. 3B
(PRIOR ART)
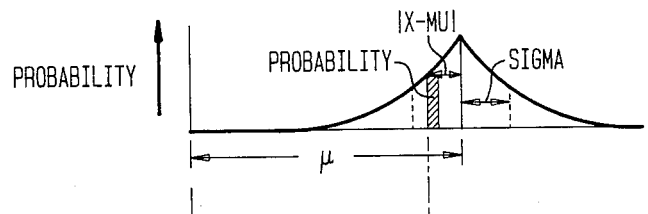
FIG. 4A
(PRIOR ART)
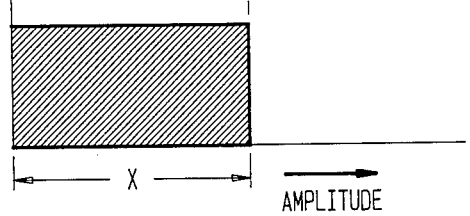
FIG. 4B
(PRIOR ART)
FIG. 6
(PRIOR ART)
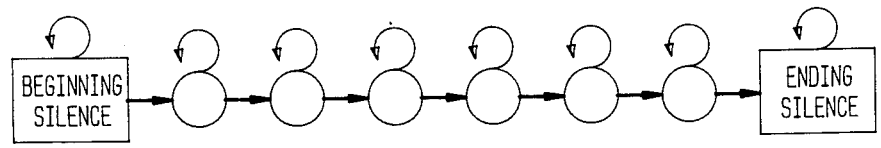

CURRENT WORD CANDIDATE

IF PRESENT NODE IS LAST IN WORD AND ITS SCORE IS BETTER THAN 4th BEST ENDSCORE, ENDSCORE(4th BEST), THEN SCORE ITS NODE SCORE IN PLACE OF ENDSCORE(4th BEST) AND ITS WORD IN PLACE OF BESTWORD(4th BEST) AND SCAN ENDSCORE(1) THROUGH ENDSCORE(4) TO FIND 4th BEST ENDSCORE, ENDSCORE(4th BEST) — 288'

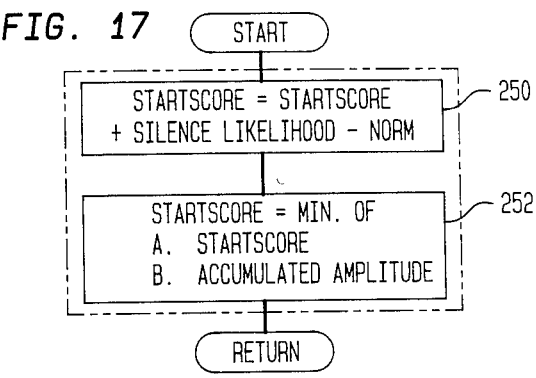

FIG. 17

START

STARTSCORE = STARTSCORE + SILENCE LIKELIHOOD − NORM — 250

STARTSCORE = MIN. OF
A. STARTSCORE
B. ACCUMULATED AMPLITUDE — 252

RETURN

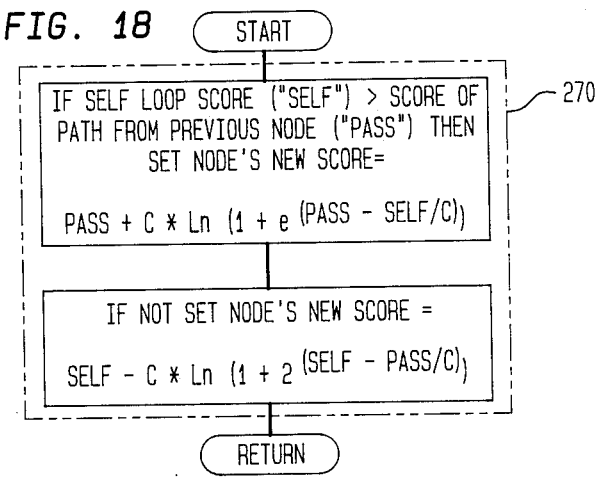

FIG. 18

START

IF SELF LOOP SCORE ("SELF") > SCORE OF PATH FROM PREVIOUS NODE ("PASS") THEN SET NODE'S NEW SCORE=

$PASS + C * Ln (1 + e^{(PASS - SELF/C)})$

IF NOT SET NODE'S NEW SCORE =

$SELF - C * Ln (1 + 2^{(SELF - PASS/C)})$

— 270

RETURN

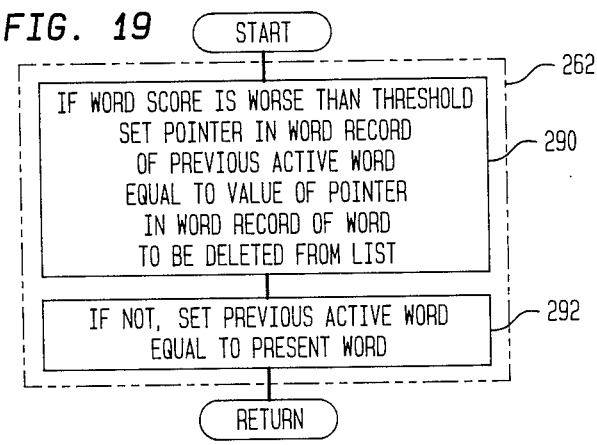

FIG. 19

START

— 262

IF WORD SCORE IS WORSE THAN THRESHOLD
SET POINTER IN WORD RECORD
OF PREVIOUS ACTIVE WORD
EQUAL TO VALUE OF POINTER
IN WORD RECORD OF WORD
TO BE DELETED FROM LIST

— 290

IF NOT, SET PREVIOUS ACTIVE WORD
EQUAL TO PRESENT WORD

— 292

RETURN

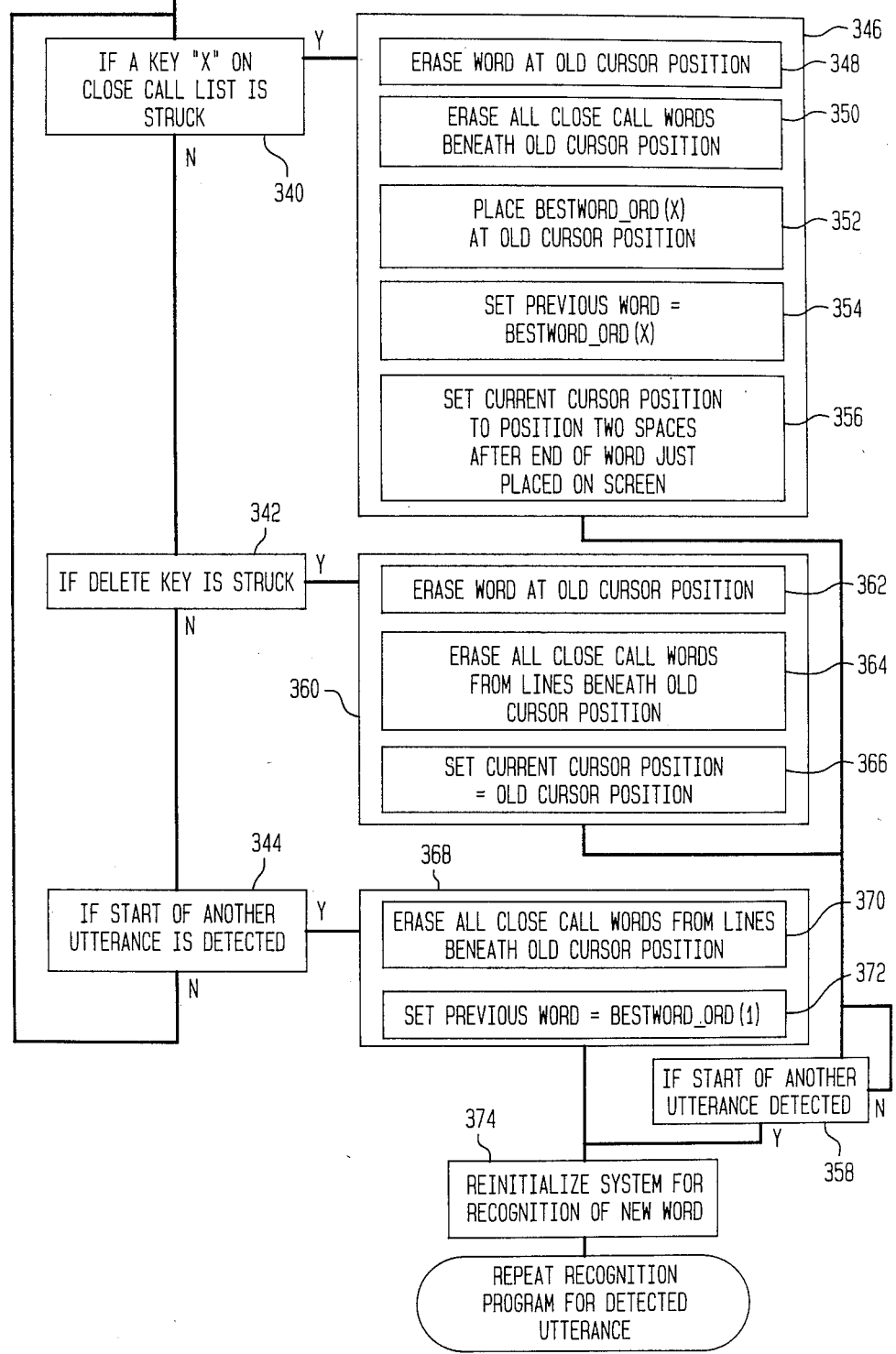

SPEECH RECOGNITION APPARATUS AND METHOD

FIELD OF THE INVENTION

The present invention relates to apparatus and methods for pattern recognition and more particularly, to apparatus and methods for speech recognition in which a sequence of speech sounds are identified as corresponding to a specific word.

BACKGROUND OF THE INVENTION

There has long been a desire to have machines capable of responding to human speech, such as machines capable of obeying human commands and machines capable of transcribing human dictation. Such machines would greatly increase the speed and ease with which humans could communicate with computers, and greatly speed and ease the ability with which humans could record and organize their own words and thoughts.

Due to recent advances in computer technology, as well as recent advances in the development of algorithms for the recognition of speech, speech recognition machines have begun to appear in the past several decades, and have begun to become increasingly more powerful and increasingly less expensive. For example, the assignee of the present application has previously marketed speech recognition software which runs on popular personal computers and which requires little extra hardware except for an inexpensive microphone, an analog-to-digital converter, and a relatively inexpensive microprocessor to perform simple signal processing. This system is capable of providing speaker dependent, discrete word recognition for vocabularies of up to sixty-four words at any one time.

Most present speech recognition systems operate by matching an acoustic description of words in their vocabulary against a representation of the acoustic signal generated by the utterance of the word to be recognized. In many such systems, the acoustic signal generated by the speaking of the word to be recognized is converted by an A/D converter into a digital representation of the successive amplitudes of the audio signal created by the speech. Then that signal is converted into a frequency domain signal which consists of a sequence of frames, each of which gives the amplitude of the speech signal in each of a plurality of frequency bands. Such systems commonly operate by comparing the sequence of frames produced by the utterance to be recognized with a sequence of nodes, or frame models, contained in the acoustic model of each word in their vocabulary.

Originally the performance of such frame matching systems was relatively poor, since the individual sounds which make up a given word are seldom, if ever, spoken at exactly the same relative rate or in exactly the same manner in any two utterances of that word. However, two major techniques have been developed in the prior art which have greatly improved the performance of such systems. The first is probabilistic matching, which determines the likelihood that a given frame of an utterance corresponds to a given node in an acoustic word model. It determines this likelihood not only as a function of how closely the amplitudes of the individual frequency bands of the frame match the expected frequencies contained in the given nodes, but also as a function of how the deviation between the actual and expected amplitudes compares to the expected deviations for such values. Such probabilistic matching gives a recognition system a much greater ability to deal with the variations in speech sound which occur in different utterances of the same word, and a much greater ability to deal with the noise which is commonly present during speech recognition tasks.

The second major technique which greatly improves the performance of such frame matching systems is that of dynamic programming. Stated simply, dynamic programming provides a method to find an optimal or near optimal match between the sequence of frames produced by an utterance and the sequence of nodes contained in the model of a word. It does this by effectively expanding and contracting the duration of each node in the acoustic model of a word to compensate for the natural variations in the durations of speech sounds which occur in different utterances of the same word. A more detailed discussion of the application of dynamic programming to speech recognition is available in J. K. Baker's article entitled "Stochastic Modeling for Automatic Speech Recognition" in the book Speech Recognition edited by D. R. Reddy and published by Academic Press, New York, N.Y., in 1975.

The performance of present speech recognition systems is impressive when compared to the similar systems of a short time ago. For example, the above mentioned system of the assignee of the present application, which runs on popular personal computers, is equal in performance to systems costing several tens of thousands of dollars only five years ago. Nevertheless, there is a great need to improve further the performance of speech recognition systems before they will find the large scale use of which they are ultimately capable. In particular there is a need to provide systems capable of recognizing words from much larger vocabularies than those which can be reliably handled by most present systems.

Unfortunately the performance of present speech recognition systems tends to deteriorate considerably as the size of the vocabulary which they are capable of recognizing at any one time increases. This results from two major factors. First, many speech recognition systems operate by comparing a given spoken utterance against each word in its vocabulary. Since each such comparison can require thousands of computer instructions, the amount of computation required to recognize an utterance grows as does the vocabulary. This increase in computation has been a major problem in the development of large vocabulary systems.

The second major problem in the development of a large vocabulary systems is caused by the fact that as a vocabulary grows, the number of words that are similar in sound also tends to grow. As a result, there is an increased likelihood that an utterance of a given word from the vocabulary will be misrecognized as corresponding to another similar sounding word from the vocabulary.

The prior art has developed a variety of methods for dealing with the excessive computational demands and the increased likelihood of word confusion introduced by large vocabulary recognition. One such method is that of "pruning", a common computer technique used to reduce computation. Generally speaking, pruning involves reducing the number of cases which a program considers, in part or in full, by eliminating from further consideration those cases which, for one reason or another, do not appear to warrant further computation.

For example, in the above mentioned limited vocabulary recognition system of the assignee of the present application, the dynamic programming algorithm produces a score for each word in its active vocabulary after each frame of an utterance. This score corresponds to the likelihood that the frames received so far match the given word. After the score for each word in the active vocabulary is updated, it is compared with the best score produced for any word. If the difference between the score for a given word and the best score exceeds a certain threshold, that given word is removed, or pruned, from the active vocabulary and future frames are no longer compared against it. This technique greatly improves the computational efficiency, since it enables poorly scoring words to be removed from consideration long before all of the frames of an utterance have been processed. As powerful as this technique is, however, there nevertheless is a need to find even more efficient techniques to enable speech recognition systems to operate with large vocabularies.

A technique used to reduce both the computational demands and the likelihood of confusion in large vocabulary systems is that of using a language model. Such language models predict the relative likelihood of the occurrence of each word in the system's vocabulary, given the one or more words which have been spoken previously. Such language models make use of the fact that in human language the likelihood that a given word will be spoken is greatly influenced by the context of the one or more words which precede it. For example, speech recognition systems have been developed which use digram language models. Digrams give, for each word in the vocabulary, the likelihood of the occurrence of that word given the immediately preceding occurrence of any other word in the vocabulary. The values for each digram is usually determined by analyzing a large body of text and determining from that text the number of times that each word in the vocabulary is preceded by each other word in the vocabulary. Some language model systems have even used trigrams, which give for each word in the vocabulary the probability of its occurrence given any combination of two preceding words of the vocabulary.

It has been shown that such digram and trigram language models provide a valuable source of probabilistic information as to the identity of a particular utterance given its context of previous utterances. In one prior art system the probabilistic scores produced by such digram and trigram language models are combined with probabilistic word scores based on the phonemes, or basic speech sounds, which the system has detected by matching phoneme models against the signal produced by utterances. Then words with combined scores better than a certain threshold have their corresponding word model matched against the acoustic frames of the utterance.

Another technique which has been used to reduce the massive computation required in large vocabulary word recognition is that of hypothesis and test, which is, in effect, a type of pruning. Under hypothesis and test, the acoustic signal is observed for the occurence of certain features or patterns, such as the identity of apparent phonemes, as is described in the paragraph above. When such given features or patterns are observed, they are used to form a hypothesis that the word actually spoken corresponds to a subset of words from the original vocabulary which commonly have the observed features. Then the speech recognition system proceeds by performing a more lengthy match of each word in this sub-vocabulary against the acoustic signal.

Another important approach toward dealing with the large computational demands of speech recognition, both in large and small vocabulary system, is the development of special purpose hardware to increase greatly the speed of such processing. In the past, for example, special-purpose processors have been made to perform the probabilistic frame matching, or likelihood, computation described above. Such special purpose likelihood processors have greatly increased the performance of frame matching systems, but most such special purpose processors developed in the past have been quite complicated because of their inclusion of hardware multiplication circuitry to perform likelihood computations at high speeds.

In addition to the problems of increased computational demand and increased chance of word confusion, there are a host of other problems which have been encountered in the prior art of speech recognition. One such problem is that of determining exactly when an utterance has begun. This problem is made more difficult by the fact that in most speaking environments there is background noise. Thus the system must seek to distinguish between background noise and the commencement of speech sounds. One prior art method for attempting to make this distinction is used in the recognition system presently being sold by the assignee of the present application. This system uses a statistically derived acoustic model of background noise. When it hears sounds corresponding to this model it assumes speech has not yet begun. Although the performance of this system is good compared to many other systems, its performance in the presence of changing background sounds still leaves considerable room for improvement. A somewhat similar problem relates to the fact that even if the system has a good method for distinguishing between normal background sounds and speech sounds, it is nevertheless likely to occasionally be falsely triggered into interpreting non-speech sounds as speech. For example, humans often make sounds immediately preceding intended speech by smacking their lips. In addition, brief background sounds can be similar both in volume and spectral characteristics to speech sounds.

One method of dealing with this problem has been presented in the above mentioned system previously marketed by the assignee of the present application. That method involves producing a startscore representing the probability that the actual utterance of a word has not yet begun. When the system detects what it considers to be the start of an utterance, it starts a dynamic programming process. This process matches each successive frame of acoustic data against each word in its active vocabulary. In doing so, it removes from the active vocabulary, after each frame, those words with match scores worse than a certain threshold. If, after starting such a process, the startscore becomes better than a certain threshold, indicating that the previous sounds were a false alarm and that the utterance of a word has not yet begun, the active vocabulary is reinitialized to contain all the words in the system's vocabulary, and the system recommences to perform dynamic programming against the initial nodes of all such words. Although this method improves performance, it is designed for use on a limited vocabulary system in which it is easy to perform dynamic programming against the initial nodes of the system's entire vocabulary. Unfortunately, such a method would not be practical in a large vocabulary system.

Another problem encountered with prior art speech recognition systems, particularly those attempting to deal with relatively large vocabularies, is that recognition performance is far from perfect. For this reason, it is desirable to create methods by which an operator can indicate to the system whether or not its attempted recognition is correct, and if not, by which he can correct the mistake as easily as possible. One such method used in the prior art is for the system to have a word in its vocabulary the utterance of which indicates that the last spoken word is incorrectly recognized and is to be deleted from display on the screen. The user is then free to repeat the intended word again, giving the system another chance to recognize it correctly. Although such a system does greatly improve the ease with which a misrecognized word can be corrected, it fails to take advantage of the fact that in most instances in which the system misrecognizes a word, it actually scores the correct word for the utterance as its second, third, or fourth choice.

Other systems in the prior art have had the system display or repeat back to the user its understanding of the word or words which have been spoken. The system then requires the user to confirm that the word or words recognized are correct, either by saying a word, such as "yes", or by pressing a keyboard key. Such a system does provide a means of confirming that the system's recognition is correct, but it places a considerable burden on the operator by requiring him to confirm the system's recognition attempts even when they are correct.

SUMMARY OF THE INVENTION

It is the object of the invention to provide speech recognition apparatuses and methods which are capable of dealing with relatively large vocabularies in a computationally efficient manner.

More particularly, it is an object of the present invention to provide speech recognition apparatuses and methods which are capable of using language model information in a new manner both to reduce the likelihood of confusion between similar sounding words and to reduce computation.

It is the further object of the present invention to provide speech recognition apparatuses and methods capable of reducing the number of words which undergo an extensive acoustic match against the utterance to be recognized.

It is yet another object of the present invention to provide such speech recognition apparatuses and methods capable of reducing the number of words which undergo an extensive acoustic match against the utterance to be recognized without using the hypothesize and test methods of the type described above.

It is yet another object of the present invention to provide speech recognition apparatuses and methods which are more likely to detect accurately the beginning of the utterance of a word in the presence of background sounds which vary from the background sound for which such aparatuses and methods have an acoustic model. It is still another object of the present invention to provide speech recognition apparatuses and methods which are better able to recognize a word spoken shortly after the occurrence of a relatively loud noise than similar apparatuses and methods in the prior art.

It is yet another object of the present invention to provide speech recognition apparatuses and methods having a likelihood processor which is simpler in construction than many likelihood processors of similar capability in the prior art.

It is a still further object of the present invention to provide speech recognition apparatuses and methods which increase the ease with which an operator can indicate to such apparatuses or methods whether or not their attempted recognition is correct.

It is yet another object of the present invention to provide speech recognition apparatuses and methods which increase the ease with which an operator can correct an erroneous recognition attempt.

According to one aspect of the invention, a pattern recognition system is provided for recognizing an individual pattern in a collection of data, given a context of one or more other patterns which have been previously identified. In a preferred embodiment, the pattern recognition system is a speech recognition system, the individual pattern to be recognized is a word, the collection of data in which the individual pattern occurs is a given utterance, and the context of one or more other patterns which have been previously identified are the one or more words which have been previously spoken. Such a system comprises means for storing a model of the given pattern, such as an acoustic model of the spoken word. It further comprises means for making a pattern match score corresponding to the probability that the given pattern corresponds to the collection of data, including means for making successive partial comparisons between the pattern's model and the data, and for successively updating the pattern match score after each such partial comparison. The system further includes context storing means for storing a context derived from one or more patterns which have been previously identified, such as one or more words spoken prior to the given utterance. In addition, this system contains a context introducing means, including a means for generating a context score for a given pattern. This score corresponds to a context probability estimate of the probability that the given pattern would occur given the context stored in the context storing means. The context introducing means also includes means for separately altering the pattern match score after each of a plurality of the partial comparisons by an amount corresponding to the context score. The system further includes means for stopping the means for making a pattern match score from making further partial comparisons between the model and the data when the pattern match score for that given pattern is worse than a given threshold.

In a speech recognition system the context score is preferably a language score which is partially combined with a likelihood score produced for each successive frame of acoustic data generated by an utterance. In a preferred embodiment the system includes means for altering the match score after each of a given number of partial comparisons, and for causing the total amount by which the context score introducing means alters the pattern match score over all of the given number of partial comparisons to substantially equal the value of the context score. Preferably, the pattern match score is a logarithmic function of the probability that a given pattern corresponds to the collection of data against which it is being matched and the context score is a logarithmic function of the context probability estimate. In such a case, means are provided for adding a fraction of the context score to the pattern match score after each of a plurality of partial comparisons.

In a preferred embodiment, the system is designed to recognize a given collection of data, such as a signal generated by a speech utterance, as being one of a plurality of patterns belonging to an originally active set, or vocabulary, of patterns. Such a system includes means for indicating which patterns belong to a currently active set and for originally placing all the patterns of the originally active set in the currently active set. Such a system includes means for producing, for each pattern in the originally active set, a score of the probability that that pattern occurs in the collection of data. This includes means for making a succession of estimation cycles, in each of which, for each pattern in the currently active set, a partial comparison is made between the model of the pattern and the collection of data, and in each of which the pattern match score for a given pattern is updated in response to its partial comparison. In such a system, means are provided for generating a context score for each pattern for which such a partial comparison is made, and for altering, during each of a plurality of estimation cycles, the pattern match score of each such pattern by an amount corresponding to its context score.

Preferably, in such a system, means are provided for indicating that a given pattern is no longer in the currently active set when the pattern match score for the pattern is worse than a given threshold. Means can be provided for varying the value of such a threshold relative to the pattern match score as a function of changes in the match score generated for one or more other patterns, such as the best match score for all the patterns in the currently active set.

When the pattern recognition system of the present invention is a speech recognition system, it is preferred that it receive acoustic data generated by an utterance as a sequence of frames, each of which includes a vector of parameters indicating acoustic properties of the utterance during a given period of time. In such an embodiment, means are provided for making a succession of estimation cycles, each corresponding to one of such frames.

Preferably the means for producing word match scores includes dynamic programming means for seeking an optimal match between a succession of frames and the nodes of each word model in the originally active vocabulary. Such a system makes for each active node, in the acoustic model of each currently active word, during each estimation cycle, a comparison between that node and the frame for which the estimation cycle is being performed. The dynamic programming means also provides each active node with a score corresponding to the probability of one or more dynamic programming paths reaching that node. In such a system the best node score for a given word is selected as the word match score for that word. Preferably means are provided for storing for each active node in the currently active vocabulary, a word start value which indicates at what frame, according to an optimal dynamic programming path associated with that node, the utterance of the word began. This word start value is used during each estimation cycle to determine whether or not its associated node should have a language score combined with it, so that language scores are only added during a specified number of frames at the start of each optimal path through a word model.

According to another aspect of the present invention, a speech recognition system is provided which includes means for making, for each word in an initial vocabulary, a relatively rapid scoring of the likelihood that that word corresponds to the current utterance. The system further includes means for placing a word from the initial vocabulary into an originally active vocabulary when the rapid match score produced for the word is better than a given threshold. In addition, the system includes means for making, for each word in the originally active vocabulary, a more lengthy scoring of the likelihood that the word corresponds to the sequence of acoustic data.

In such a speech recognition system, it is preferred that both the means for making a rapid scoring and the means for making a lengthy scoring include means for calculating an acoustic likelihood score indicating the closeness of a match between an acoustic model of a given word and the sequence of acoustic data generated by an utterance. It is also preferred that both these means include means for calculating the scores for a given word based in part on a language score which corresponds to a probability estimate that the given word would occur in a language context derived from one or more previous words.

Preferably the system includes means for storing acoustic data generated by the utterance as a sequence of frames of the type described above. In such a system it is preferred that the rapid scoring means make a scoring based on an acoustic match with a number of frames which is less than the number of frames which normally occur during the utterance of a majority of words in the initial vocabulary. Preferably this is done by averaging corresponding acoustic parameters in a plurality of such frames and for comparing the closeness of the resulting set of averaged parameters with a corresponding set of averaged parameters associated with each word in the initial vocabulary. Such averaging and matching can be separately performed for each of a plurality of overlapping sequences of frames.

Preferably, the means for making a rapid scoring makes a scoring for each word in the initial vocabulary one word at a time. On the other hand, it is preferred that the means for making a lengthy scoring makes a succession of estimation cycles in which, a partial comparison is made between each word in an active vocabulary and a successive portion of acoustic data generated by the utterance. Thus in effect, the lengthy scoring means scores words in parallel. This enables words whose scores deviate from the best scoring word by more than a threshold amount to be pruned from the active vocabulary while the lengthy scoring is proceeding.

According to another aspect of the present invention, a speech recognition system is provided which includes means for storing an initial vocabulary of words. The system further includes means for performing an initial computation on a sequence of acoustic data frames generated by an utterance and for producing an originally active vocabulary containing those words from the initial vocabulary determined by the initial computations to be likely to correspond to the data frames. The system also includes means for remembering the words contained in the originally active vocabulary, and means for indicating which words in the originally active vocabulary remain in a currently active vocabulary. The system has means for making a word match score of the likelihood that each word in the originally active vocabulary corresponds to the acoustic data frames. This includes means for making an estimation cycle for each successive data frame in which a comparison is made between each successive word in the currently active vocabulary and the frame, and in which the word match score for each word is updated in response to the comparison. The system includes means for indicating that a word is no longer in the currently active vocabulary when the word match score for it becomes worse than a given threshold. The system also includes means for producing a start score corresponding to the probability that an acoustic data frame precedes the beginning of the utterance of a word to be recognized, and means for resetting the currently active vocabulary to include all the words remembered as belonging to the originally active vocabulary when the start score is better than a given threshold.

In such a system it is preferred that all the words in the currently active vocabulary be kept as a linked list, that a given word be indicated as no longer in the currently active vocabulary by unlinking it from the linked list, and that the currently active vocabulary be reset by causing all the words in the originally active vocabulary to be relinked into the linked list. It is further preferred that the initial vocabulary be represented as a list of word records, each of which has a means for storing a pointer to another word record in the list. In such a system the currently active vocabulary is originally created by causing pointers in the word records associated with each word in the originally active vocabulary to point to the word record of the next word in the originally active vocabulary. According to still another aspect of the present invention, a speech recognition system is provided which includes means for storing an acoustic model of an expected background noise, and means for comprising that acoustic model with successive portions of acoustic data. This comparison is used for producing a silence score which corresponds to the probability that such successive portions of the data correspond to background noise, and thus that an utterance has not yet begun in such a data portion. The system further includes means for determining from successive portions of acoustic data the acoustic amplitude of those portions, and for producing an accumulated sound score which corresponds to a sum of such amplitude over successive portions of acoustic data. As a result, the accumulated sound score corresponds inversely to the probability that an utterance has not yet begun. The system further includes means responsive to both the silence score and the accumulated sound score for determining during which successive portion of data to look for the start of an utterance.

Preferably such a system includes means for selecting, during each successive portion of data, the score, from among the silence score and the accumulated sound score, which indicates with the greatest probability that an utterance has not yet begun. Such a system further includes means for comparing the selected score with a threshold during each successive portion of data, and for causing the speech recognition system to look for the start of an utterance when that score is better than a given threshold. It is preferred that the means for producing an accumulated sound score include means for accumulating the amount by which the acoustic amplitude exceeds an amplitude threshold during each of successive portions of data.

According to another aspect of the present invention, a likelihood processor for use in speech recognition systems is provided. The processor is designed for computing a score corresponding to the probabilistic match between a vector of parameters associated with a frame of acoustic data and a node model having for each parameter in such a vector both an expected value and a weighting value corresponding to the expected deviation from such an expected value. The likelihood processor comprises parameter supplying means for supplying a digital value corresponding to a given parameter of a given frame of data. The system further includes expected value supply means for supplying a digital value corresponding to the expected value for a given parameter according to a given node model. The system has a first hardware means, receiving inputs from both the parameter supply means and the expected value supplying means, for computing the absolute value of the difference between the two inputs and for producing that absolute value as a digital output. The system further includes weighting value supply means for supplying a digital weighting value corresponding to the expected deviation from the expected value for a given parameter according to a given node model. Memory means are provided which receive addressing inputs from both the output of the first hardware means and the weighting value supplying means. The memory means stores at each of a plurality of addresses formed by combining the two addressing inputs a parameter match score corresponding to the probability that the given parameter value corresponds to the expected value, considering the weighting value. The memory means produces that score as a digital output. The system further includes a hardware adder having two inputs for receiving digital values and an output at which it produces a digital value corresponding to the sum of the values supplied to its input.

Means are provided for connecting the output of the memory means to one input of the adder, and a latch means is connected to the output of the adder for latching the value produced at its output. Means are provided for supplying the value latched by the latch means to one of the inputs of the adder so that the hardware adder can produce a running total of the parameter match scores produced for the comparison of a given frame against a given node model.

Preferably, the first hardware means of such a likelihood processor includes means for limiting the numerical value of its output to a range which is less than that of the absolute values made possible by the range of its input, so that the memory space required in the memory means corresponding to the address space formed by combining the output of the hardware means and the weighting value is reduced. In particular, it is preferred that the means for limiting the numerical value of the output of the first hardware means includes means for causing the numerical value of that output to be equal to a value at the high end of its limited range when the actual absolute value of the difference between the inputs of the hardware means exceeds that limited range. Furthermore, it is preferred that the memory means of the likelihood processor store at each of its addresses a parameter match score which corresponds to the sum of two separate portions, a first portion which corresponds to the product of the output of the first hardware means and the digital weighting value and a second portion which corresponds to the logarithm of the weighting value.

According to yet another aspect of the present invention, a speech recognition system is provided for recognizing a sequence of separately spoken words. The system comprises means for responding to a given utterance by producing a best guess word, which is the word considered by the system most likely to correspond to the utterance, and means for responding to the utterance of another word as confirmation that the best guess word is, in fact, the word corresponding to the utterance.

In one embodiment the system includes means for detecting an utterance and means for responding to any detection of another utterance by that means as confirmation that the best guess word is the word corresponding to the given utterance. Preferably the system includes means for displaying the best guess word so that the user can see it before determing whether to utter another word. In addition, it is preferred that the system include means for producing, in response to a given utterance, one or more close call words which are considered by the system next most likely to correspond to the given utterance after the best guess word. In such a system means are provided for displaying the one or more close call word and for responding to an input signal associated with a given close call word as confirmation that given close call word is the word corresponding to a given utterance. In such a system it is best if the means for displaying the one or more close call words indicate which input signal is to be associated with a given close call word, for example, by indicating which key of the keyboard is to be used to produce the input signal used to select a given close call word.

In such a system it is further preferred that means be provided for responding to an input signal, such as a delete key, associated with the rejection of both the best guess word and the one or more close call words, as confirmation that neither the best guess word nor any of the close call words is the word corresponding to the given utterance. In such a system, it is preferred that, when such a reject signal is generated, the display of both the best guess word and the close call words be removed.

In such a speech recognition systems in which a language model is being used, it is preferred that means be provided so that, when a best guess word or one of the close call words is confirmed as the word associated with a given utterance, the language model be so informed, enabling it to adjust its language context accordingly.

As is made clear in the claims of this application the present invention covers the novel methods of operation implicit in its apparatus described above.

DESCRIPTION OF THE DRAWINGS

These and other aspects of the present invention will become more clear upon reading the following description of the preferred embodiments in conjunction with the accompanying drawings, in which:

FIG. 1 is a schematic block diagram of the hardware used in a preferred embodiment of a speech recognition system according to the present invention;

FIG. 2 is a schematic representation of a spectrogram of the acoustical signal produced by a speech utterance, showing the acoustic data in one brief period of time converted into an acoustic frame which represents the amplitude in each of eight different frequency bands;

FIG. 3a is a graphical representation of such a frame of acoustic data, illustrating the eight different amplitude parameters which comprise such a frame;

FIG. 3b is a schematic representation of a probabilistic node model which has, for each of the eight frame parameters shown in FIG. 3a, a peak at the most expected value for its corresponding frame parameter and a probability distribution around that central peak determined by the expected deviation from that expected value;

FIG. 4a shows a more detailed view of the probability distribution associated with a node model of the type shown in FIG. 3b;

FIG. 4b is a graphic representation of a frame parameter value shown for comparison with the probability distribution in FIG. 4a;

FIG. 5a is a schematic representation of the acoustic signal of FIG. 2 after being converted into a sequence of frames of the type shown in FIG. 3a;

FIG. 5b is a schematic representation of a word model comprised of a sequence of acoustic nodes of the type shown in FIG. 3b, and, together, FIGS. 5a and 5b shows how, through dynamic programming, the sequence of nodes in the word model 5b can be optimally matched against the sequence of frames shown in FIG. 5a;

FIG. 6 is an abstract representation of a node model of the type shown in FIG. 5b;

FIG. 17 is an expanded block diagram of the computational structure contained in the block labeled "UPDATE START SCORE BASED ON SILENCE LIKELIHOOD & ACCUM. APLITUDE" in FIG. 8.

FIG. 18 is an expanded block diagram of the computational structure contained in the block labeled "SET NODE'S NEW SCORE TO PROBABILISTIC COMBINATION OF SELF-LOOP SCORE AND SCORE OF PATH FROM PREVIOUS NODE" contained in FIG. 8.

FIG. 19 is an expanded block diagram of the computational structure contained in the block labeled "IF WORDSCORE WORSE THAN THRESHOLD REMOVE WORD FROM CURRENTLY ACTIVE VOCABULARY" in FIG. 8;

FIG. 25a & FIG. 25b are schematic block diagrams illustrating the computational structure of the embodiment of the invention the output of which is shown in FIGS. 20 through 23, which computational structure is used in place of that shown in FIG. 8 in the block labeled "IF NO WORD LEFT IN CURRENTLY ACTIVE VOCAB. TO COMPLETE WITH BESTWORD, SET PREVIUS WORD=BESTWORD AND EXIT WITH BESTWORD AS RECOGNIZED WORD;"

DETAILED DESCRIPTION OF PREFERRED EMBODIMENTS OF THE INVENTION

Figure 7:
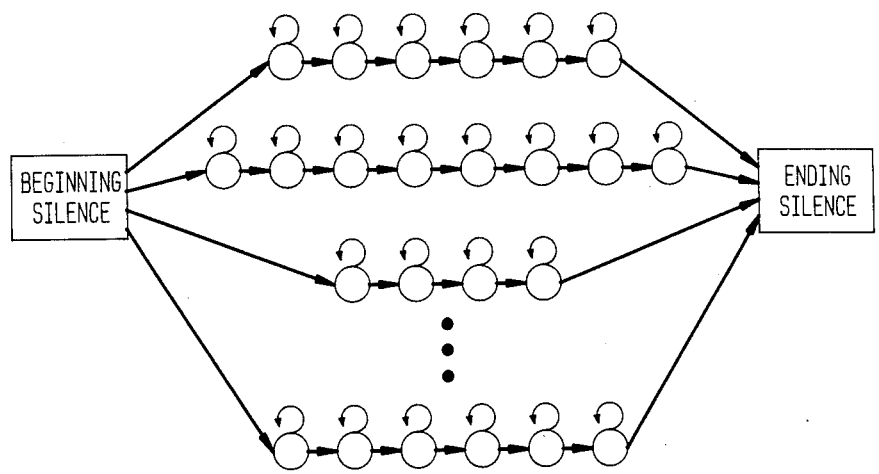
FIG. 7 is a schematic representation of how a group of node models of the type shown in FIG. 6 can be combined into a vocabulary network for use with dynamic programming which seeks to find the path between the beginning and ending silences of that network which provides an optimal match against the frames of an utterance to be recognized.

Referring now to FIG. 1, a schematic block diagram is shown of the hardware used according to a preferred embodiment of the invention. This hardware includes means for detecting the utterance of a spoken word and for converting that utterance into digital signals to which a computer can respond. These means include a microphone 40, an A/D converter 42, a peak-amplitude detector 44, a fast-fourier-transform (or "FFT") circuit 46, and an utterance detector 48. The signals produced by these means are supplied to a programmable computer, such as, for example, an IBM PC-AT computer. The computer is provided with a video monitor 52 to display words recognized by it, and a keyboard 54, to enable an operator to communicate with the computer by means other than voice. The monitor 52, the keyboard 54, and their respective interfaces, 80 and 82, to the computer 50, can be of a type commonly used with personal computers.

The output of the microphone 40 is connected to the input of the A/D converter 42. The A/D converter converts the analog signal produced by the microphone 40 into a sequence of digital values representing the amplitude of the signal produced by the microphone 40 at a sequence of evenly spaced times. For purposes of the present invention, it is sufficient if the A/D converter 42 is a fourteen-bit converter with a sampling rate of 6000 hertz. The output of the A/D converter 42 is supplied to the inputs of the peak-amplitude detector 44 and the FFT circuit 46.

FFT circuitry is well known in the art of digital signal processing. Such circuitry converts a time domain signal, which gives the amplitude of a given signal over a succession of times, into a frequency domain signal, which gives the amplitudes of the given signal at each of a plurality of frequency bands during each of a succession of time periods. In the preferred embodiment, the FFT circuit 46 converts the output of the A/D converter 42 into a sequence of frames, each of which indicates the amplitude of the signal supplied by the A/D converter in each of eight different frequency bands. In the preferred embodiment FFT circuit 46 produces one such frame every 50th of a second.

As is well known in the art of digital signal processing, the output of FFT circuitry is generally improved if it includes means for properly windowing the sequence of amplitude values which is fed to it for the calculation of each frame. Such windowing tapers values near the beginning and end of the sequence used for the computation of a given frame, thus reducing the effect of discontinuities at the boundaries of the sample period upon the Fourier transform produced by the FFT circuit. In the preferred embodiment the FFT circuit 46 uses a type of windowing function known i the art as a Hanning window.

The FFT circuit 46 produces a vector of values corresponding to the energy amplitude in each of eight frequency bands. The FFT circuitry 46 converts each of these eight energy amplitude values into an eight-bit logarithmic value. This reduces subsequent computation since the eight-bit logarithmic values are more simple to perform calculations on than the longer linear energy amplitude values produced by the fast fourier transform, but represent the same dynamic range. Ways for providing logarithmic conversions are well known in the art, one of the simplest being to use a look-up table in memory.

The FFT circuit 46 modifies its output in another manner. This second modification is made to simplify computations based on the amplitude of a given frame. It makes this modification by replacing the logarithm of the amplitude of the highest frequency band of a frame with the average of the logarithms of the amplitudes for all eight bands. Then it normalizes the logarithmic values in each of the other seven frequency bands by subtracting from each of them this average of the logarithms of the amplitudes of all eight bands. This stores just as much information as having an amplitude logarithm for each of the eight frequency bands, but it makes it easier for subsequent computations to quickly determine to average amplitude of all eight bands.

The FFT circuit 46 produces an output of one frame every fiftieth of a second. This output is supplied through a data line 56 to an input port 58 to the system bus 60 of the computer 50. The FFT circuit 46 also supplies an interrupt signal on an output line 62 which is connected through the system bus 60 to the CPU 64 of the computer 50. In response to the interrupt produced by the FFT circuitry, CPU 64 reads the data provided on line 56 for each successive frame and stores it in a random access memory 68. The FFT circuitry 46 also supplies frame clock signals to the peak amplitude detector 44 and the utterance detector 48.

The peak-amplitude detector 44 includes circuitry of a type well known to those skilled in the digital arts, for storing the highest amplitude value produced by the output of the A/D converter 42 during each frame time indicated by the frame clock signal from the FFT circuit 46.

Figure 10:
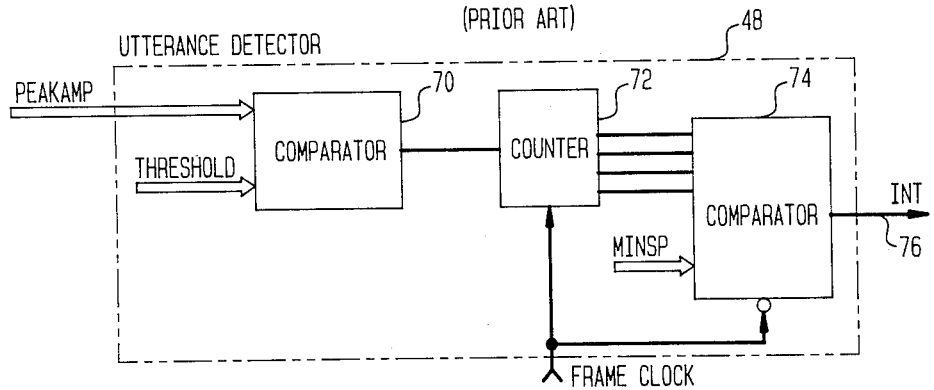
FIG. 10 is a schematic block diagram of the utterance detector shown in FIGS. 1 and 8.

As is shown in FIG. 10, the utterance detector 48 includes a comparator 70 for comparing the peak amplitude of the output of and A/D converter 42 during a given frame, as determined by the peak-amplitude detector 44, with a pre-determined threshold value supplied to a second input of that comparator. In the preferred embodiment this threshold is set to a value approximately four times higher than that associated with normal background sound according to the systems silence model, described below. It is set to this value by computer 50 over lines which are not shown in the figures. During any frame period in which the peak amplitude exceeds the given threshold, the output of the comparator 70 produces a high value.

This output is supplied to the input of a counter 72, which is reset to zero after the initial detection of each utterance by the computer 50 over a line not shown in the drawings. In a preferred embodiment circuitry may also be provided to reset counter 72 if the number of successive frames which have a peak amplitude below the threshold supplied to comparator 70 exceeds a given number of frames, such as fifteen. During every frame clock pulse from the FFT circuit the counter 72 is incremented by one if the output of the comparator 70 indicates that the peak amplitude for that frame period exceeds the threshold.

The current count value of the counter 72 is provided as one input to a second comparator 74. The other input of comparator 74 is set to MINSP, which, in the preferred embodiment equals 3. As soon as the count of counter 72 exceeds the value of MINSP the output of the comparator 74 goes high, generating an interrupt signal, which is supplied over an interrupt line 76, through the system bus 60, to the CPU 64. This interrupt tells the CPU that the utterance detector 48 has detected what appears to be the beginning of an utterance.

The computer 50 can be any one of a great number of types of computer, since most general purpose computers can be programmed to function in a similar manner, provided they have sufficient memory and sufficient computational power. All the hardware contained within the computer 50 is standard, with the exception of the likelihood processor 78. It is a special-purpose processor designed to do the likelihood computation which is described in greater detail below. This likelihood computation involves the most intensive computation used in the present invention, and thus the performance of the system is greatly improved by providing special-purpose hardware to increase the speed of that computation.

As will be clear to those skilled in the computer arts the decision as to what computational elements of the present invention should be performed with special-purpose hardware and which should be performed in software will depend upon the exact function and market which the system is designed to fill, and that decision will vary over time as the size, capability, and cost of hardware change. Thus for example, it should be understood that a high percent of the computational tasks performed by the present invention could be performed in special-purpose hardware, as well as in software, and that many of the tasks which are performed in hardware in the preferred embodiment described here could be performed in software, if desired.

Before explaining the actual computational structure of a preferred embodiment of the present invention, a brief description will be made, by reference to FIGS. 2 through 7, of the frame-based dynamic programming technique upon which the preferred embodiment of the present invention is built.

FIG. 2 is a schematic representation of a spectrogram of the sound associated with a hypothetical utterance. It plots frequency on a vertical axis and time on a horizontal axis, and it represents sound amplitude by intensity. The spectrogram shows a relatively weak background noise, indicated by the band of spectral energy labeled with the numeral 84, and the generally more intense sounds associated with speech, as indicated by the numeral 86.

As is described above, the FFT circuit 46 converts the sound occurring in a given twenty millisecond period into a frame which indicates the energy amplitude in each of eight spectral bands during that period. Such a frame is indicated schematically by the numeral 88. This frame is represented in FIG. 3a as a vector of eight amplitude parameters. As is described above, each of the eight parameters actually corresponds to a logarithm of its corresponding energy amplitude value. As was also described above, the top most of these parameters, P(amp), represents the average of the logarithms of the amplitudes in all eight frequency bands, and the logarithmic amplitude values P(1) through P(7) have been normalized by having this average, P(amp), subtracted from them.

In the probabilistic frame matching method used in the preferred embodiment of the present invention, each frame produced by an utterance is matched against a succession of frame-like nodes contained in the model of each word of an active vocabulary. Each node has a separate probability distribution associated with each of the eight parameters of a frame. This is illustrated in FIG. 3b. In FIG. 4a, the probability distribution associated with a given parameter (P3) is shown in greater detail. Each of the probability distributions associated with a given parameter has a mean value, mu, which indicates a statistically derived expectation of the most probable value for the corresponding frame parameter during a given utterance of that node. In addition, each node contains for each frame parameter a [sigma], which is a statistically derived indication of the likely deviation of the value of that given frame parameter from the expected value, mu, during the utterance of the node.

The [mu] and [sigma] for each parameter of each node in a word model can be derived by statistical techniques. For example a plurality of utterances of a given word can be divided into a plurality of nodes by a human listener playing back a recording of each word at a slow pace. Then the value of [mu] and [sigma] can be calculated for each node by standard statistical techniques. Although this method yields good results, it is very time consuming. Fortunately, more efficient automatic method of deriving node models has been developed in the prior art.

One such method for automatically obtaining the nodes of a word model uses dynamic programming similar to the dynamic programming used in this invention for the lengthy acoustic match 106 described in greater detail below. Given a network such as the word model illustrated in FIG. 6 and a "cost" function that measures the similarity between any node and any frame of acoustic data, it is well known to those skilled in the art of dynamic programming how to find the minimum cost path through the network for any training utterance. Given a current set of models for the nodes in a word, the negative logarithm of the Laplacian probability density, described below, may be used as the cost function. Once the minimum cost path for a given set of models has been found, a program may trace that path to find which frames are associated with each node on this minimum cost path. After such a minimum cost path has been found for a collection of training instances for a given word, a new model for each node may be made by estimating [mu] and [sigma] for each parameter from the set of frames associated with the node using techniques well known to those skilled in the art of statistics. This procedure thus uses a current model for a word and a collection of training instances of that word to obtain a new model for that word.

To start the iterative training process it is necessary to create an initial word model for the first iteration. Such an initial word model can be created by a simple linear segmentation of the training instances of the given word. The set of frames for each instance of the word is divided into successive segments, where there is one segment for each node in the word model. The segments for each instance of the word are all the same duration to within the limitations of integer division. This segmentation produces a set of frames associated with each node of the word. Given the set of frames associated with a given node, an initial model of that given node may be created by estimating the [mu], or average value, and the [sigma], or expected diviation, of each frame parameter over that set of frames by techniques well known to those skilled in the statistical arts.

By using the training procedure described above repeatedly on a fixed collection of training instances of a given word, it is possible to obtain a sequence of successive models for the word. Each iteration of the training procedure proceduces a word model which better describes the training data then the model from the previous iteration. The training iterations continue until the model has converged to a locally optimal model of the training data.

According to the preferred embodiment of the invention, the probability model for a given frame parameter for a given node is provided by the Laplacian probability model $$P(x) = \frac{1}{2*[sigma]} * e^{(-|x-[mu]|/[sigma])}$$

where x is the actual value of the frame parameter. This function is normalized so that its probability over all values of x equals 1. It has a slope which is somewhat similar to that indicated in FIGS. 3b and 4a. As is shown by the combination of FIGS. 4a and 4b, the probability that a given frame parameter corresponds to the corresponding probability distribution for a given node is determined by the absolute value of the difference between the value of that parameter and the value of the expected mean for that parameter, given the shape of the probability distributor determined by the expected deviation for that parameter. In the preferred embodiment this probability corresponds to an area under the distribution curve having a fixed width and height equal to the height of the distribution curve at the value of the frame parameter.

Since matching a frame against a given node involves matching each of its eight parameters against a corresponding one of the node's eight probability distributions, the probability that the frame corresponds to the node can be considered equal to the product of the probabilities that each of the frame parameters matches its corresponding node probability distribution. This assumption is correct if each of the eight frame parameters is probabilistically independent of the others. Although this is not strictly true, it has been empirically found that such multiplication of probabilities yields acceptable speech recognition results.

It has also been found that the computational demand of likelihood computations can be greatly reduced if such computations are made in terms of the logarithms of the probabilities involved rather than in terms of the probabilities themselves. This is for two major reasons. First, the use of logarithms avoids the need to make the exponential calculation in the above listed Laplacian probability equation. Secondly, the multiplication of values can be represented by the addition of their logarithms. Thus instead of multiplying the probabilities of the match of each frame parameter and its corresponding node probability distribution, the logarithms of the probabilities of such matches are added to create a score equal to the logarithm of the probability of the match for the entire frame. This results in substantial computational savings because addition is usually much simpler than multiplication.

As was stated above, the Laplacian probability distributions of the type used in the nodes of the preferred embodiment are normalized to integrate to one over all possible values for a given frame parameter. This means that the probability for any given frame parameter, which corresponds to an area under the curve of the Laplacian probability distribution, is a value between zero and one, and that the logarithm of such a probability is a negative number. The architects of the preferred embodiment decided, as a matter of design choice, to avoid the use of such negative values to represent likelihood scores. Thus they decided to represent such likelihoods in terms of the negative of the logarithms of such Laplacian probabilities. It follows from the above stated formula for the Laplacian probability distribution that the negative logarithm of such a probability is as follows:

$$-\ln P(x) = \frac{|x - [mu]|}{[sigma]} + \ln[sigma] + \text{constant}$$

The value $-\ln P(x)$ is multiplied by 8 in the preferred embodiment to make better use of the limited numerical range of the 8-bit integer arithmetic used in most of the embodiments computations This value of $-\ln P(x)$ is used as the parameter match score associated with the matching of a given parameter with the corresponding probability distribution of a node. The sum of all eight parameter match scores associated with a given frame and given node is used as the likelihood score of a match between that frame and node.

Referring now to FIGS. 5a and 5b, as has been stated above, dynamic programming seeks an optimally scoring match between a sequence of frames, as is shown in FIG. 5a, and a sequence of nodes which make up a given word model, as is represented schematically in FIG. 5b. Many different methods of dynamic programming exist in the prior art, and many such different methods can be utilized with the present invention. For example, some such methods try to find and score a single optimal time alignment, of the type indicated by the combination of FIGS 5a and 5b, between a sequence of successive frames and the nodes of a word model. Other dynamic programming methods, however, such as that used in the preferred embodiment of the present invention, produce a score which corresponds to the sum of the probabilities of many or all such time alignments.

In particular, the dynamic programing used in the preferred embodiment of the present invention associates a node score with each active node during each frame. This node score corresponds to the sum of the probabilities of all dynamic programming paths which place the current frame in the given node. In other words, the node score corresponds to the total probability of all time alignments between the frames processed so far and the word model which align one or more successive frames with each successive node of the word model and which aligns the current frame with the given node. In this method, the node score is recalculated for each active node during the computation for each frame. The recalculated node score corresponds to the sum of the probabilities represented by a pass score and a self-loop score. The pass score represents the probability of all time alignments which place the previous frame in the previous node of the word model, but which place the current frame in the current node. The self-loop score represents the probability of all time alignments which place both the previous frame and the current frame in the current node. A pass score corresponds to the probability of a transition represented by a horizontal arrow in FIGS. 5a, 6 and 7 occurring immediately before a given frame. A self-loop score corresponds to the probability of a given transition represented by a looping arrow shown in those figures occurring immediately before a given frame.

FIG. 6 is a more abstract representation of the word model of FIG. 5b, showing that each word model starts with a beginning silence, has a sequence of speech sound nodes, and ends with an ending silence. Like the speech sound nodes, the beginning and ending silence nodes, are represented by a vector of probability distributions similar to that shown in FIG. 3b. In fact, both the silence nodes are represented by the same vector of probability distributions, that of a silence model which models background noise, such as the background noise 84 shown in FIG. 2. This enables the system to better distinguish between speech sounds and background sounds.

FIG. 7 represents how a vocabulary can be represented as a network of paths between a beginning silence and an ending silence, with each of the paths comprised of the nodes associated with a given word model. The goal of the dynamic programming algorithm used in the preferred embodiment of the present invention is to find the best scoring word model between the beginning silence node and the ending silence node.

Since all of the word models in the vocabulary are connected to the same beginning and ending silence nodes it would be wasted to store such silence nodes separately for each word model of the vocabulary. For this reason the beginning and ending silence are represented by a single silence node, and the word-models stored for each word consist only of nodes which represent speech sounds.

Figure 8:
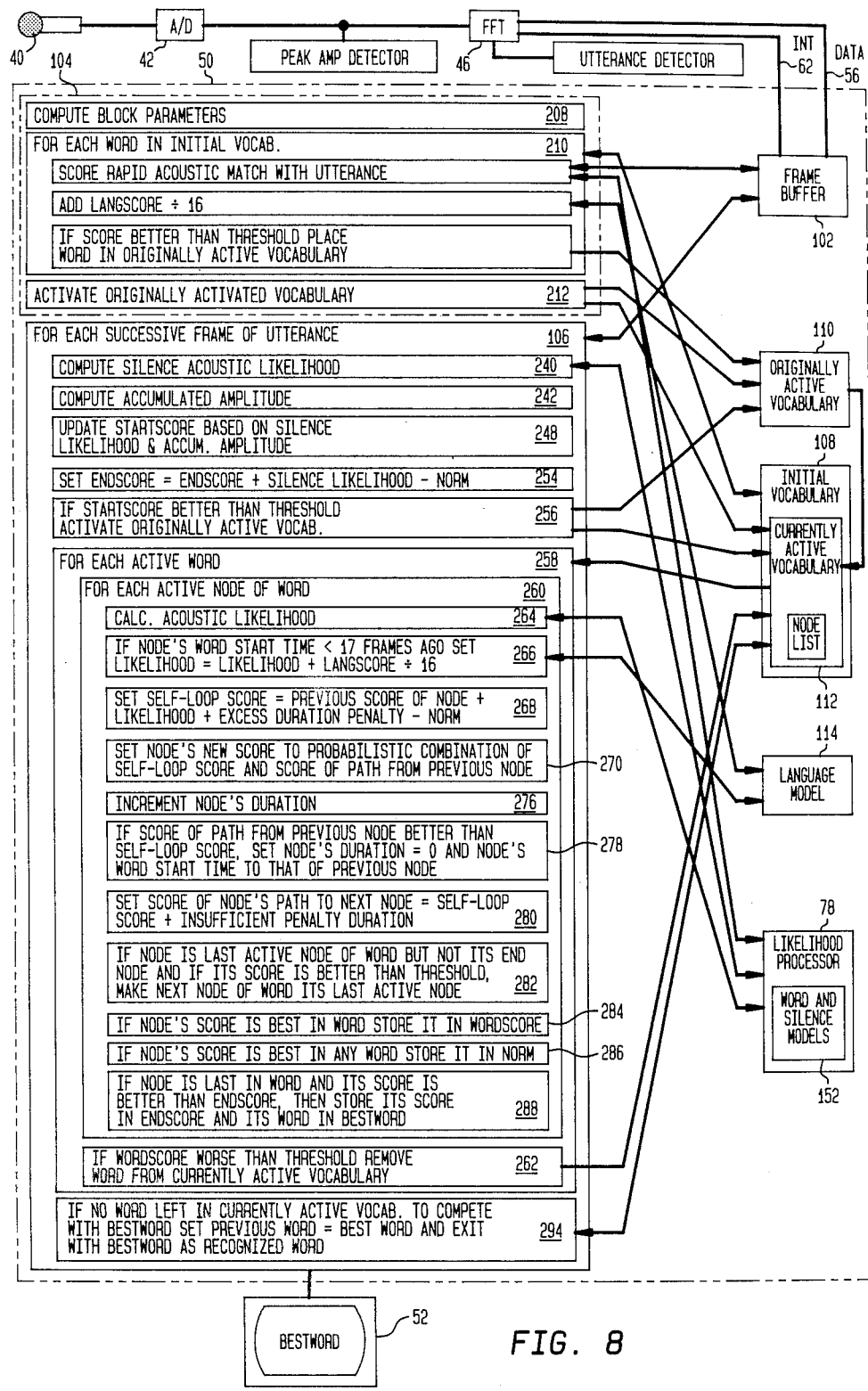
FIG. 8 is a schematic block diagram illustrating the computational structure used to perform speech recognition in a preferred embodiment of the present invention.

Referring now to FIG. 8, the computational structure of a preferred embodiment of the present invention is shown. This preferred embodiment is designed to perform frame matching dynamic programing of the type described above. However, it contains a plurality of additional features designed to greatly improve its performance over similar systems of the prior art, such as that produced and sold previously by the assignee of the present invention. The structure of FIG. 8 is, in effect, another view of the computational structure of FIG. 1, except that the keyboard 54 is not shown, since it is not used in the steps of FIG. 8, and except that the computer 50, instead of being represented in hardware form, is represented in terms of the computational structure it creates when programmed to operate according to a preferred embodiment of the present invention.

The computational structure encircled by the dotted line 50 in FIG. 8 includes a frame buffer 102 for storing the successive frames produced by the FFT circuit 46. It further includes an initial vocabulary means 108 for storing the initial vocabulary of the speech recognition system, an originally active vocabulary means 110 for storing the words which pass a rapid match routine 104, and a currently active vocabulary means 112 for keeping track of which words in the originally active vocabulary remain under consideration as a lengthy word match computation 106 successively prunes poorly scoring words from the active vocabulary. The computational structure also includes a language score means 114 for generating a language score corresponding to the probability that a given word will occur given in the word which has been recognized immediately preceding it. It further includes the likelihood processor 78 shown in FIG. 1, to calculate likelihood scores indicating the probability that a given frame matches a given node. Finally the computational structure of the block 50 includes, at its left hand side, a program which is performed each time the utterance detector 48 detects what appears to be the beginning of an utterance. According to an important aspect of the present invention, this program is comprised of two major sequential portions, a first portion 104, which performs a rapid match computation, and second portion 106, which performs a more lengthy match computation. As is described in more detail below, the purpose of the rapid match computation is to select, from a relatively large initial vocabulary, a smaller, originally active, vocabulary of words judged most likely to correspond to a given spoken utterance. Thus the rapid match 104 conserves computation by causing the much more lengthy word match 106 to be performed only upon those words which appear to have a reasonable chance of corresponding to the given utterance.

Figure 9:
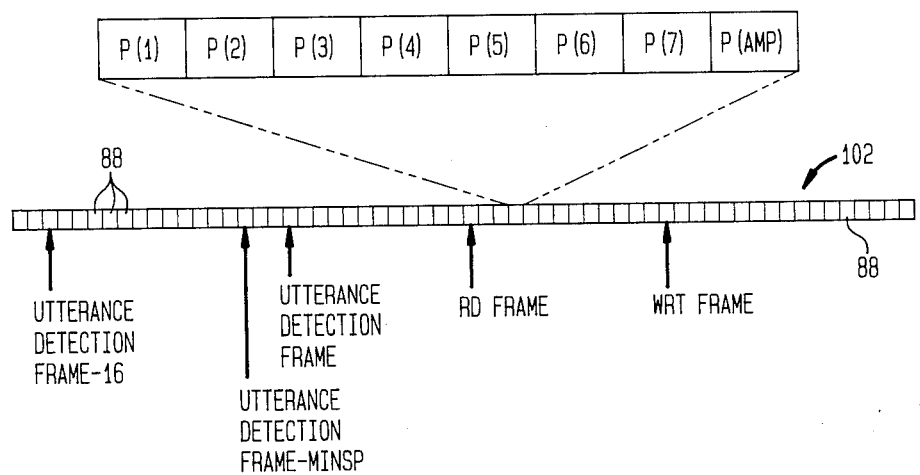
FIG. 9 is a schematic representation of the frame buffer shown in FIG. 8 illustrating in detail how an individual frame formed of eight parameters is stored in such a buffer.

Referring now to FIG. 9, a more detailed discussion of the frame buffer 102 is made. As stated above, the FFT circuit 46 produces 50 acoustic data frames per second. It generates an interrupt for each frame to cause the CPU 64 to place that frame into the frame buffer 102. The frame buffer consists of a sequence of frame address spaces in the memory 68 shown in FIG. 1. Each frame address space contains room for the eight separate eight bit parameter values of a given frame. The program has an address pointer WRTFRAME which points to the location in the frame buffer at which the next frame received from the FFT processor 46 is to be written. According to well known programming techniques, means are provided for incrementing the WRTFRAME pointer after the storage of each frame, so that the next frame is written at the next frame address. Also according to well known programming techniques, means are provided for causing the WRTFRAME pointer to address the lowest frame address in buffer 102 immediately after writing to its highest frame address. As a result, the frame buffer operates as a cyclical address space in which frames can be continuously written by overwriting frames stored during a previous cycle. The buffer 102 should be large enough to hold all the frames which normally occur in the utterance of a word. In practice, a buffer capable of holding 256 frames should prove more than ample, since that would store more than five seconds of speech at 50 frames per second.

The frames produced by the output of the FFT circuit 46 are constantly written into the cyclical address space of frame buffer 102. Whenever an utterance is detected by the utterance detector 48, the system labels the frame address of the current frame as the UTTERANCE DETECTION FRAME, as indicated in FIG. 9. As is described below, the rapid match computation 104 performs its operation based on a sequence of 16 frames starting at the address of the UTTERANCE DETECTION FRAME MINUS MINSP. As was described above, MINSP is three in the preferred embodiment of the invention, and the utterance detector 48 indicates an utterance when three frames have been detected in which the peak amplitude exceeds the threshold value supplied to the comparator 70 shown in FIG. 10. Thus normally the frame address UTTERANCE DETECTION FRAME MINUS MINSP is the first frame having a peak amplitude greater than the threshold supplied to comparator 70, and therefore it is appropriate to start the 16 frame comparison used by the rapid match computation 104 there.

On the other hand, as will also be described below, the lengthy word match computation 106 starts its comparison at a frame address labelled UTTERANCE DETECTION FRAME MINUS 16, This is done because the lengthy word match uses dynamic programming to attempt to optimally match the beginning of a word model against the first speech sounds of an utterance. The dynamic programming starts at UTTERANCE DETECTION FRAME MINUS 16 because many words begin the low energy sounds which are below the threshold necessary to trigger the comparator 70 of utterance detector 48.

Figure 11:
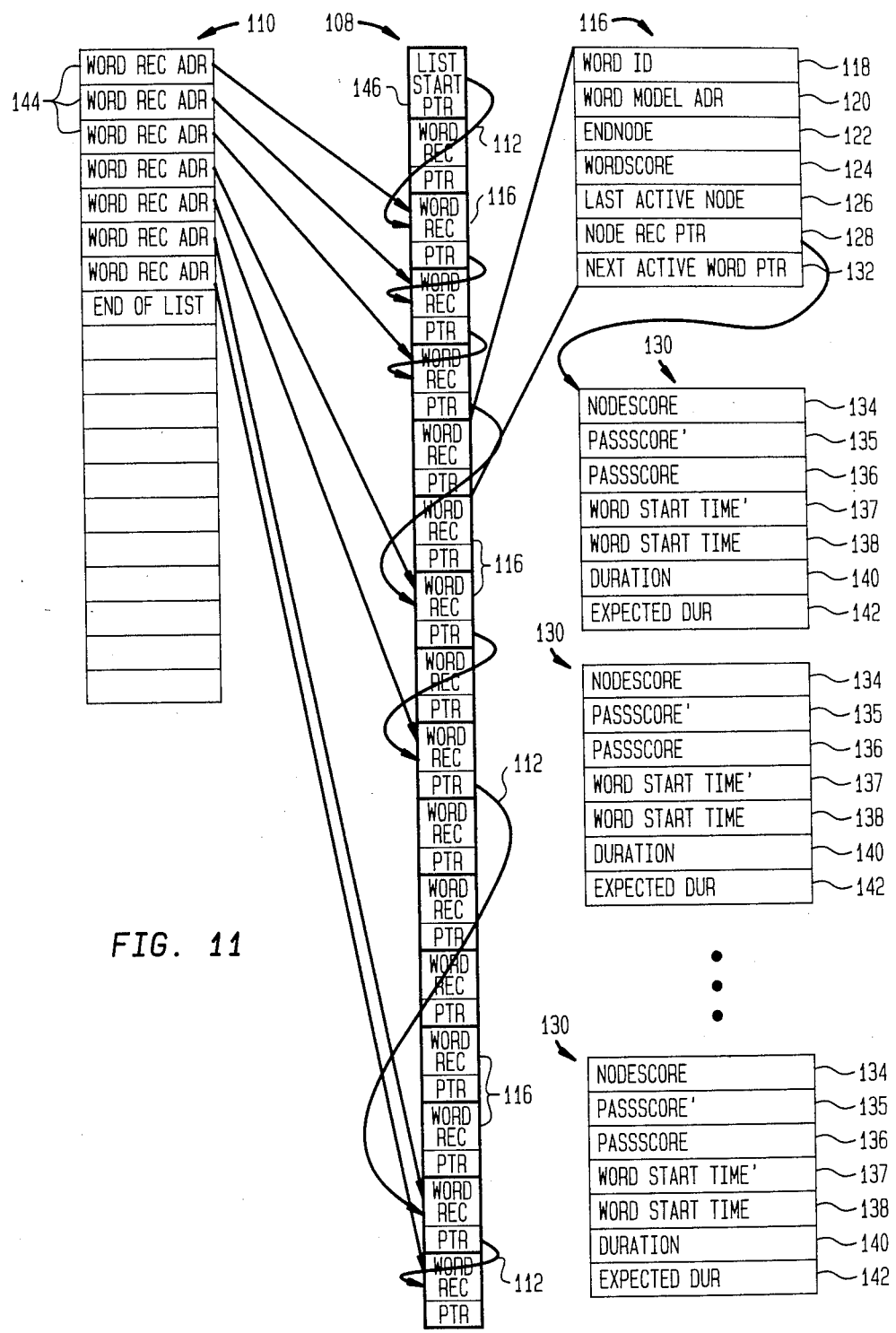
FIG. 11 is a schematic block diagram of the memory structure of the originally active vocabulary means, the initial vocabulary means, and the currently active vocabulary means shown in FIG. 8.

Referring now to FIG. 11, the initial vocabulary means 108, the originally active vocabulary means 110, and the active vocabulary means 112 are discussed in greater detail. The initially active vocabulary means 108 is comprised of a list of word records 116. The list contains one such word record for every word in the initial vocabulary. Each word record includes the following variables: a WORD ID 118, which is the symbol by which the program identifies a given word; a WORD MODEL ADDRESS 120, which is the address within the likelihood processor 78 at which the word model corresponding to the given word is located; an END-NODE number 122, which describes how many nodes the word model of the word contains; a WORD-SCORE variable 124, which stores the best node score of the word produced during the processing of a given frame; a LAST ACTIVE NODE variable 126, which stores the last currently active node of the word during the processing of a given frame; a NODE RECORD POINTER 128, which points to the address of the first node record 130 associated with the nodes of the word model; and a NEXT ACTIVE WORD POINTER 132, which is used by the active vocabulary means 112 to create a linked list of the currently active vocabulary.

Since the number of node records 130 associated with a given word model varies, it is desirable to locate them outside of the word record 116, so that each of the word records can be of the same length. This enables the starting address of successive word records to be computed merely by incrementing the address of previous word records by a fixed amount. With the NODE RECORD POINTER 128, and the ENDNODE variable, each word record 116 has all the information necessary to address each of its node records 130, since each of the node records is of uniform length.

Each node record 130 includes the following variables: a NODESCORE variable 134, including the sum of the probability of all dynamic programming paths, or time alignments, which place the current frame in that node; a PASSSCORE' 135, which corresponds to the probability of a transition from that node to the next node of the word model as calculated during the current frame; PASSSCORE 136, which stores the value of PASSSCORE' calculated during the previous frame; a WORD START TIME' variable 138, which indicates the frame time at which the optimal dynamic programming path to the given node entered the first node of the word model, as calculated during the current frame; a WORD START TIME, which stores the value of WORD START TIME' calculated during the previous frame; a DURATION variable 140, which stores the current number of successive frames that the optimal dynamic path has aligned against in the present node; and an EXPECTED DURATION variable 142, which indicates how many frame times are normally spent by an optimal time alignment in the given node during an utterance of its word.

The originally active vocabulary means 110 contains a memory space allocated for storing a WORD RECORD ADDRESS 144 for each word in the originally active vocabulary. Each such WORD RECORD ADDRESS points to a word record 116 in the initial vocabulary list 108 which correspond to a word placed in the originally active vocabulary by the rapid match computation 104.

Figure 15:
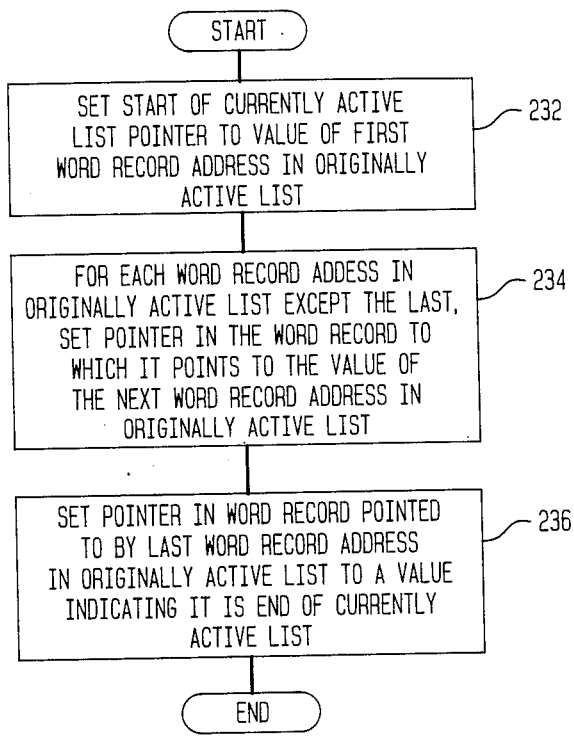
FIG. 15 is a block diagram of means for causing the currently active vocabulary means shown in FIG. 8 to indicate that all the words in the originally active vocabulary are in the currently active vocabulary.

As is discussed below in greater detail with regard to FIG. 15, a program structure is provided for creating a currently active vocabulary means 112, in the form of a linked list, which contains each word record 116 pointed to by a WORD RECORD ADDRESS in the originally active vocabulary. The linked list of the currently active vocabulary starts with the LIST START POINTER 146 located at the beginning of the initial vocabulary list 108. The LIST START POINTER is set to point to the word record of the first word in the original vocabulary. The NEXT ACTIVE WORD POINTER 132 at the end of the first word record in the list is pointed to the word record of the second word in the originally active vocabulary. This linking process is repeated, so that each word record corresponding to a word in the originally active vocabulary has its NEXT ACTIVE WORD POINTER pointed to the next word record of a word contained in the originally active vocabulary. As a result, the entire originally active vocabulary is created as a linked list. The word record corresponding to the last word in the originally active vocabulary has its NEXT ACTIVE WORD POINTER set to an END OF LIST VALUE a value which indicates that it is the end of the linked list, so that a program traversing the linked list knows that the list ends with that given word.

Figures 12, 24:
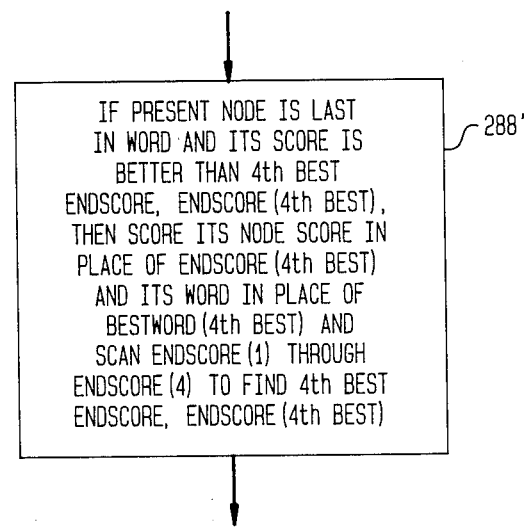
FIG. 12 is a schematic representation of the language model shown in FIG. 8.
FIG. 24 is a schematic block diagram of the computational structure of the embodiment of the invention the output of which is shown in FIGS. 20 through 23, which computational structure is used in place of that shown in FIG. 8 in the block labeled "IF NODE IS LAST IN WORD AND ITS SCORE IS BETTER THAN ENDSCORE, THEN STORE ITS SCORE IN ENDSCORE AND ITS WORD IN BESTWORD"

Referring now to FIG. 12, the language score means 114 is represented in greater detail. The language score means 114 is constructed as a two dimensional memory array, which corresponds to the two dimensional matrix shown in FIG. 12. The two dimensional memory array is addressed by two indices. The first is a variable PREVIOUS WORD, which corresponds to the previous word detected by the recognition system. The second corresponds to a current word candidate being considered by either the rapid match computation 104 or the length word match computation 106. The value provided by the array for each current word, given a certain PREVIOUS WORD, corresponds to the statistically observed frequency of the current word occurring immediately following that PREVIOUS WORD in a large sampling of text. The probabilities predicted by such statistical observations are referred to as language model probabilities.

Since the language model probability of a current word occurring in the context of a PREVIOUS WORD is probabilistically independent of the acoustic likelihood computed for the current word, the combined probability derived from both the language model and the acoustic likelihood match can be computed by multiplying the probabilities of each. Since the likelihood score corresponds to a negative of the logarithm of the probability of an acoustic match, it is convenient to have the language score also correspond to the negative of the logarithm of its associated probability. This enables the probabilities represented by the likelihood and language scores to be combined by addition.

The value stored at each location in the language model array corresponds to the probability that the current word "c" will occur, given the PREVIOUS WORD "p". Stated symbolically $$P(c|p) = \frac{\text{count }(p, c)}{\text{count }(p)}$$

Where "count (p,c)" is the total number of times the word c occurred after the word p in the large body of text from which the language model was made, and "count (p)" is the total number of time the word p occurred at all in that text. If we compute the negative logarithm of the above equation we get the following:

$$-\ln P(c|p) = -\ln (\text{count }(p,c)) + \ln (\text{count }(p))$$

or, by merely switching the terms on the right, $$-\ln P(c|p) = \ln (\text{count }(p)) - \ln (\text{count }(p,c))$$

According to this formula the language score should be equal to the logarithm of the total number of times the PREVIOUS WORD occurred in the body of text from which the language model was derived minus the logarithm of the total number of times the current word immediately followed the PREVIOUS WORD in that text.

One aspect of the present invention, however, relates to the fact that its inventors have found that their speech recognition system operates more reliably if the language scores produced by the array 114 are normalized so that the language score is independent of the number of total occurrences of the PREVIOUS WORD and depends only upon the number of times the current word immediately followed the PREVIOUS WORD in the text from which the language model was derived. According to this aspect of the invention, the language score produced for a current word which occurred only once immediately after a given PREVIOUS WORD in the text from which the language model was derived would have the same score regardless of whether the PREVIOUS WORD occurred only once in that text or 10,000 times. Although this may seem to fly in the face of probabilistic rules, it has the practical benefit of limiting the relative impact of the language score upon the total score for a word when the PREVIOUS WORD is very common in the text from which the language model was derived. The inventors have found empirically that it is important to so limit the effect of the language score upon a given word's probability estimate in a system, such as that used in the preferred embodiment, in which the acoustic likelihood scores are computed, and the language scores are combined with such likelihood scores, on a frame by frame basis. In such a system, the acoustic likelihood scores for the early frames of an utterance are relatively unreliable. As a result, a word which might later develop a good likelihood score might initially have a poor likelihood score, enabling it to be too easily pruned during early frames because of a large language score resulting from a common PREVIOUS WORD, unless the strength of that large language score is weakened.

As a result, in the preferred embodiment of the present invention the language score is equal to the following formula when the current word has occurred one or more times immediately following the PREVIOUS WORD in the text from which the language model was derived:

Language score $= (C1 - C2 * \ln (\text{count }(p,c)))$

It can be seen that this formula corresponds to the formula stated above for the negative of the logarithm of the probability of the occurrence of the current word given the occurrence of the PREVIOUS WORD, except for the following differences: the constant C1 has replaced ln (count(p)); and ln (count (p,c)) has been multiplied by the constant C2, which is equal to eight in the preferred embodiment. The ln (count (p)) has been replaced by the constant C1 so as to normalize the language score as described immediately above. The ln (count (p,c)) has been multiplied by the constant C2 to adjust the negative logarithm of the language model probability to the same numeric range as acoustic match scores. In the preferred embodiment the value C1 has been set to 64, and the language score is limited values from to zero to sixty-four, provided that the current word has immediately followed the PREVIOUS WORD at least once in the body of text from which the language model was constructed.

If the current word has not occurred in the context of a given PREVIOUS WORD in the body of text from which the language model is derived, a slightly different formula is used to determine the value of the language score. That formula is as follows:

$$\text{language score} = (C1 + C3 - C2^* \ln(\text{count of }(c)))$$

Where C1 and C2 are the same as above, and C3 is a constant defined as:

$$C3 = C2^* \ln(\text{count (most frequent word)})$$

Where count (most frequent word) is the total number of times that the most frequent word in the body of text from which the language model is derived occurred in that text. This equation is important, since even in relatively large bodies of text it is not uncommon for a given word never to have occurred immediately after another given word, particularly where the vocabulary is large or the two words form a sequence which is grammatically incorrect.

In the preferred embodiment language scores are computed from a diagram based language model, that is one based on the statistically derived probability of one word following another. It should be understood, however, that the present invention can be used with virtually any language model which predicts the probability of a given word occurring given the one or more words which have occurred previously. For example, it could be used with trigram based language models, of the type described briefly in the Background of the Inventors, above, as well as grammar based language models, or semantic based language models.

The language score means 114 can be made to handle the situation in which no PREVIOUS WORD has been recognized, by setting the language score for the current word candidate to a value corresponding to the frequency of occurrence of that word in the body of text from which the language score was derived, or, during the dictation of the first word of a sentence, to a value corresponding to the frequency of occurrence of that word as the first word of a sentence in the body of text from which the language score was derived.

Figure 13:
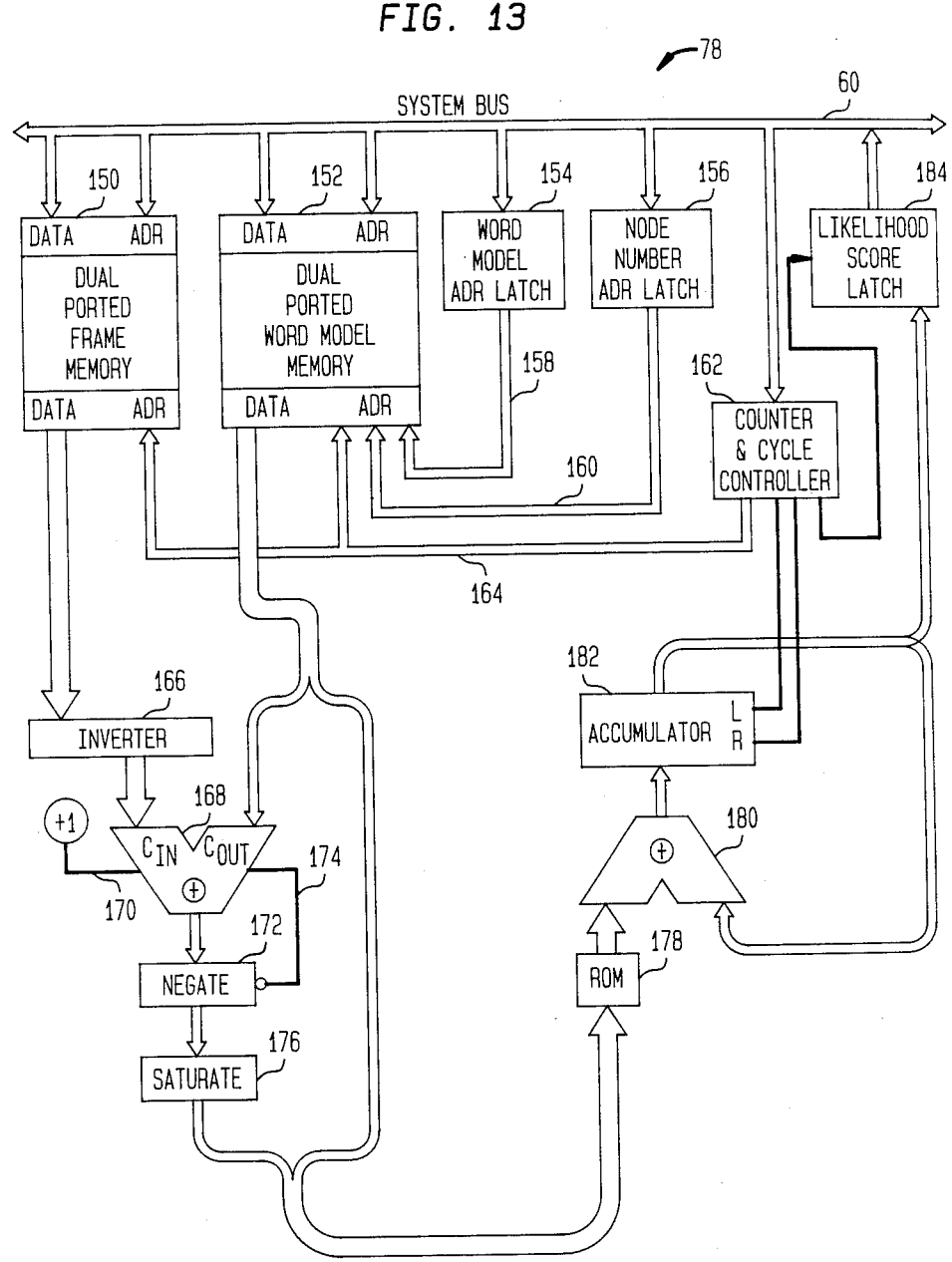
FIG. 13 is a schematic block diagram of the likelihood processor shown in FIG. 8.

Referring now to FIG. 13, the likelihood processor 78 is explained in greater detail. As is stated above, in the preferred embodiment of the invention the likelihood processor 78 is constructed in hardware rather than in software. This hardware is designed to produce a likelihood score of the type described above, which corresponds to the negative of the logarithm of the probability of a match between the eight parameters of a frame and the eight corresponding probability distributions of a given node.

The likelihood processor 78 is attached to the system bus 60 of the computer 50, as shown in FIG. 1. It has two dual ported memories 150 and 152. The dual ported frame memory 150 is designed to hold the eight parameter values associated with a given frame against which a plurality of node are to be compared. It is dual ported so the CPU can write new parameters into it for the computation of each successive frame and so that the internal circuitry of the likelihood processor can use its values in the likelihood computation.

The dual ported word model memory 152 is much larger than the frame memory 150. The majority of its memory is used to hold the nodes of the word models of each word in the initially active vocabulary. These are the nodes used for the likelihood computations of the lengthy match computation 106. The word model memory is also used to store the silence node used to model background sound in the silence score computations and the block nodes used by the rapid match computations 104. It is dual ported so that the CPU 64 can update and add to the node models its stores, while also letting the internal circuitry of the likelihood processor have access to such node models for the purpose of computation.

The processor 78 also includes a word model address latch 154 and a node number address latch 156, which are also both connected to the system bus. When a likelihood computation is being performed upon a given word, the program obtains the WORD MODEL ADDRESS 120 from the word record 116 of the word and sends it over the system bus to the word model address latch 154. The value stored in this latch is then supplied over lines 158 to the address input of the dual ported word model memory 152, addressing that memory so that its output contains node models corresponding to the word for which computations are to be obtained. Similarly, when computations are being performed upon a given word, the program keeps track of the given node in its word model for which the current computation is to be performed, and it supplies the number of that node to the node number address latch 156. This latch 156 then supplies the node number over lines 160 to another portion of the address input of the word model memory 152, causing that memory's output to correspond to the particular node and word identified by the combination of latch 154 and latch 156.

Each word has associated with it two types of nodes. It has the block nodes used in the rapid match computation 104 and the word model nodes used by the more lengthy word match computation 106. The node number address supplied to the latch 156 is also used to distinguish between the nodes of these two different types.

A counter and cycle controller 162 receives clock pulses from the system bus 60. It is comprised of a combination of a counter and logic gates and is used to generate a variety of control pulses which are used to cycle the likelihood processor through the sequence of operations required to compute the match score between a given frame and a given node model. The counter and cycle controller uses a three bit output from its counter to represent a parameter count, which indicates the number of the frame parameter upon which the processor is currently operating. This count is supplied over lines 164 to the address inputs of both the word model memory 152 and the frame memory 150. It is used to cycle the output of the word model memory through each of the eight probability distributions associated with a given node addressed by the word model address latch 154 and the node number address latch 156. This count is also supplied to an address input of the frame memory 150. It causes the frame memory to sequentially output each of the eight parameter values of its current frame.

Each of the eight bit parameter values produced at the output of the frame memory 150 is supplied to the input of an inverter 166. This inverter produces an eight bit output, each bit of which is the inversion of the corresponding bit supplied to its input. The output of inverter of 166 is connected to one of two inputs of an adder 168. The adder 168 has its carry input 170 held high, causing the value supplied to the adder by the inverter 166 to effectively be the two's complement of the parameter value supplied by the frame memory 150. As is well known in the digital arts, the two's complement of a binary number provides an efficient manner of representing and adding the negative of that number. The two's complement representation of a binary number is equal to one plus the value of that number with each of its bits inverted. Thus the adder 168, in effect, subtracts the value of the parameter supplied by the frame memory 150 from the value supplied to its other input. The other input of the adder 168 is connected to eight bits of a fourteen bit data output supplied by the word model memory 152. These eight bits correspond to the expected value contained within a given node model for the parameter currently being produced on the output of the frame memory 150. Thus the output of the adder 168 corresponds to the difference between the expected and observed value for a given frame parameter.

As was stated above, the negative logarithms of the Laplacian probabilities used in the likelihood computation vary as a function of the absolute value of the difference between the expected and observed parameter values. Thus it is desirable to take the absolute value of the output of the adder 168. This is performed by a negate circuit 172. This circuit receives the output of the adder 168 as a data input. It also receives the carry-out output of the adder 168 as a control input. As is well known in the digital arts, when a two's complement number is added to a positive binary number, if a carry is produced by the addition, the resulting sum minus the carry bit equals the correct result, which is a positive value. However, if a carry bit is not produced, the correct result is the two's complement of the resulting sum. In such a case the result of the addition is negative and the two's complemented value produced is the standard binary representation of the absolute value of that negative value.

The carry-out output of the adder 168 is connected to a control input of the negate circuit 172. It is connected in such a way that it causes the negate circuit to perform a two's complement negation upon the output of adder 168 if, after an addition, the carry-out output is low. Thus when the output of the adder 168 is positive, the negate circuit passes the value of that output to the input of a saturate circuit 176 unchanged. But whenever the output of the adder 168 is negative, the negate circuit performs a two's complement negation upon it, converting it to the absolute value of the difference between the observed and the expected parameter value.

The saturate circuit 176 includes circuitry for comparing the input it receives from the negate circuit 172 with the value 127. If its input exceeds 127, it places 127 on its output. Otherwise it passes its input to its output unchanged. As a result, the output of the circuitry 166 through 176 corresponds to the absolute value of the difference between the observed and the expected parameter value when that absolute value is between 0 and 127, and to 127 when that absolute value exceeds 127. Such an absolute value is referred to as a saturated absolute value.

The seven bit output of the saturate circuit 176 is supplied as part of the address input to a ROM, or read only memory, 178. The other six bits of the address input of ROM 178 are provided by the six bits of the fourteen bit output of the word model memory 152 which are not supplied to the input of adder 168. The six bits correspond to a weighting value, which is an inverse function of sigma, the expected deviation of observed parameter values from the expected parameter value, mu, for a given parameter, according to a given node model. The seven bit saturated absolute value produced by the saturate circuit 176 and the six bit weighting value produced by the word model memory 152 are combined to define a unique address in the ROM 178. At each such address the ROM contains a value which is the sum of two numbers, one of which equals eight times the saturated absolute value over [sigma[, and the other of which equals eight times the logarithm of [sigma]. The first of these two numbers depends upon both the output of the saturate circuit 176 and the weighting value produced by the word model memory 152. The second of these two numbers depends only upon the weighting value. Each of these two numbers corresponds to eight times a term in the equation of the negative logarithm of the Laplacian probability distribution described above. Each of these terms is multiplied by eight so the resulting negative logarithmic values used in the likelihood computation better utilize the limited numerical range of the eight bit arithmetic used in most of the preferred embodiment. The output of the ROM 178 corresponds to the negative of the logarithm of the likelihood of the match between a given parameter of a frame and its corresponding distribution model in the current node.

The use of the saturate circuit 176 to produce a seven bit output, rather than the eight bit output reduces the size of the ROM 178 in half, by reducing the address space formed by the combined outputs of saturate circuit 176 and word model memory 152. It has been found that the loss of information caused by reducing the output of circuits 166 through 172 from eight to seven bits has very little negative effect upon speech recognition performance, since even a score of 127 represents a very unlikely match.

The output of ROM 178 is supplied to one input of a hardware adder 180. The output of this adder is supplied to the input of an accumulator latch 182. The output of this accumulator is supplied both to the other input of the adder 180 and to the input of a likelihood score latch 184. The likelihood score latch, in turn, has its output connected to the system bus 160.

The reset input of accumulator 182 is connected to a line from the counter and cycle controller 162. This line is used to reset the accumulator's value to zero at the very beginning of each complete likelihood computation cycle. The accumulator 182 also receives a second input from the counter and cycle controller 162. This second input causes the accumulator to latch the output of the adder 180 at the end of the computation cycle performed for each frame parameter. This latching is performed at the end of each such cycle to enable the invertor 166, the adder 168, the negate circuit 172, the saturate circuit 176, and the ROM 178 time to produce the negative of the logarithm of the probability of the match between a given parameter and its corresponding node model probability distribution. This value is then summed in the adder 180 with the current value of the accumulator 182, and the output of that addition is latched as the new value of the accumulator of 182.

During the calculation of the match score associated with the first parameter of a frame, the accumulator 182 merely latches the value of that match score, since the initial value of the accumulator 182 and, thus, the other input of the adder 180, is zero. During the cycle associated with each of the remaining seven frame parameters, however, the accumulator 182 latches the total of the match score for that given parameter plus the sum of all previous match scores computed for the frame.

At the end of the computation cycle of processor 78, the counter and cycle controller 162 sends a latching input to the likelihood score latch 184. This causes the latch 184 to latch the value stored in accumulator 182 after it has had a chance to accumulate the match scores for each of the eight parameters of the current frame. Once this likelihood score has been stored in latch 184, it can then be read by the CPU 64 over the system bus 60.

It should be understood that the likelihood processor used by the present invention could be made in other ways than that shown in FIG. 13. For example, such a likelihood processor could be constructed in software by programming a general purpose computer. Also it should be understood that in a preferred embodiment it might be desirable to have the counter and cycle controller automatically sequence the word model memory through each of the nodes associated with a given word model, so as to reduce the amount of time required for communication between the CPU and the likelihood processor during the matching between a given frame and a given word.

Returning again to FIG. 8, a more detailed description will now be given of the steps performed by the computational structure of the preferred embodiment of the present invention. As was stated above, this computational structure involves two major sequential components which are performed after the utterance of a word has been detected. First a rapid match computation 104 is performed to derive from an initial vocabulary a smaller, originally active, vocabulary containing the words which appear to have a reasonable chance of matching the detected utterance. Then, after the rapid match computation, a more lengthy and accurate word match computation 106 is performed upon each of the words in the originally active vocabulary.

As is shown in FIG. 8, the rapid match computation 104 comprises three basic functional blocks. The first of these, block 208, computes block parameters, which are averaged acoustic parameters for the initial frames of the utterance just detected. A second of these functional blocks, block 210, performs, for each word in the initial vocabulary the following three steps: 1. a rapid match between the block parameters calculated in step 208 and the corresponding block nodes for the word; 2. a combination of the resulting match score with the language score for the word; and 3. placement of the word in an originally active vocabulary list if the resulting combined score is better than a threshold value. The third functional block of the rapid match computation, block 212, activates the originally active vocabulary by causing a currently active vocabulary list to contain all the words of the originally active vocabulary.

Figure 14:
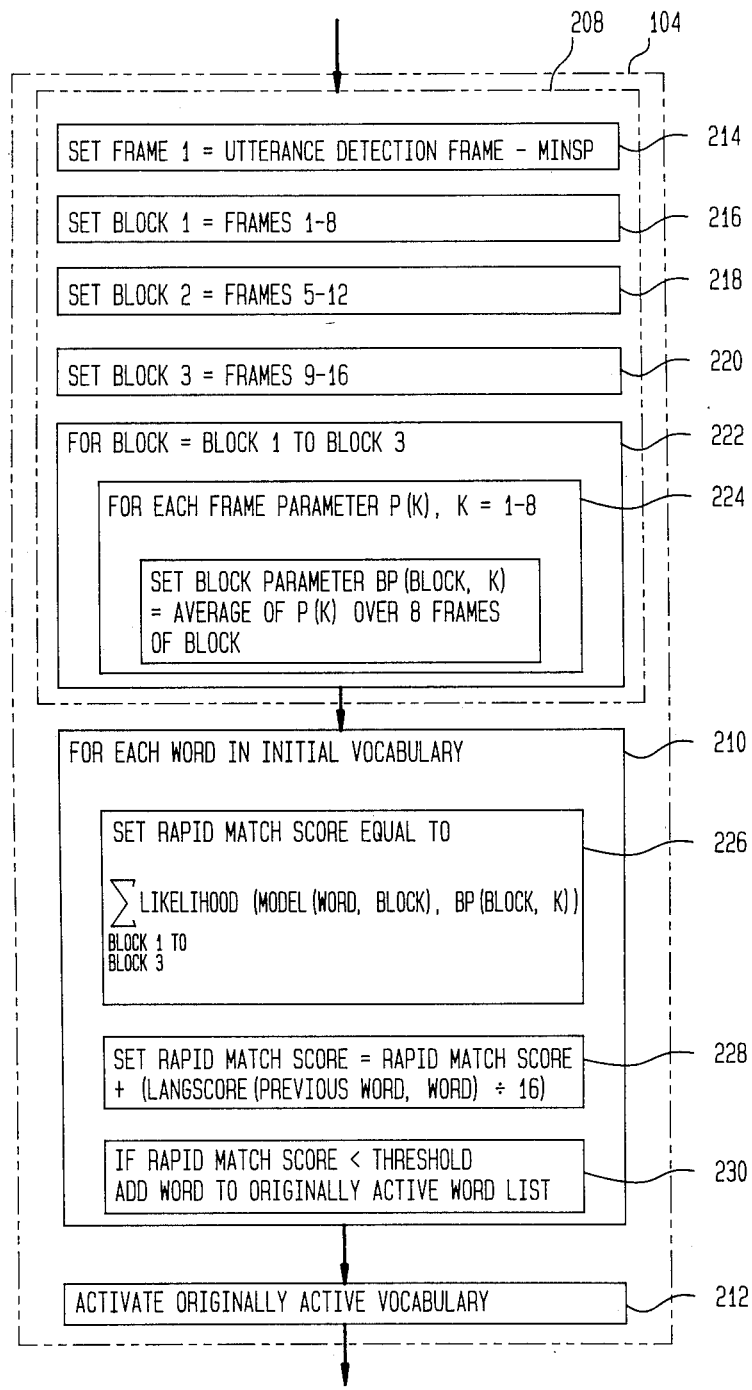
FIG. 14 is an expanded block diagram of the rapid match portion of the speech recognition program shown in FIG. 8.

Referring now to FIG. 14, a more detailed representation of the rapid match computation is shown. As is illustrated in this more detailed view, the block parameter computation step 208 actually involves a plurality of sub-steps, 214, 216, 218, 220, 222 and 224. In step 214 the computer initializes its frame pointing variable used in the block parameter computations by setting FRAME 1 equal to the frame address UTTERANCE DETECTION FRAME MINUS MINSP in the frame buffer 102. As was stated above with regard to FIG. 10, this address normally points to the first frame of the utterance which had a peak amplitude greater than the threshold supplied to comparator 70.

In the next three steps, 216, 218 and 220, the three frame blocks, BLOCK 1, BLOCK 2, and BLOCK 3, for which block parameters are computed are defined. BLOCK 1 is defined as corresponding to frames 1 thru 8, BLOCK 2 is defined as corresponding to frames 5 thru 12, and BLOCK 3 is defined as corresponding to frames 9 thru 16. In step 222 the frame parameters are computed. The computation of this step is iterated separately for each of the three frame blocks, BLOCK 1 thru BLOCK 3. In each such frame block iteration, a separate iteration 224 is made for each of the eight frame parameters. In each of these iterations 224 a given frame parameter is averaged over each of the eight frames of a given frame block. The resulting average is used as the corresponding block parameter for the given frame block. In FIG. 14 a given block parameter is identified as BP (BLOCK, K), where BLOCK is the number of its frame block and k is the number of its corresponding parameter.

After the block parameters have been computed, the computation progresses to functional routine 210, which actually performs the rapid match and decides if a given word should be placed in the originally active vocabulary. The routine 210 contains a sequence of steps, 226, 228 and 230, which are all performed separately for each word in the initial vocabulary.

In step 226 the program calculates a rapid match score for a given word. This score is equal to the sum of the three likelihood scores computed for the match between each of the three frame blocks produced in step 222 and three corresponding block noes associated with the given word. Each of these three likelihoods is computed in the following manner: The CPU 64 sends the eight parameters associated with a given frame block to the frame memory 150 of the likelihood processor 78. It then sends the value of WORD MODEL ADDRESS 120 for the word being compared to the word model address latch 152 and the address of the word's block node to be compared against the frame block to the node number address latch 156. Once this has been done the CPU sends a signal to the counter and cycle controller 162, which causes the processor 78 to compute the likelihood score and place it in the latch 184, from which it can be read by the CPU. The CPU causes such a computation to be performed for each of the three frame blocks and adds together the resulting likelihood scores to form the rapid match score for the given word.

Once the rapid match score for a given word is calculated as indicated in step 226, the program advances to step 228. There the score produced in step 226 has added to it a partial language score value. As indicated as in FIG. 14, this partial language score value is equal to one sixteenth of the language score produced by the language score means 114 for the given word, given the value of PREVIOUS WORD detected by the system. The language score is divided by sixteen to weaken its strength relative to the rapid match score so that it will not overwhelm that match score. This is done because the rapid match score, which results from a superficial comparison, is a weak indication of the probability of a match between the utterance and a given word.

In step 230 the rapid match score produced by the step 228 is compared against a threshold. If the rapid match score is less than the threshold, it indicates that the probability of the current word is greater than a cutoff probability corresponding to the threshold. If this is the case, step 230 adds the current word to the originally active vocabulary by adding its WORD RECORD ADDRESS to the originally active vocabulary list 110 shown in FIG. 11.

The loop of routine 210 is repeated for each word in the initial vocabularly, so that when routine 210 is exited the originally active vocabularly list 110 includes the WORD RECORD ADDRESS of each word which had a rapid match score below threshold.

In an alternate embodiment of the present invention the threshold used in the rapid match is selected to allow a preselected number of words to pass into the originally active vocabulary. This is done, in effect, by replacing step 230 with a step that stores the rapid match score for each word calculated in steps 226 and 228. Then after the loop 210 is completed for all words in the initial vocabulary, another step is performed before step 212 in which the preselected number of words with the highest rapid match scores are placed in the originally active vocabulary.

After the rapid match loop 210 has been completed, the program progresses to step 212, where the originally active vocabulary created in step 210 is activated. This activation consists of the creation of a currently active vocabulary which initially contains each of the words in the originally active vocabulary. This step is explained in greater detail in FIG. 15. It consists of the steps 232, 234, and 236. In step 232 the LIST START POINTER 146, shown at the top of the initially active vocabularly list 108 in FIG. 11, is set equal to the first word record address 149 in the originally active vocabularly list 110. After this is done the program advances to step 234, which is a loop repeated for each WORD RECORD ADDRESS 144 in the originally active vocabularly list 110, except the last. In this loop 234 the word record 116 to which each WORD RECORD ADDRESS, except the last, points has its NEXT ACTIVE WORD POINTER 132 set to the value of the next WORD RECORD ADDRESS 144 in the originally active vocabularly list. Thus after step 234 each of the word records 116 corresponding to a WORD RECORD ADDRESS in the originally active vocabularly 110, except for the last, has its corresponding NEXT ACTIVE WORD POINTER 132 pointing to the word record of the next word in the originally active vocabulary.

After the completion of step 234 the program advances to step 236. This step sets the NEXT ACTIVE WORD POINTER in the word record pointed to by the last WORD RECORD ADDRESS in the list 110 to an END OF LIST VALUE. This value indicates to a program traversing the linked list of the currently active vocabulary that its word record is the last in that vocabulary.

Once step 236 is completed, the functional block 212 in FIG. 14 and the rapid match computation 104 are likewise completed. At this point the lengthy word match computation 106 illustrated in FIG. 8 commences. This computation consists of one major loop, also indicated by the number 106, which is repeatedly iterated for each successive frame in the frame buffer 102, starting with the frame address UTTERANCE DETECTION FRAME MINUS 16. This iteration is continued until there is no word left in the currently active vocabulary to compete with the word having the best word score. When this condition occurs the loop is exited and the recognition process is complete.

The first step in each successive iteration of the lengthy match computation 106 is a step 240. Step 240 computes the likelihood score of a match betwen the frame for which the current loop is being computed and a silence model previously developed for the background noise in which the recognition process is taking place. Such a silence model can be developed by taking a plurality of frames produced by the FFT circuit 46 during a period when no one is speaking to the microphone 40 and using standard statistical techniques to determine the expected value, [mu], and the expected deviation, [sigma], for each of the eight frame parameters over that plurality of frames.

The likelihood score for silence is computed by the following steps: The CPU 64 loads the frame memory 150 of the likelihood processor 78 with the current frame. This is the frame for which the current loop of the lengthy match computation 106 is being performed. This same frame is used by the likelihood processor during the remainder of the loop 106, preventing the need to reload the frame memory 150 during the remaining likelihood computations of the loop. The CPU also supplies the word model address latch 154 with the word model address of the silence model and node number address latch 156 with the address of the single node contained in that model. Then the CPU causes the counter and cycle controller 162 to sequence the likelihood processor through the match between the current frame and the silence model. Finally the CPU reads the resulting score from the latch 184 and stores it in a variable called SILENCE LIKELIHOOD SCORE.

Figure 16:
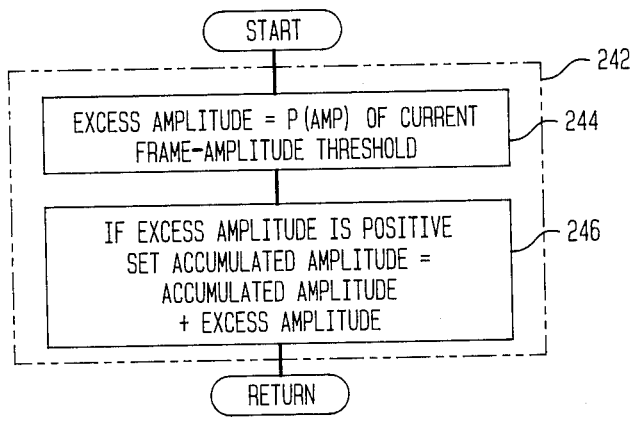
FIG. 16 is an expanded block diagram of the computational structure contained in the block labeled "COMPUTE ACCUMULATED AMPLITUDE" in FIG. 8.

After the silence likelihood computation 240 is complete, the program advances to a step 242, which makes an accumulated amplitude computation. As is shown in FIG. 16, the accumulated amplitude computation 242 is comprised of two separate steps 244 and 246. In step 244 a variable labelled EXCESS AMPLITUDE is set equal to the value of the amplitude parameter of the current frame minus an amplitude threshold. As was stated above with regard to FIG. 3a, the eighth parameter of each frame corresponds to the average of the logarithms of the energy amplitude in each of eight spectral bands associated with that frame. Once the EXCESSIVE AMPLITUDE variable has been derived, a decision is made in step 246 whether or not EXCESS AMPLITUDE is positive. If so, EXCESS AMPLITUDE is added to an ACCUMULATED AMPLITUDE SCORE. Thus during each successive frame of the lengthy match computation 106, starting with the frame address UTTERANCE DETECTION FRAME MINUS 16, ACCUMULATED AMPLITUDE is increased by the amount by which the amplitude parameter of each successive frame exceeds a given threshold value.

Frames having an amplitude parameter exceeding the threshold tend to be associated with speech. The greater the amount by which their amplitude exceeds the threshold and the greater the number of frames in which it does so, the greater the likelihood that such frames are associated with speech rather than some loud random background sound. Thus the ACCUMULATED AMPLITUDE SCORE tends to correspond inversely to the probability that an utterance has not yet begun.

Returning now to FIG. 8, after the accumulated sound computation 242 has been made, the iteration for a given frame progresses to step 248. There the variable STARTSCORE is updated based on both the SILENCE LIKELIHOOD SCORE and the ACCUMULATED AMPLITUDE SCORE computed in steps 240 and 242 above. STARTSCORE represents the probability that an utterance has not begun in a previous frame. It is used to cause the system to look for the start of an utterance. The updating of the STARTSCORE variable 248 is represented in greater detail in FIG. 17. As is shown there, the updating of STARTSCORE includes two separate steps, 250 and 252. In step 250 STARTSCORE is set equal to its previous value plus the SILENCE LIKELIHOOD SCORE derived in step 240 minus NORM, where, as will be described below in greater detail, NORM is the best score for any node in any word computed in the previous frame iteration.

Before the first frame iteration STARTSCORE is set equal to zero, which, with the preferred embodiment's use of negative logarithms of probabilities, means that STARTSCORE is initially considered the most likely possible node. This make sense, because it is initially assumed that speech has not previously begun at UTTERANCE DETECTION FRAME MINUS 16. Also at this time NORM is set equal to zero, since that corresponds to the initial value of STARTSCORE, which is initially the best scoring node of any word. Thus during the first frame iteration step 250 sets STARTSCORE equal to the initial SILENCE LIKELIHOOD SCORE, since the value of STARTSCORE minus NORM is equal to zero. If, however, in subsequent iterations there is a node in any word model which causes NORM to have a better, that is, lower, value than the SILENCE LIKELIHOOD SCORE, STARTSCORE will start to increase, meaning that it is more likely that the utterance has previously begun.

Once step 250 has been completed, the program advances to step 252. There STARTSCORE is set equal to the lowest of either STARTSCORE, as just computed in step 250, or the ACCUMULATED AMPLITUDES SCORE, as recently computed by step 242. This step sets STARTSCORE to that one of these two scores which indicates with the greatest probability the utterance of speech has not yet begun. When STARTSCORE is low, the dynamic programming of computation 106 assigns a greater likelihood to a transition being made from the beginning silence node, represented schematically in FIG. 7, to the first node of a word model. Thus step 248 causes the dynamic programming to look for the start of a word when either the SILENCE LIKELIHOOD SCORES or the ACCUMULATED SOUND SCORE indicate that a word has not yet started. The use of the lower of these two scores has a benefit. If the background sound changes so that it no longer matches the silence model contained in the likelihood processor, a STARTSCORE based on an acoustic match between a succession of frames and the silence node model would tend to indicate that speech has begun, even though it hasn't. The use of the ACCUMULATED AMPLITUDE SCORE will indicate that it is unlikely that speech has begun in such a situation, as long as the total amplitude above threshold remains low.

As is shown in FIG. 8, once STARTSCORE has been updated, the program advances to step 254. In this step the variable ENDSCORE is updated. ENDSCORE represents the best score associated with the silence following the last node of any word in the originally active vocabulary. In effect, it can be considered to be the score of the word model offering the best scoring path from the beginning silence to the ending silence through the network represented in FIG. 7. Since the value in ENDSCORE represents a probability that the current frame is in the ending silence, it only makes sense that this probability should be made more likely by frames which appear to be silence or background sounds and less likely by frames which appear to be speech sounds. This is what step 254 attempts to do. It sets the updated value of ENDSCORE equal to the value of ENDSCORE from the last frame iteration plus the SILENCE LIKELIHOOD SCORE computed in step 240 minus NORM, the best score for any node in the previous frame iteration.

Before the first frame iteration, ENDSCORE is set equal to 255, the least likely score. This makes sense, because it is impossible that the ending silence of an utterance will be reached on the first frame. In fact, until a dynamic programming path reaches a the last node of at least one word model and gives ENDSCORE a value less than 255, the computation in step 254 servies little purpose and may be skipped.

Once ENDSCORE has been updated, the program advances to step 256, where STARTSCORE is compared against a threshold. If STARTSCORE is better than the threshold, the originally active vocabulary is reactivated by the steps 232, 234 and 236 shown in FIG. 15, described above. This is done because, as is explained below in greater detail, as each frame iteration is performed, any word having a WORDSCORE worse than a certain threshold is pruned from the active vocabulary. However if STARTSCORE subsequently becomes better than threshold, there is a good chance that the frame for which such pruning has been performed are associated with spurious noise and that the actual utterance of a word has not yet begun. In such a case it is improper to have begun pruning words. For this reason step 256 reactivates the originally active vocabulary, causing any words removed from the currently active vocabulary to be replaced.

After step 256, the iteration for a given frame advances to step 258. In this step the program performs an iteration for each word in the currently active vocabulary. The iteration 258 contains two steps, steps 260 and 262. Of these two, step 260 is itself a further iteration, one performed for each active node of the word for which a given iteration 258 is being performed. The computations contained in iterations 258 and 260 are among the most frequently performed in the entire program of FIG. 8. Although in the preferred embodiment described herein most of these computations are performed in software, it will be understood by those skilled in the art that future preferred embodiments of the invention may well contain special purpose hardware to perform the entire computation contained in iteration 260 and possibly even that in interation 258.

As was just stated, the iteration 260 performs a sequence of computational steps for each active node of a given word model. As is shown in FIG. 11, each word record 116 contains a variable LAST ACTIVE NODE 126 which lists the number of the last active node in its word model. Before the first frame iteration 106, this variable is set to one for each word record, making only the first node of each word model active. But, as is described below, the iteration 260 includes means for increasing the value of this variable as the process of dynamic programming advances.

The first step contained in the iteration 260 for a given active node is the step 264. In this step the likelihood processor 78 calculates the likelihood of a match between the current frame and the current node. This likelihood computation is performed by supplying the number of the current node within its word model to the node number address latch 156 and then applying a signal to the counter and cycle controller 162 to cause the likelihood processor to perform its computation. The value of the current frame has been previously loaded into the likelihood processor when computing the silence likelihood in step 240, and the word model address indicating the current word need only be supplied to the likelihood processor 178 before the first iteration 260, at the very start of an iteration 258 for a given word.

Once the likelihood score for the given node has been calculated in step 264 the iteration advances to step 266. There the program reads the WORD START TIME variable 138 contained in the node record 130 for the current node. This variable indicates the frame during which the optimal dynamic programming path to the current node entered the first node of the current word model. If this word start time is less than seventeen frames earlier than the current frame, step 266 adds to the likelihood score computed in step 264 a value equal to one sixteenth of the language score produced by the language score array 114 for the current word, given the PREVIOUS WORD recognized by the system. Thus one sixteenth of a word's language score is added to its likelihood calculation during each of the first sixteen frames of a given dynamic programming path through its word model, causing a value approximately equal to the total likelihood score to be combined into each dynamic programming path during the first sixteen frames of that path.

When step 266 is complete, the current node iteration 260 advances to step 268. There the value of SELF-LOOP SCORE is computed. SELF-LOOP SCORE corresponds to the probability that the dynamic programming path leading to the current node in the current frame is a self-body, that is, a transition from the current node to itself, indicating that more than one successive frame corresponds to the sound of the current node. Such self-loops are represented schematically by the circular arrows in FIGS. 5b, 6 and 7. The probability of such a self-loop equals the sum of the probabilities of all time alignments which place both the previous frame and the current frame in the current node. SELF-LOOP SCORE is made to correspond to the negative logarithm of this probability by setting its value equal to the NODESCORE 134 of the current node calculated in the previous frame, plus the likelihood score of the node, computed in steps 264 and 266 above, minus the value of NORM. The previous value of NODESCORE is used because it reflects the combined probability of all time alignments which placed the previous frame in the current node. The likelihood score is used becaue it indicates the probability that the current frame corresponds to the current node.

The EXCESS DURATION PENALTY is used in the calculation of SELF-LOOP SCORE to reflect the decrease in the probability of a self-loop which results from each frame which the optimal dynamic programming path spends in the current node in excess of the expected duration for that node. The value of EXCESS DURATION PENALTY is calculated as follows:

EXCESS DURATION PENALTY = $W$, if DURATION >

EXPECTED DURATION = 0, if DURATION < or = EXPECTED DURATION where W equals an empirically derived weighting value that should theoretically correspond to the inverse of sigma, where sigma is the expected deviation between actual and expected duration values for the given node. In the embodiment of the invention actually made however, W has been set to a value representing the expected deviation for all nodes, since the inventors have not yet derived sufficient statistical information on node durations to provide a separate sigma for each node.

Since the value of NODESCORE used in the calculation of the SELF-LOOP SCORE contains the sum of all the EXCESS DURATION SCORES added to previous SELF-LOOP SCORES of the current node, the current SELF-LOOP SCORE for the current node includes a total excess duration penalty whose total value is given by the formula:

Total excess duration penalty = $W$ * (DURATION −

EXPECTED DURATION), if DURATION >

EXPECTED DURATION where W is the same value described above in the formula for the EXCESS DURATION PENALTY for a single frame. This total excess duration penalty corresponds to the negative of the logarithm of the above mu portion of the Laplacian probability distribution for a given DURATION, given the difference of that DURATION from the EXPECTED DURATION of its node. The EXCESS DURATION PENALTY is only added to the SELF-LOOP SCORE if DURATION exceeds EXPECTED DURATION because it is too early to tell if the final DURATION of a given dynamic programming path's stay in a given node will differ from the EXPECTED DURATION of that node when DURATION is less than EXPECTED DURATION. But once the DURATION of the dynamic programming path's stay in the node exceeds EXPECTED DURATION by a current amount, it is clear that the final DURATION in the node will exceed its EXPECTED DURATION by at least the current amount.

As described below with regard to step 280, a value corresponding to the below mu portion of this same Laplacian probability distribution is added as an INSUFFICIENT DURATION PENALTY to the score representing the probability of the dynamic programming path leaving the current node after the current frame.

The value NORM, which is the previous best score of any node in any word, is subtracted from the value used to calculate SELF-LOOP SCORE in step 268. This is done to normalize the SELF-LOOP SCORE so that the value of SELF-LOOP SCORE and all the values which are calculated from it will be normalized relative to the best node score of the previous frame iteration. This normalization greatly reduces the numerical range over which the computations of each frame iteration take place, and is one reason why the preferred embodiment of the present invention can perform state of the art speech recognition largely in eight bit arithmetic.

As soon as SELF-LOOP SCORE has been calculated, the iteration for the current node advances to step 270 where the new value of NODESCORE for the current node is calculated. This calculation sets NODESCORE to a value which represents the probabilities of all time alignments between the frames processed so far and the word model which places the current frame in the current node. Since SELF-LOOP SCORE represents the probability of all time alignments which place both the previous frame and the present frame in the current node, and since PASSSCORE, a variable described below computed for the previous node, represents the probability of all time alignments which place the previous frame in the previous node and the present frame in the present node, NODESCORE is calculated by combining SELF-LOOP SCORE and PASSSCORE.

This NODESCORE computation is represented in greater detail in FIG. 18. As is shown there, it is comprised of two alternate steps 272 and 274. If SELF-LOOP SCORE is greater in value than PASSSCORE, which, because both scores are negative logarithms of probabilities, indicates that a self-loop is less likely than transition from the previous node, NODESCORE is determined according to the following formula:

$$\text{NODESCORE} = \text{PASS} - c^*\ln(1 + e^{(PASS-SELF)/C})$$

Where SELF and PASS are abbreviations for SELF-LOOP SCORE and PASSSCORE, respectively, and c is an empirically derived constant to adjust for the average amount of correlation among the parameters of each frame and the frames of each utterance. In the preferred embodiment the value 10 is used as the value for c. If, on the other hand, the SELF-LOOP SCORE is less than PASSSCORE, NODESCORE is set equal to the following formula:

$$\text{NODESCORE} = \text{SELF} - c^*\ln(1 + e^{(SELF-PASS)/C})$$

The alternate formulas of steps 272 and 274 represents the proper way to make NODESCORE equal to the negative of the logarithm of the sum of the probabilities represent by the negative logrithmic values SELF-LOOP SCORE and PASSSCORE.

Returning now to FIG. 8, upon the completion of step 270, the iteration for a given node advances to step 276. In step 276 the variable DURATION 140 of the current node record is incremented by one. As is explained immediately below, this variable is reset to zero during any frame in which it appears that a transition is made from the previous node of the current word. As a result, DURATION provides an indication of the number of successive frames which correspond to the current node.

After step 276, the program enters step 278. Here another comparison is made between SELF-LOOP SCORE and PASSSCORE. If PASSSCORE is less than SELF-LOOP SCORE, it is likely that the optimal dynamic programming path leading to the current node in the current frame was in the previous node of the current word during the previous frame and made a transition to the current node in the current frame. If this is true, the value of DURATION for the node is set to zero and the value of the current word start time of the current node, WORD START TIME' 138, is set equal to the WORD START TIME 139 of the previous node of the current word calculated during the previous frame. If, on the other hand, PASSSCORE is greater, or less probable, than SELF-LOOP SCORE, the program merely advances the next step, leaving the node's current values for DURATION and WORD START TIME' unchanged.

It should be noted that for each node there are two variable relating to word start time, WORD START TIME' and WORD START TIME. WORD START TIME' stores the value computed in the current frame. At the end of each frame period the value of WORD START TIME' for each node is stored in the node's corresponding variable WORD START TIME, in a step not illustrated in any of the figures.

Step 278 sets the current mode's WORD START TIME' to the value of the WORD START TIME of the previous node calculated during the previous frame, if a transition from the previous node is more probable than a self-loop, because, in that case, the optimal dynamic programming path leading to the current node in the present frame is the optimal path that was in the previous node during the previous frame, and thus the current node should have the same WORD START TIME' as did the previous node in the previous frame.

If the current node is the first node of a word model, the WORD START TIME associated with its previous node is the time of the current frame, and the PASSSCORE against which the node's SELF-LOOP SCORE is compared is the value STARTSCORE, discussed above. Thus in each successive frame the WORD START TIME' of the first node of each word is set to the current frame time until the SELF-LOOP SCORE of that node is better than STARTSCORE, at which time the WORD START TIME' associated with that node is left unchanged. This leaves the first node's WORD START TIME equal to the time of the last frame period in which STARTSCORE was better than SELF-LOOP SCORE. If, however, at a later time STARTSCORE drops below, and thus again becomes better than, the SELF-LOOP SCORE of the first node, the WORD START TIME' of the first node will again be reset to the current frame time. Thus a plurality of different word start times can propagate through the nodes of a given word. But step 278 will only replace the current value of a node's WORD START TIME' if the PASSSCORE of a dynamic programming path having a different start time is better than the node's SELF-LOOP SCORE. Thus it can be seen that the WORD START TIME associated with each node is the start time of the optimal dynamic programming path leading to that node.

Once step 278 has been completed, the iteration for a given node advances to step 280. There a value, PASSSCORE', is calculated which represents the probability that a transition will be made from the current node to the next node of its word model during the next frame. PASSSCORE' stores the value computed in step 280 during the current frame. At the end of each frame period this value is stored in the node's corresponding variable PASSSCORE, in a step not illustrated in the figures. This use of two variables, PASSSCORE' and PASSSCORE, enables the computation in steps 270 and 278 during a given frame to access the value of PASSSCORE' computed in the prevous frame.

Step 280 sets PASSSCORE' for the current node equal to the node's SELF-LOOP SCORE plus an INSUFFICIENT DURATION PENALTY which is a negative logrithmic function of the probability that the node ends after the current frame. To be more precise the formula is as follows:

PASSSCORE'=SELF-LOOP
SCORE+INSUFFICIENT DURATION
PENALTY where:

INSUFFICIENT DURATION PENALTY =

-continued $$\text{Max}(W*(\text{EXPECTED DURATION} - \text{DURATION}), 0)$$

In this last formula W equals the same weighting value described above with respect to step 268. The INSUFFICIENT DURATION PENALTY corresponds to the negative logarithm of the below mu portion part of the Laplacian probability distribution described above with regard to step 268. The INSUFFICIENT DURATION PENALTY reflects the fact that a transition from the current node to the next node is made less likely the more the DURATION of the current node is less than the EXPECTED DURATION for that node.

After PASSSCORE' is computed in step 280, the iteration for the current node advances to step 282. In step 282 the program compares the number of the current node against the LAST ACTIVE NODE variable 126 contained in the current word record 116. If the two numbers are equal, indicating that the current node is the last active node of the word model, the program then compares the current node number with the ENDNODE variable 122 of the word record. If these two comparisons indicate that the current node is the last active node but not the endnode, the program compares the node's NODESCORE with a threshold value. If NODESCORE is less than threshold, indicating that the node is sufficiently probable that the possibility of transitions from it to the next node of the word model should be considered, the program increments the value of LAST ACTIVE NODE for the word. As a result, during successive frames the next node will be considered by the node iteration 260.

Upon the completion of step 282, the current node iteration advances to step 284. There the NODESCORE 134 for the current node is compared against the WORDSCORE in variable 124 in the current word record 116. If the current NODESCORE is better than WORDSCORE, WORDSCORE is set equal to NODESCORE. At the start of each current word iteration 258 in a step not illustrated in the drawings, the value of WORDSCORE is set equal to 255, the highest, and thus least likely, probability score allowed by the system. Thus at the end of the current word iteration the value stored in WORDSCORE is equal to the lowest, or best, NODESCORE in the current word model.

After step 284, the current node iteration advances to step 286. In step 284 the NODESCORE of the current node is compared against the value of NORM'. If it is better, or lower, than NORM', its value is stored in place of the former value of NORM'. Since the value of NORM' is set to 255 at the start of each frame iteration, in a step not illustrated, and since the value of each active node of each active word is compared against NORM' during each frame iteration, the value of NORM' at the end of the frame iteration is left equal to the best, or lowest, NODESCORE of any node of any word of the currently active vocabulary. At the end of each frame iteration the value of NORM' is transferred to a related variable NORM in a step not illustrated. Thus during any given frame iteration the value NORM stores the best score of any node calculated during the previous frame iteration. It is this value NORM which is used in steps 250, 254 and 268, discussed above.

After step 286, the current node iteration advances to step 288, in which a test is made to see if the current node is the last node of the current word. If so, a comparison is made between the NODESCORE of the current node and ENDSCORE. As was stated above with regard to step 254, ENDSCORE is the current best score for any dynamic programming path through the network of all words which reaches the ending silence node of that network. If the current NODESCORE is better than ENDSCORE, its value is stored in ENDSCORE, and the WORD ID of the current word is stored in a variable called BESTWORD.

With the completion of step 288, the iteration 260 for the current node is finished.

Once the node iteration 260 has been completed for each active node of the current word, the current word iteration 258 advances to step 262. In this step the WORDSCORE for the current word is compared with a threshold. If its value is higher, or worse, than threshold, the current word is removed from the currently active vocabulary. As is illustrated in FIG. 19, the step 226 contains two alternate steps 290 and 292. If the WORDSCORE is worse than threshold, the program executes step 290. There the NEXT ACTIVE WORD POINTER in the word record 116 of the previous word in the currently active vocabulary is set equal to the value of the NEXT ACTIVE WORD POINTER in the word record of the word to be deleted. The program uses a variable PREVIOUS ACTIVE WORD, described below, to indicate the previous word in the currently active vocabulary. As a result of step 290, the NEXT ACTIVE WORD POINTER in the previous word ceases to point to the word to be deleted, but instead points directly to the next word in the currently active vocabulary, causing the current word to be removed from the linked list of the currently active vocabulary.

If, on the other hand, the WORDSCORE is better than threshold, indicating that the current word is not to be removed from the currently active vocabulary, the step 292 sets the variable PREVIOUS ACTIVE WORD used in step 290 to the address of the current word record. This enables step 290, when performed in the next word iteration 258, to point to the current word, which will then be the previous active word in the currently active vocabulary list.

In the preferred embodiment of the invention the threshold used in step 262 is the same as that used in steps 256 and 282. Preferably it has a value which can be adjusted to any number from 175 to 255. When the threshold is set to 175 the lengthy match computation 106 runs much more rapidly, because it prunes out words more quickly, but it also incurs a higher risk of pruning out the correct word. On the other hand, when the threshold is set to 255, the computation 106 runs more slowly, but is more likely to get the correct answer. Thus the proper setting for the threshold depends upon the particular speech recognition task being performed.

With the completion of step 262 the iteration 258 for the current word is complete.

Once the word iteration 258 has been completed for each word in the currently active vocabulary, the current frame iteration 106 is advanced to its last step, step 294. By the time the frame iteration reaches step 294 the WORDSCORE of each active word has been updated and all the words with updated WORDSCORE values worse than threshold have been removed from the currently active vocabulary. Also by the time the current frame iteration reaches step 294, ENDSCORE has the score, and BESTWORD has the WORD ID, of the currently best scoring complete path through any word model. Step 294 checks to see if any word with a WORD ID different from BESTWORD is left in the currently active vocabulary 112 to compete with the current BESTWORD. If not, step 294, sets the variable PREVIOUS WORD, used for language score calculations in the recognition of the next word, equal to BESTWORD, and exits the computation shown in FIG. 8 with BESTWORD as the recognized word. The CPU 64 can then take the WORD ID stored in BEST-WORD and use it for purposes of an application program run in conjunction with the speech recognition program. Such an application program might interpret BESTWORD as a command, or it may display the word associated with BESTWORD on the monitor 52, as is shown in FIG. 8.

The step 294 determines that there is no word left in the currently active vocabulary to compete with the current BESTWORD when either (a.) there are no words left in the currently active vocabulary, in which case the LIST START POINTER 146 would have its value set to the END OF LIST value, or (b.) there is only one word left in the currently active vocabulary list and it is the BESTWORD. If, however, there are words in the currently active vocabulary to compete with BESTWORD, the sequence of steps in the iteration 106 is repeated for the next successive frame of acoustic data.

Thus it can be seen that the embodiment of the invention shown in FIG. 8 provides a means for making a dynamic programming comparison for each active node of each active word against each successive frame of acoustic data, and for repeating such comparisons until there are no words left in the currently active vocabulary to compete with the word having the optimally scoring match through all of the nodes of its word model.

Referring now to FIGS. 20 through 25b, an alternate embodiment of the present invention is shown. This alternate embodiment is very similar to that shown in FIG. 8, but it has been modified slightly to greatly improve the ease with which a user can confirm its output when the system recognition is correct and can modify that output when its recognition is in error.

Figure 20:
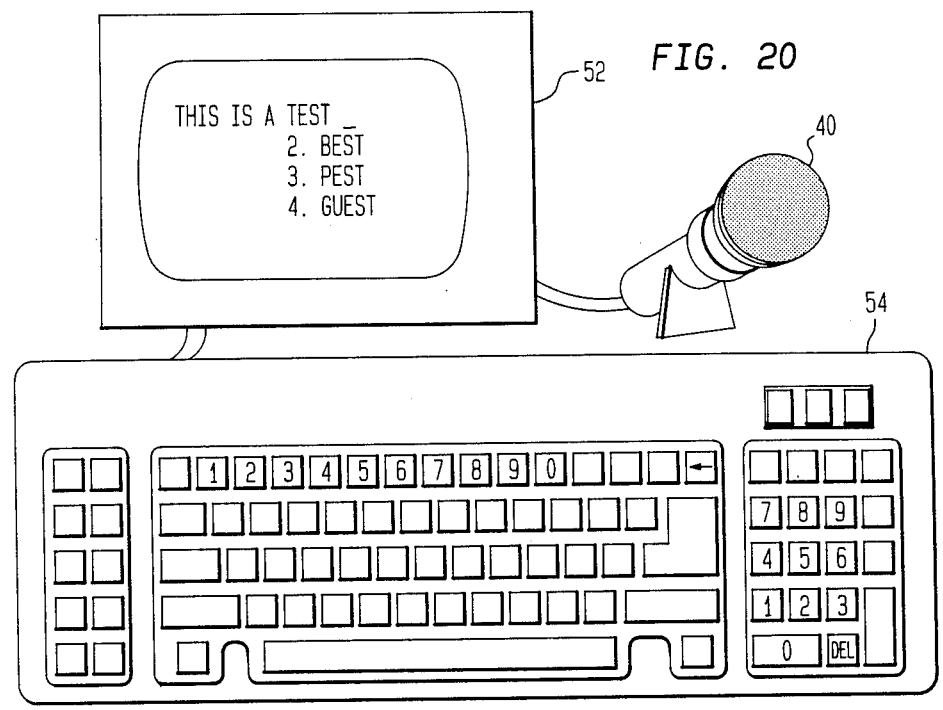
FIG. 20 is a perspective view of the microphone, computer monitor, and computer keyboard shown in FIG. 1, which shows, on the screen of the computer monitor, how a preferred embodiment of the present invention responds to the utterance of a given sequence of words.

FIG. 20 shows the monitor 52, the microphone 40, and the keyboard 54 of the hardware system illustrated in FIG. 1 as they are positioned to be used by an operator of the alternate embodiment of the present invention. The screen of the monitor 52 shows a hypothetical example of the output of the system after a sequence of four words have been spoken to the microphone 40. According to this alternate embodiment, when a given word is spoken, the system responds by placing the best guees word, that is, the word with the best recognition score, on the screen. The system positions the best guess word on the screen after any words that have been previously recognized. In addition, the system places immediately below the best guess word one or more close call words, which are the words which have the next best recognition scores to the best guess word.

In the embodiment shown, the system displays the three closest scoring words to the best guess word, although in other embodiments a greater or smaller number of close call words could be used. In the preferred embodiment close call words are only displayed if their score is better than a given threshold, so that the operator will only be presented with close call words if their recognition scores indicate they have a reasonable chance of being correct.

Figure 21:
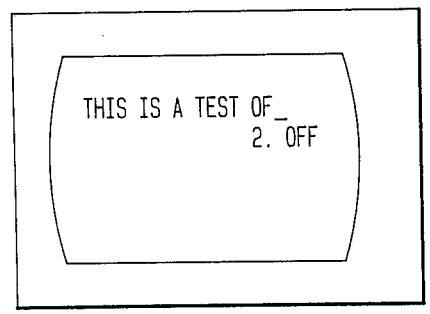
FIG. 21 shows how the embodiment of the invention, the output of which is shown in FIG. 20, responds to the utterance of another word.

According to this alternate embodiment, if the user of the system commences to utter another word, the system interprets this utterance as a confirmation that the best guess word is in fact the intended word. This is illustrated in FIG. 21, which illustrates a typical response of the system if the user follows the utterance of the best guess word "test" shown in FIG. 20 with the utterance of the word "of".

Figure 22:
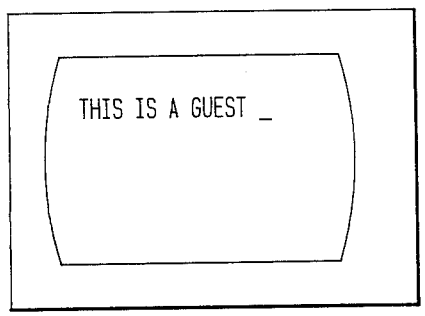
FIG. 22 shows how the embodiment of the invention, the output of which is shown in FIG. 20, responds to the hitting of a key associated with the close call word "guest"

The alternate embodiment offers the user the option of generating a signal associated with a given one of the close call words to indicate to the system that the given close call word is the intended word. In the preferred embodiment illustrated in FIG. 20, each of the close call words has displayed with it a number. Pushing the key on keyboard 54 which corresponds to the number displayed with a given close call word indicates to the system that the close call word is the intended word. FIG. 22 illustrates what the preferred embodiment does if the operator presented with the screen shown in FIG. 20 pushes the number four key, indicating that the word "guest" is the intended word, rather than the best guess word "test".

Figure 23:
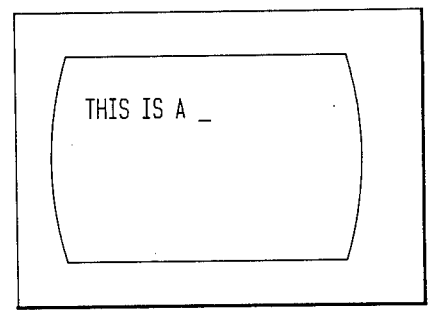
FIG. 23 shows how the embodiment of the invention, the output of which is shown in FIG. 20, responds to the striking of a delete key.

According to the preferred embodiment of this interactive aspect of the invention the user has a third option, that of generating a signal, such as by pushing the delete key on the keyboard 54, to indicate that neither the best guess word nor any of the close call words are in fact the intended word. If the operator uses this third option, the best guess word and all the close call words and their associated numbers are removed from the screen, as is indicated in FIG. 23, and the cursor is repositioned for the recognition of another word at the location formerly occupied by the best guess word.

Figure 25A:
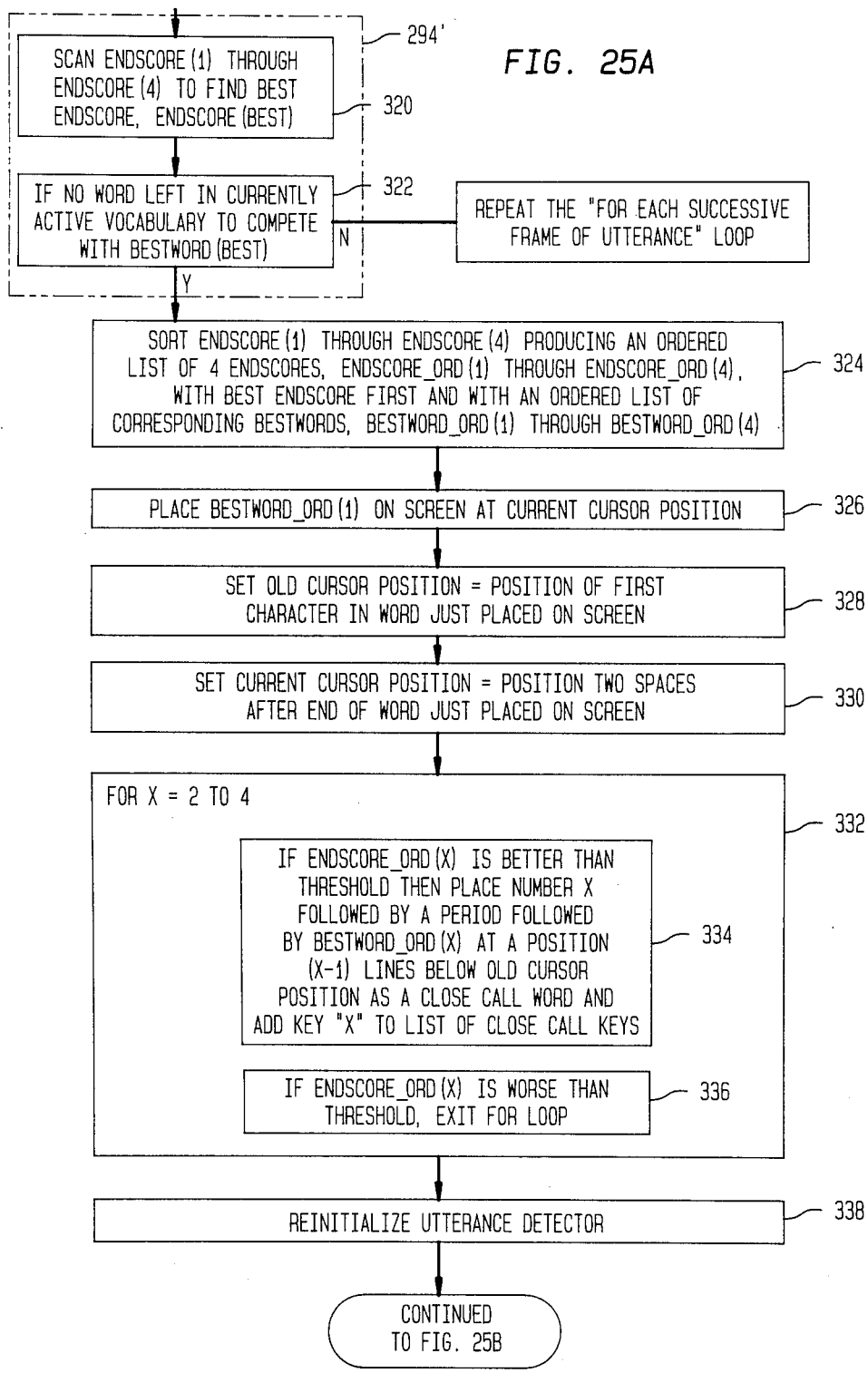

Referring now to FIGS. 24, 25a and 25b, a description is made of how the program of FIG. 8 is modified to produce this more interactive embodiment of the invention. FIG. 24 illustrates a functional block 288' which is used, in the interactive embodiment, in place of the block 288 shown in FIG. 8. You will remember that block 288 of FIG. 8 replaced the single value ENDSCORE with the NODESCORE of the last node of a word model if the NODESCORE was better than ENDSCORE. Block 288 also caused the corresponding word to be stored in the single variable BESTWORD. In the interactive embodiment of the invention, however, there are four ENDSCORES, ENDSCORE(1) thru ENDSCORE(4) and four corresponding BEST-WORDS, BESTWORD(1) thru BESTWORD(4), to enable the system to display not only the best scoring best guess word, but also the three next closest scoring close call words.

The step 288' is performed in each node iteration 260 of the interactive embodiment of the invention. Like step 288 of FIG. 8, step 288' checks to see whether the current node is the last node in the word. But unlike step 288, if so, it checks to see whether the current node's NODESCORE is better than the fourth best of the four ENDSCORES. If it is, step 288' does the following: It stores the current node's NODESCORE in place of the previous value of the fourth best END-SCORE. It stores the WORD ID of the current word in the BESTWORD associated with the fourth best END-SCORE. And it scans each of the four ENDSCORES, ENDSCORE(1) thru ENDSCORE(4) to find the one having the highest, or worst, value. Then it stores the index (either 1, 2, 3 or 4) of that fourth best END- SCORE, so that the next time step 288's is executed it knows which of the four ENDSCORES to compare against the current NODESCORE.

The other modifications made to the program of FIG. 8 to produce the interactive embodiment of the invention are illustrated in FIGS. 25a and 25b. As is indicated in these figures, the step 294 of FIG. 8 is replaced with a step 294' and a sequence of additional steps 324 through 374 are performed when step 294 exits from frame iterations 106.

Step 294' includes two sub-steps 320 and 322. In step 320, each of the four ENDSCORES, ENDSCORE(1) thru ENDSCORE(4) are scanned to find which of them has the lowest, or best, score. In step 322 a check is made to see if there is any word left in the currently active vocabulary to compete with the BESTWORD corresponding to the best scoring ENDSCORE. As was stated above, the program will consider there is no such competing word if either a. there is no word left in the currently active vocabulary or b. there is only one word left in that vocabulary and it is the word having the best ENDSCORE. If there still are words left in the currently active vocabulary to compete with the best ENDSCORE, the program starts another frame iteration 106. If not, the program assumes it has completed its recognition of the utterance and exits from the frame iterations.

When the program makes such an exit, it proceeds to step 324, which sorts ENDSCORE(1) thru ENDSCORE(4), producing an ordered list of the ENDSCORES, with the best scoring first. To reduce confusion in FIGS. 25a and 25b these ordered ENDSCORES are referred to as ENDSCORE_ORD(1) through ENDSCORE_ORD(4). Similarly, the BESTWORDs corresponding to these ordered ENDSCORES are labeled BESTWORD_ORD(1) thru BESTWORD_ORD(4).

After the ENDSCORES and BESTWORDS have been ordered, the program advances to step 326, in which it places the best scoring BESTWORD, BESTWORD_ORD(1) on the screen at the current cursor position. In step 328 the program sets a variable called OLD CURSOR POSITION equal to the position of the first character in the word just placed on the screen. Then in step 330 the program sets the variable CURRENT CURSOR POSITION equal to a position two spaces after the end of the word just placed on the screen.

Next the program advances to step 332, in which it performs an iteration for each of the three remaining BESTWORDS. To be more exact, the iteration is performed for each of three successive values, 2, 3, and 4, of an index x. During each of these iterations 332 one of two alternate steps 334 or 336 is performed. If ENDSCORE_ORD(x) is better than a given threshold, indicating that it is a sufficiently probable close call to warrant placing it on the monitor screen, step 334 places the current value of the index x, either 2, 3, or 4, on the screen at a position x−1 lines below the old cursor position. After that number it places a period and then BESTWORD_ORD(x) on the screen. Then it places the key on keyboard 54 corresponding to the number x on a list of close call keys which is referred to in step 340, discussed below. If, on the other hand, ENDSCORE_ORD(x) is worse than threshold, step 336 cause the program to exit the loop 332. This is done because, if the current ENDSCORE_ORD(x) is worse than threshold, all the remaining ENDSCORES_ORD(x) will also be worse than threshold.

Once the iteration 332 has been performed for each of the remaining three ordered ENDSCORES, the program advances to a step 338 in which the utterance detector 48 is initialized by setting its counter 72 back to zero. This enables the utterance detector 48 to signal the detection of another utterance as soon as it should occur. It is accomplished by sending a reset signal from the computer 50 over a line not shown in the figures.

Referring now to FIG. 25b, once step 338 is complete the program advances to a cycle composed of steps 340, 342, and 344. In step 340 the program checks to see if one of the keys in the close call list has been struck. If not, it advances to step 342, where it checks to determine whether the delete key has been struck. If not, the program then advances to step 344, to see whether or not the start of another utterance has been detected. If not it starts the cycle all over again by returning to step 340. The program repeatedly sequences through step 340, 342 and 344 until one of the three conditions of these steps is met.

If one of the keys in the close call list is struck, step 340 causes the program to branch to step 346, which consists of a sequence of sub-steps 348, 350, 352, 354 and 356. If one of the keys on the close call list is struck, it is an indication by the user that the close call word associated with the key struck, rather than the best guess word, is the intended word. Thus, in step 348 the program erases the word at the OLD CURSOR POSITION, which is the best guess word. Then in step 350 the program erases all of the close call words from the lines beneath the OLD CURSOR POSITION. Once these erasures have been made, the program, in step 352, places the BESTWORD_ORD(x) corresponding to the key (X) which has been struck at the OLD CURSOR POSITION. The program then advances to step 354, in which it sets the variable PREVIOUS WORD equal to the BESTWORD_ORD(x) corresponding to the close call key (X) which has been struck. This enables the language score means 114 to use the selected close call word as its PREVIOUS WORD when making language score calculations during the recognition of the next utterance. The program then advances to step 356, in which it sets the CURRENT CURSOR POSITION equal to a position two spaces after the end of the word just placed on the screen. In the example of FIG. 20, the functions of block 346 would make the screen have the appearance shown in FIG. 22.

Once block 346 is complete the program advances to step 358, where it waits for the start of another utterance to be detected. As soon as such another utterance is detected, the program then goes to step 374, in which it reinitializes the entire speech recognition system for the recognition of a new word. Then the program advances to repeat all of the computations shown in FIG. 8, as modified for the interactive embodiment of the invention, for the next utterance of the word.

If a delete key is struck instead of a close call key, step 342 causes the program to advance to the program block 360. This block contains three steps, 362, 364 and 366. When the delete key is struck, it indicates that neither the best guess word nor any of the close call words correspond to the intended word. For this reason step 362 causes the word at the OLD CURSOR POSITION, that is the former best guess word, to be removed from the screen. Similarly, step 364 causes all the close call words to be erased from the screen. Finally step 366 sets the CURRENT CURSOR POSITION equal to the OLD CURSOR POSITION, which was the cursor position of the first character of the former best guess word. Thus after performing the steps 362, 364 and 366, the example screen shown in FIG. 20 would be converted to have the appearance shown in FIG. 23. After the completion of these three steps the program advances to step 358 where it waits for the start of the detection of another utterance before initiating another recognition cycle.

If the step 344 detects the utterance of another word before the stricking of a close call or delete key, the program advances to block 368, which is comprised of two steps, 370 and 372. The detection of such another utterance, is interpreted as an indication by the user that the best guess word was the intended word. Thus step 370 erases all the close call words from the lines beneath the OLD CURSOR POSITION. Then step 372 sets the PREVIOUS WORD variable equal to the best guess word, so that during the recognition of the next utterance the language scores can be calculated based on the confirmed recognition of the best guessed word as the PREVIOUS WORD. The operation of block 368, makes the screen of the example shown in FIG. 20 have the appearance of FIG. 21. Once the step 372 has been completed, the program advances to a step 374, where it reinitializes the speech recognition system, and then commences another recognition cycle.

Thus it can be seen that the interactive embodiment of the invention described with regard to FIGS. 20 thru 25b enables an operator to dictate a sequence of words and to indicate to the system in a convenient manner whether it approves or disapproves of the recognition performed by the system. If the system makes a mistake, this interactive embodiment enables the operator to take advantage of the system's alternate, or close call, recognition choices in a convenient manner.

It should be understood by those skilled in the art that other means could be provided for enabling an operator to select one of the close call words or to delete the best guess word and all of the close call words. One such method would be to define certain utterances to which the system would respond as commands to be obeyed rather than words to be displayed. In such a system the speaking of any utterance other than that of such command words would be interpreted as confirmation of the best guess word. A command word associated with a given close call word would be used to indicate that the given close call word was the intended word. The speaking of a command word corresponding to the rejection of both the best guess word and all of the close call words would indicate that none of those words were the intended word.

Preferably the interactive capabilities of the embodiment of the invention described with regard to FIGS. 20–25b are further enhanced by interfacing that embodiment to a software package which enables the operator to type text onto the screen at the CURRENT CURSOR POSITION. Preferably such a software package has the text editing and cursor movement capabilities of a standard word processor. It is well within the skill of professionals in the art of interfacing personal computer programs to make such an interface which would have the word processor respond to the output of the speech recognition system as input text and which would respond to the actuation of keys associated with close call words or the above described delete function in the manner discussed with regard to FIGS. 20–25b. Such a system would enable the operator to type in words the system didn't understand, as well as edit words the system did understand once such words have been dictated.

It can be seen that new and improved speech recognition systems have been described above having significant advantages over speech recognition devices used in the prior art. It should be appreciated that modifications to the described embodiments may be made by those of ordinary skill applying the principles of the present invention to form such modified embodiments. For example, the preferred embodiments described above are speech recognition systems, but it will be clear to those skilled in the art of pattern recognition that certain broad aspects of the present invention are applicable to pattern recognition in general and are not limited to speech recognition. Similarly, the described embodiments of the invention are all discrete utterance systems, that is, systems designed to recognize the words in their vocabulary when those words are spoken separately, with a pause preceding and following them. It will be understood, however, that many aspects of the present invention are applicable to continuous speech recognition systems, which can recognize words spoken as part of a continuously uttered sequence of words.

The preferred embodiments described above are frame based systems, but it will be clear to those skilled in the speech recognition art that many of its aspects could be used with other types of speech recognition systems, such as feature extraction systems. Similarly, it should be understood that the present invention can be used with frame based systems which use more frame parameters, or other frame parameters, than those described above. The embodiments described above use eight bit arithmetic for their probability calculations, but it should be understood that the present invention can be used with sixteen bit or other precision arithmetic.

The described embodiments use language score means to aid in their calculation of word likelihoods. Its will be understood by those skilled in the art that many aspects of the present invention are applicable to systems which do not use such language score means. In addition, in the described embodiments the initial vocabulary over which the rapid match is performed is the entire vocabulary which the system is capable of recognizing. It should be understood, however, that in alternate embodiments of the present invention the initial vocabulary over which the rapid match is performed may be a subset of a larger total vocabulary which the system is capable of recognizing. For example, the system may perform the rapid match on an initial vocabulary, such as one of one thousand words, and perform the lengthy match on those words which score relatively well in the rapid match. However if the score of the best scoring word in the lengthy match is worse than a certain threshold, the system could then perform matches on those words in a much larger vocabulary, such as one of fifty thousand words, which are similar in sound to the better scoring words in the lengthy match.

Accordingly, the present invention should not be considered to be limited by the description herein of the preferred embodiments, but rather should be interpreted in accordance with the following claims.

What we claim is:

1. A speech recognition system for recognizing a word corresponding to a given utterance spoken after one or more preceding words, said system comprising:

means for storing an acoustic model of a given word;

means for making a word match score corresponding to the probability that said given word corresponds to acoustic data generated by said utterance, including means for making successive partial comparisons between said acoustic model and said acoustic data and for successively updating said word match score after each such partial comparison;

context storing means for storing a language context derived from one or more words spoken prior to said given utterance;

language score introducing means, including means for generating a language score for said given word corresponding to a language model probability estimate of the probability that said given word would occur given the language context stored in said context storing means and means for separately altering said word match score after each of a plurality of said partial comparisons by an amount corresponding to said language score; and means for stopping said means for making a word match score from making further partial comparisons between said acoustic model of a given word and said acoustic data when the word match score for that given word is worse than a given threshold.

2. A speech recognition system as described in claim 1, wherein said language score introducing means means for altering said word match score includes means for altering said match score after each of a given number of said partial comparisons and for causing the total amount by which said language score introducing means alters said word match score over all of said given number of partial comparisons to substantially equal the value of said language score.

3. A speech recognition system as described in claim 1, wherein said word match score is a logarithmic function of an estimate of the probability that said given word corresponds to the acoustic data generated by said utterance and said language score is a logarithmic function of said language model probability estimate, and said means for altering said word match score after each of a plurality of partial comparisons includes means for adding a fraction of said language score to said word match score after each of said plurality of partial comparisons.

4. A speech recognition method for recognizing a word corresponding to a given utterance spoken after one or more preceding words, said method comprising:

storing an acoustic model of a given word;

making a word match score corresponding to the probability that said given word corresponds to acoustic data generated by said utterance, including making successive partial comparisons between said acoustic model and said acoustic data and successively updating said word match score after each such partial comparison;

storing a language context derived from one or more words spoken prior to said given utterance;

generating a language score for said given word corresponding to a language model probability estimate of the probability that said given word would occur given said stored language;

separately altering said word match score after each of a plurality of said partial comparisons by an amount corresponding to said language score; and stopping further partial comparisons between said acoustic model of a given word and said acoustic data when the word match score for that given word is worse than a given threshold.

5. A speech recognition method as described in claim 4, wherein said altering of said word match score includes altering said match score after each of a given number of said partial comparisons and causing the total amount by which said word match score is altered over all of said given number of partial comparisons to substantially equal the value of said language score.

6. A speech recognition method as described in claim 4, wherein said word match score is a logarithmic function of an estimate of the probability that said given word corresponds to the acoustic data generated by said utterance and said language score is a logarithmic function of said language model probability estimate, and said altering of said word match score after each of a plurality of partial comparisons includes adding a fraction of said language score to said word match score after each of said plurality of partial comparisons.

7. A speech recognition system for recognizing a word corresponding to a given utterance spoken after one or more preceding words, said system comprising:

means for storing an acoustic model of each of a plurality of words belonging to an originally active vocabulary;

currently active vocabulary means for indicating which words in said originally active vocabulary belong to a currently active vocabulary;

means for causing said currently active vocabulary means to originally indicate that all the words in said originally active vocabulary are in said currently active vocabulary;

means for making a word match score for each word in said originally active vocabulary corresponding to the probability that each such word corresponds to acoustic data generated by said utterance, including means for making a succession of estimation cycles, in each of which, for each word in said currently active vocabulary, a partial comparison is made between the acoustic model of said word and said acoustic data and in each of which said word match score for said word is updated in response to said partial comparison;

context storing means for storing a language context derived from one or more words spoken prior to said given utterance;

language score introducing means for generating language scores for individual words for which said partial comparisons are made and for altering, during each of a plurality of said estimation cycles, the word match score of each such word by an amount corresponding to the language score of each such word, each of said language scores corresponding to a language model probability estimate of the probability that a given word would occur in the language context stored in said context storing means; and means for causing said currently active vocabulary means to indicate that a given word is no longer in said currently active vocabulary when the word match score for said word is worse than a given threshold.

8. A speech recognition system as described in claim 7, wherein said language score introducing means' means for altering word match scores includes means for altering said match score for a given word during each of a given number of estimation cycles and for causing the amount by which said language score introducing means alters said word match score over all of said given number of estimation cycles to substantially equal the value of said language score.

9. A speech recognition system as described in claim 7, wherein said word match score for a given word is a logarithmic function of an estimate of the probability that said given word corresponds to the acoustic data generated by said utterance and said language score for said given word is a logarithmic function of said language model probability estimate for said given word, and said means for altering said word match score after each of a plurality of partial comparisons includes means for adding a fraction of said language score to said word match score after each of said plurality of partial comparisons.

10. A speech recognition system as described in claim 9, wherein said language score introducing means' means for altering word match scores includes means for altering said word match score for a given word for each of a given number of estimation cycles and for causing the amount by which said language score introducing means alters said word match score during each of said given number of estimation cycles to correspond to the value of said language score for said given word divided by said given number.

11. A speech recognition system as described in claim 7, wherein said language score introducing means' means for altering said word match score for a given word during a given estimation cycle includes means for altering said match score by an amount which is normalized for each given language context stored in said context storing means so that the language scores corresponding to the lowest likelihood language model probability estimates in each language context have approximately the same effect on said word match scores.

12. A speech recognition system as described in claim 7,
further including means for receiving said acoustic data generated by said utterance as a sequence of frames, each of which includes a vector of parameters indicating acoustic properties of the utterance during a given period of time; and
wherein said means for making a succession of estimation cycles includes means for making a separate estimation cycle for each of a succession of said frames.

13. A speech recognition system as described in claim 12, wherein:
said means for storing an acoustic model of each of a plurality of words includes means for storing for each such acoustic model a sequence of nodes, each of which has a vector of parameters corresponding to that of said frames;
said means for making a word match score includes dynamic programming means for seeking to optimally match a succession of said frames against the sequence of nodes in the acoustic model of each word in said originally active vocabulary, and said means for making a succession of estimation cycles includes means for making, for each of a plurality of nodes in the acoustic model of each word in said currently active vocabulary, during each estimation cycle, a comparison between said node and a given frame, means for using said comparison to update a node match score associated with each such node, each such node match score being a function of the probability of an optimal dynamic programming path to said node through the previous nodes of its corresponding acoustic model, and means for selecting the most probable node match score for a given word as its word match score, and
said language score introducing means including means for storing, for each of said plurality of nodes associated with each word in said currently active vocabulary, a word start value which indicates at what frame, according to the optimal path associated with said node, the utterance of said word began, means for altering, during each of a plurality of estimation cycles, the node match score of each of said plurality of nodes by an amount corresponding to the language score of each such node's associated word, and means for using said word start value to determine during which plurality of estimation cycles to alter the node match score associated with said node.

14. A speech recognition system as described in claim 8, wherein said means for causing said currently active vocabulary means to indicate that a given word is no longer in said currently active vocabulary when the word match score for said word is worse than a given threshold includes means for varying the value of said threshold relative to said word match score as a function of changes in the word match score generated for one or more other words in said currently active vocabulary.

15. A speech recognition system as described in claim 14, wherein said means for varying said threshold includes means for setting the value of said threshold relative to said word match scores as a function of the value of the word match score indicating the greatest likelihood of occurrence of any word in the currently active vocabulary.

16. A speech recognition method for recognizing a word corresponding to a given utterance spoken after one or more preceding words, said method comprising:
storing an acoustic model of each of a plurality of words belonging to an originally active vocabulary;
indicating which words in said originally active vocabulary belong to a currently active vocabulary;
originally indicating that all the words in said originally active vocabulary are in said currently active vocabulary;
making a word match score for each word in said originally active vocabulary corresponding to the probability that each such word corresponds to acoustic data generated by said utterance, including making a succession of estimation cycles, in each of which, for each word in said currently active vocabulary, a partial comparison is made between the acoustic model of said word and said acoustic data and in each of which said word match score for said word is updated in response to said partial comparison;
storing a language context derived from one or more words spoken prior to said given utterance;
generating language scores for individual words for which said partial comparisons are made;

altering, during each of a plurality of said estimation cycles, the word match score of each such word by an amount corresponding to the language score of each such word, each of said language scores corresponding to a language model probability estimate of the probability that a given word would occur in said stored language context; and indicating that a given word is no longer in said currently active vocabulary when the word match score for said word is worse than a given threshold.

17. A speech recognition method as described in claim 16, wherein said altering of word match scores includes altering said match score for a given word during each of a given number of estimation cycles and for causing the amount by which said language score alters said word match score over all of said given number of estimation cycles to substantially equal the value of said language score.

18. A speech recognition method as described in claim 16, wherein said word match score for a given word is a logarithmic function of an estimate of the probability that said given word corresponds to the acoustic data generated by said utterance and said language score for said given word is a logarithmic function of said language model probability estimate for said given word, and said altering of said word match score after each of a plurality of partial comparisons includes adding a fraction of said language score to said word match score after each of said plurality of partial comparisons.

19. A speech recognition method as described in claim 18, wherein said altering of word match scores includes altering said word match score for a given word for each of a given number of estimation cycles and for causing the amount by which said language score alters said word match score during each of said given number of estimation cycles to correspond to the value of said language score for said given word divided by said given number.

20. A speech recognition method as described in claim 16, wherein said altering of said word match score for a given word during a given estimation cycle include altering said match score by an amount which is normalized for each given stored language context so that the language scores corresponding to the lowest likelihood language model probability estimates in each language context have approximately the same effect on said word match scores.

21. A speech recognition method as described in claim 16:
further including receiving said acoustic data generated by said utterance as a sequence of frames, each of which includes a vector of parameters indicating acoustic properties of the utterance during a given period of time; and
wherein said making of a succession of estimation cycles includes making a separate estimation cycle for each of a succession of said frames.

22. A speech recognition method as described in claim 21, wherein:
said storing of an acoustic model of each of a plurality of words includes storing for each such acoustic model a sequence of nodes, each of which has a vector of parameters corresponding to that of said frames;
said making of a word match score includes seeking through the use of dynamic programming to optimally match a succession of said frames against the sequence of nodes in the acoustic model of each word in said originally active vocabulary, and said making of a succession of estimation cycles includes making, for each of a plurality of nodes in the acoustic model of each word in said currently active vocabulary, during each estimation cycle, a comparison between said node and a given frame, using said comparison to update a node match score associated with each such node, each such node match score being a function of the probability of an optimal dynamic programming path to said node through the previous nodes of its corresponding acoustic model, and selecting the most probable node match score for a given word as its word match score, and
said altering of the word match score of each word includes storing, for each of said plurality of nodes associated with each word in said currently active vocabulary, a word start value which indicates at what frame, according to said optimal path to said node, the utterance of said word began; altering, during each of a plurality of estimation cycles, the node match score of each of said plurality of nodes by an amount corresponding to the language score of each such node's associated word; and using said word start value to determine during which plurality of estimation cycles to alter the node match score associated with said node.

23. A speech recognition method as described in claim 16, wherein said indicating that a given word is no longer in said current active vocabulary when the word match score for said word is worse than a given threshold includes varying the value of said threshold relative to said word match score as a function of changes in the word match score generated for one or more other words in said currently active vocabulary.

24. A speech recognition method as described in claim 23, wherein said varying of said threshold includes setting the value of said threshold relative to said word match scores as a function of the value of the word match score indicating the greatest likelihood of occurrence of any word in the currently active vocabulary.

25. A pattern recognition system for recognizing an individual pattern in a collection of data given a context of one or more other patterns which have been previously identified, said system comprising:
means for storing a model of a given pattern;
means for making a pattern match score corresponding to the probability that said given pattern corresponds to said collection of data, including means for making successive partial comparisons between said pattern's model and said data and for successively updating said pattern match score after each such partial comparison;
context storing means for storing a context derived from one or more patterns which have been previously identified;
context score introducing means, including means for generating a context score for said given pattern corresponding to a context probability estimate of the probability that said given pattern would occur given the context stored in said context storing means and means for separately altering said pattern match score after each of a plurality of said partial comparison by an amount corresponding to said context score; and means for stopping said means for making a pattern match score from making further partial comparisons between said model and said data when the pattern match score for that given pattern is worse than a given threshold.

26. A pattern recognition system as described in claim 25, wherein said context score introducing means' means for altering said pattern match score includes means for altering said match score after each of a given number of partial comparisons and for causing the total amount by which said context score introducing means alters said pattern match score over all of said given number of partial comparisons to substantially equal the value of said context score.

27. A pattern recognition system as described in claim 25, wherein said pattern match score is a logarithmic function of an estimate of the probability that said given pattern corresponds to said collection of data and said context score is a logarithmic function of said context probability estimate, and said means for altering said pattern match score after each of a plurality of partial comparisons includes means for adding a fraction of said context score to said pattern match score after each of said plurality of partial comparisons.

28. A pattern recognition method for recognizing an individual pattern in a collection of data given a context of one or more other patterns which have been previously identified, said method comprising:
storing a model of a given pattern;
making a pattern match score corresponding to the probability that said given pattern corresponds to said collection of data, including making successive partial comparisons between said pattern's model and said data and for successively updating said pattern match score after each such partial comparison;
storing a context derived from one or more patterns which have been previously identified;
generating a context score for said given pattern corresponding to a context probability estimate of the probability that said given pattern would occur given said stored context;
separately altering said pattern match score after each of a plurality of said partial comparison by an amount corresponding to said context score; and
stopping further partial comparisons between said model and said data when the pattern match score for that given pattern is worse than a given threshold.

29. A pattern recognition method as described in claim 28, wherein said altering of said pattern match score includes altering said match score after each of a given number of partial comparisons and causing the total amount by which said pattern match score is altered over all of said given number of partial comparisons to substantially equal the value of said context score.

30. A pattern recognition method as described in claim 28, wherein said pattern match score is a logarithmic function of an estimate of the probability that said given pattern corresponds to said collection of data and said context score is a logarithmic function of said context probability estimate, and said altering of said pattern match score after each of a plurality of partial comparisons includes adding a fraction of said context score to said pattern match score after each of said plurality of partial comparisons.

31. A pattern recognition system for recognizing an individual pattern in a collection of data given a context of one or more other patterns which have been previously identified, said system comprising:
means for storing a model of each of a plurality of patterns belonging to an originally active set of patterns;
currently active set means for indicating which patterns in said originally active set belong to a currently active set of patterns;
means for causing said currently active set means to originally indicate that all the patterns in said originally active set are in said currently active set;
means for making a pattern match score corresponding to the probability that each pattern in said originally active set occurs in said collection of data, including means for making a succession of estimation cycles, in each of which, for each pattern in said currently active set, a partial comparison is made between the model of said pattern and said collection of data and in each of which said pattern match score for said pattern is updated in response to said partial comparison;
context storing means for storing a context derived from one or more patterns previously identified;
context score introducing means for generating context scores for patterns for which said partial comparisons are made and for altering, during each of a plurality of said estimation cycles, the pattern match score of each such pattern by an amount which corresponds to the context score of each such pattern, each of said context scores corresponding to a context probability estimate of the probability that its associated pattern would occur in the context stored in said context storing means; and
means for causing said currently active set means to indicate that a given pattern is no longer in said currently active set when the pattern match score for said pattern is worse than a given threshold.

32. A pattern recognition system as described in claim 31, wherein said context score introducing means' means for altering pattern match scores includes means for altering said match score for a given pattern during each of a given number of estimation cycles and for causing the amount by which said context score introducing means alters said pattern match score over all of said given number of estimation cycles to substantially equal the value of said language score.

33. A pattern recognition system as described in claim 31, wherein said match score for a given pattern is a logarithmic function of an estimate of the probability that said given pattern occurs in said collection of data and said context score for said given pattern is a logarithmic function of said context probability estimate for said given pattern, and said means for altering said pattern match score after each of a plurality of partial comparisons includes means for adding a fraction of said context score to said pattern match score after each of said plurality of partial comparisons.

34. A pattern recognition system as described in claim 33, wherein said context score introducing means' means for altering pattern match scores includes means for altering said match score for a given pattern for each of a given number of estimation cycles and for causing the amount by which said context score introducing means alters said pattern match score during each of said given number of estimation cycles to correspond to the value of said context score for said given word divided by said given number.

35. A pattern recognition system as described in claim 31, wherein said means for causing said currently active set means to indicate that a given pattern is no longer in said currently active set when the pattern match score for said pattern becomes worse than a given threshold includes means for varying the value of said threshold relative to said pattern match scores as a function of changes in the match score generated for one or more other patterns in said currently active set.

36. A pattern recognition system as described in claim 35, wherein said means for varying said threshold includes means for setting the value of said threshold relative to said pattern match score as a function of the value of the pattern match score indicating the greatest likelihood of occurrence of any pattern in the currently active set.

37. A pattern recognition method for recognizing an individual pattern in a collection of data given a context of one or more other patterns which have been previously identified, said method comprising:

storing a model of each of a plurality of patterns belonging to an originally active set of patterns;

indicating which patterns in said originally active set belong to a currently active set of patterns;

causing said currently active set means to originally indicate that all the patterns in said originally active set are in said currently active set;

making a pattern match score corresponding to the probability that each pattern in said originally active set occurs in said collection of data, including making a succession of estimation cycles, in each of which, for each pattern in said currently active set, a partial comparison is made between the model of said pattern and said collection of data and in each of which said pattern match score for said pattern is updated in response to said partial comparison;

storing a context derived from one or more patterns previously identified;

generating context scores for patterns for which said partial comparisons are made;

altering, during each of a plurality of said estimation cycles, the pattern match score of each such pattern by an amount which corresponds to the context score of each such pattern, each of said context scores corresponding to a context probability estimate of the probability that its associated pattern would occur in said stored context; and indicating that a given pattern is no longer in said currently active set when the pattern match score for said pattern is worse than a given threshold.

38. A pattern recognition method as described in claim 37, wherein said altering of pattern match scores includes altering said match score for a given pattern during each of a given number of estimation cycles and for causing the amount by which said context score alters said pattern match score over all of said given number of estimation cycles to substantially equal the value of said language score.

39. A pattern recognition method as described in claim 37, wherein said match score for a given pattern is a logarithmic function of an estimate of the probability that said given pattern occurs in said collection of dta and said context score for said given pattern is a logarithmic function of said context probability estimate for said given pattern, and said altering said pattern match score after each of a plurality of partial comparisons includes adding a fraction of said context score to said pattern match score after each of said plurality of partial comparisons.

40. A pattern recognition method as described in claim 39, wherein said altering of pattern match scores includes altering said match score for a given pattern for each of a given number of estimation cycles and for causing the amount by which said context score alters said pattern match score during each of said given number of estimation cycles to correspond to the value of said context score for said given word divided by said given number.

41. A pattern recognition method ass described in claim 37, wherein said indicating that a given pattern is no longer in said currently active set when the pattern match score for said pattern becomes worse than a given threshold includes varying the value of said threshold relative to said pattern match scores as a function of changes in the match score generated for one or more other patterns in said currently active set.

42. A pattern recognition method as described in claim 41, wherein said varying of said threshold includes setting the value of said threshold relative to said pattern match score as a function of the value of the pattern match score indicating the greatest likelihood of occurrence of any pattern in the currently active set.

43. A speech recognition system for recognizing a word corresponding to a given spoken utterance, said system comprising:

means for making, for each word of an initial vocabulary, a relatively rapid scoring, which produces a rapid match score corresponding to the probability that said word corresponds to a sequence of acoustic data generated by said utterance;

means for placing a word from said initial vocabulary into an originally active vocabulary when said rapid match score for said word is better than a given threshold; and means for making, for each word of said originally active vocabulary, a more lengthy scoring, which produces a more accurate match score corresponding to the probability that such word corresponds to said sequence of acoustic data.

44. A speech recognition system as described in claim 43, wherein both said means for making a rapid scoring and said means for making a lengthy scoring include means for calculating an acoustic likelihood score indicating the closeness of a match between an acoustic model of a given word and said sequence of acoustic data.

45. A speech recognition system as described in claim 44, wherein both said means for making a rapid scoring and said means for making a lengthy scoring include means for calculating their scores for a given word based in part on a language score which corresponds to a language model probability estimate of the probability that said given word would occur given a language context derived from one or more words which have preceded said given word.

46. A speech recognition system as described in claim 44, fuerther including means for storing said sequence of acoustic data as a sequence of frames, each of which includes a vector of parameters indicating acoustic properties of the utterance during a given period of time.

47. A speech recognition system as described in claim 46, wherein said means for making a rapid scoring includes means for making said scoring based on a number of said recorded frames which is less than the number of said frames which occur normally during the utterance of a majority of the words in said initial vocabulary.

48. A speech recognition system as described in claim 46, wherein said means for making a rapid scoring includes means for averaging corresponding acoustic parameters in a plurality of said frames and means for comparing the closeness of the resulting set of averaged parameters with a corresponding set of averaged parameters associated with each word in said initial vocabulary.

49. A speech recognition system as described in claim 48, wherein said means for making a rapid scoring includes means for causing said averaging means to separately perform its averaging for each of a plurality of sequences of frames and for causing said means for comparing to compare the closeness of each of the resulting sets of averaged parameters with each of a corresponding set of parameters associated with each word in said initial vocabulary.

50. A speech recognition systems as described in claim 49, wherein said means for causing said averaging means to perform its averaging separately for each of a plurality of sequences of frames including means for causing at least two of said sequences to include one or more of the same frames.

51. A speech recognition system as described in claim 43, wherein said means for making a rapid scoring includes means for making said scoring for each word in said initial vocabulary, one word at a time and wherein said means for making a lengthy scoring includes the following:
means for storing an acoustic model of each of a plurality of words belonging to said originally active vocabulary;
currently active vocabulary means for indicating which words in said originally active vocabulary belong to a currently active vocabulary;
means for causing said currently active vocabulary means to originally indicate that all the words in said originally active vocabulary are in said currently active vocabulary;
means for making a word match score corresponding to the probability that each word in said originally active vocabulary corresponds to acoustic data generated by said utterance, including means for making a succession of estimation cycles, in each of which, for each word in said currently active vocabulary, a partial comparison is made between the acoustic model of said word and said acoustic data and in which said match score for said word is updated in response to said partial comparison; and
means for causing said currently active vocabulary means to indicate that a given word is no longer in said currently active vocabulary when the word match score for said word is worse than a given threshold.

52. A speech recognition system as described in claim 51, further including means for storing said sequence of acoustic data as a sequence of frames, each of which includes a vector of parameters indicating acoustic properties of the utterance during a given period of time; and
wherein said means for making a succession of estimation cycles includes means for making one such cycle for each of a succession of said frames and for making a comparison of the acoustic model of each of a plurality of words with said frame during said cycle.

53. A speech recognition system as described in claim 52, further including:
means for producing a start score corresponding to an estimated probability that the utterance of a word has not begun at a given point in said sequence of recorded frames; and
means for resetting said currently active vocabulary to include all the words contained in said originally active vocabulary when, after one or more estimation cycles, said means for producing a start score produces a start score which is better than a threshold.

54. A speech recognition system as described in claim 53, wherein:
said currently active vocabulary means includes means for keeping all the words in the currently active vocabulary as a linked list;
said means for causing said currently active vocabulary means to indicate that a given word is no longer in said currently active vocabulary includes means for causing said word which is no longer to be in said currently active vocabulary to be unlinked from said linked list; and
said means for resetting said currently active vocabulary includes means for causing all the words in said originally active vocabulary to be re-linked into said linked list.

55. A speech recognition system as described in claim 54, further including means for representing said initial vocabulary as a list of word records, each of which has a means for storing a pointer to another word record in said list; and
said means for causing said currently active vocabulary means to originally indicate that all the words in said originally active vocabulary are in said currently active vocabulary includes means for pointing to a word record which represents a first word in said originally active vocabulary and for causing the means for storing a pointer in each word record associated with a word in said originally active vocabulary to point to the word record associated with the next word in said originally active vocabulary when there is such a next word.

56. A speech recognition method for recognizing a word corresponding to a given spoken utterance, said method comprising:
making, for each word of an initial vocabulary, a relatively rapid scoring, which produces a rapid match score corresponding to the probability that said word corresponds to a sequence of acoustic data generated by said utterance;
placing a word from said initial vocabulary into an originally active vocabulary when said rapid match score for said word is better than a given threshold; and
making, for each word of said originally active vocabulary, a more lengthy scoring, which produces a more accurate match score corresponding to the probability that such word corresponds to said sequence of acoustic data.

57. A speech recognition method as described in claim 56, wherein both said making of a rapid scoring and said making of a lengthy scoring include calculating an acoustic likelihood score indicating the closeness of a match between an acoustic model of a given word and said sequence of acoustic data.

58. A speech recognition method as described in claim 57, wherein both said making of a rapid scoring and said making of a lengthy scoring include calculating their scores for a given word based in part on a language score which corresponds to a language model probability estimate of the probability that said given word would occur given a language context derived from one or more words which have preceded said given word.

59. A speech recognition method as described in claim 57, further including storing said sequence of acoustic data as a sequence of frames, each of which includes a vector of parameters indicating acoustic properties of the utterance during a given period of time.

60. A speech recognition method as described in claim 59, wherein said making of a rapid scoring includes making said scoring based on a number of said recorded frames which is less than the number of said frames which occur normally during the utterance of a majority of the words in said initial vocabulary.

61. A speech recognition method as described in claim 59, wherein said making of a rapid scoring includes averaging corresponding acoustic parameters in a plurality of said frames and comparing the closeness of the resulting set of averaged parameters with a corresponding set of averaged parameters associated with each word in said initial vocabulary.

62. A speech recognition method as described in claim 61, wherein said making of a rapid scoring includes causing said averaging means to separately perform its averaging for each of a plurality of sequences of frames and for causing said comparing to compare the closeness of each of the resulting sets of averaged parameters with each of a corresponding set of parameters associated with each word in said initial vocabulary.

63. A speech recognition method as described in claim 62, wherein said causing of said averaging means to perform its averaging separately for each of a plurality of sequences of frames including causing at least two of said sequences to include one or more of the same frames.

64. A speech recognition method as described in claim 56, wherein said making of a rapid scoring includes making said scoring for each word in said initial vocabulary, one word at a time and wherein said making of a lengthy scoring includes the following:
storing an acoustic model of each of a plurality of words belonging to said originally active vocabulary;
indicating which words in said originally active vocabulary belong to a currently active vocabulary;
originally indicating that all the words in said originally active vocabulary are in said currently active vocabulary;
making a word match score corresponding to the probability that each word in said originally active vocabulary corresponds to acoustic data generated by said utterance, including making a succession of estimation cycles, in each of which, for each word in said currently active vocabulary, a partial comparison is made between the acoustic model of said word and said acoustic data and in which said match score for said word is updated in response to said partial comparison; and
indicating that a given word is no longer in said currently active vocabulary when the word match score for said word is worse than a given threshold.

65. A speech recognition method as described in claim 64, further including storing said sequence of acoustic data as a sequence of frames, each of which includes a vector of parameters indicating acoustic properties of the utterance during a given period of time; and
wherein said making of a succession of estimation cycles includes making one such cycle for each of a succession of said frames and for making a comparson of the acoustic model of each of a plurality of words with said frame during said cycle.

66. A speech recognition method as described in claim 65, further including:
producing a start score corresponding to an estimated probability that the utterance of a word has not begun at a given point in said sequence of recorded frames; and
resetting said currently active vocabulary to include all the words contained in said originally active vocabulary when, after one or more estimation cycles, said producing of a start score produces a start score which is better than a threshold.

67. A speech recognition method as described in claim 66, wherein:
said indicating of which words in said originally active vocabulary belong to a currently active vocabulary includes keeping all the words in the currently active vocabulary as a linked list;
said indicating that a given word is no longer in said currently active vocabulary includes causing said word which is no longer to be in said currently active vocabulary to be unlinked from said linked list; and
said resetting of said currently active vocabulary includes causing all the words in said originally active vocabulary to be re-linked into said linked list.

68. A speech recognition method as described in claim 67, further including representing said initial vocabulary as a list of word records, each of which has a pointer to another word record in said list; and
said originally indicating that all the words in said originally active vocabulary are in said currently active vocabulary includes pointing to a word record which represents a first word in said originally active vocabulary and causing said pointer in each word record associated with a word in said originally active vocabulary to point to the word record associated with the next word in said originally active vocabulary when there is such a next word.

69. A speech recognition system for recognizing a word in a sequence of acoustic data, said system comprising:
means for storing an acoustic model of expected background noise;
means for comparing said acoustic model with successive portions of said sequence of acoustic data and producing a silence score corresponding to the probability that such successive portions of data correspond to background noise and thus that said utterance has not yet begun;
means for determining from said acoustic data the acoustic amplitude corresponding to successive portions of said data;
means for producing an accumulated sound score which corresponds a sum of to the amount of said acoustic amplitude over said successive portions of data, said accumulated sound score inversely corresponding to the probability that an utterance has not yet begun; and means, responsive to both said silence score and said accumulated sound score for determining during which of said successive portions of data to look for the start of said utterance.

70. A speech recognition system as described in claim 69, wherein said means for determining during which successive portions of said data to look for the start of said utterance further includes:

means for selecting during each successive portion of data the score from amoung said silence score and said accumulated sound score which indicates with the greatest probability that said utterance has not yet begun; and means for comparing said selected score with a threshold during each successive portion of data, and for causing said speech recognition system to look for the start of said utterance in the vicinity of said portion of data when said selected score for a given portion of said sequence is better than said threshold.

71. A speech recognition system as described in claim 69, wherein said means for producing an accumulated sound score includes means for accumulating the amount by which said acoustic amplitude exceeds an amplitude threshold during each of said successive portions of data.

72. A speech recognition method for recognizing a word in a sequence of acoustic data, said method comprising:

storing an acoustic model of expected background noise;

comprising said acoustic model with successive portions of said sequence of acoustic data and producing a silence score corresponding to the probability that such successive portions of data correspond to background noise and thus that said utterance has not yet begun;

determining from said acoustic data the acoustic amplitude corresponding to successive portions of said data;

producing an accumulated sound score which corresponds to a sum of the amount of said acoustic amplitude over said successive portions of data, said accumulated sound score inversely corresponding to the probability that an utterance has not yet begun; and determining, in response to both said silence score and said accumulated sound score, during which of said successive portions of data to look for the start of said utterance.

73. A speech recognition method as described in claim 72, wherein said determining during which successive portions of data to look for the start of said utterance further includes:

selecting during each successive portion of data the score from amoung said silence score and said accumulated sound score which indicates with the greatest probability that said utterance has not yet begun; and comparing said selected score with a threshold during each successive portion of data, and for causing said speech recognition method to look for the start of said utterance in the vicinity of said portion of data when said selected score for a given portion of said sequence is better than said threshold.

74. A speech recognition method as described in claim 72, wherein said producing of an accumulated sound score includes accumulating the amount by which said acoustic amplitude exceeds an amplitude threshold during each of said successive portions of data.

75. A speech recognition system for recogizing a word in a sequence of acoustic data frames, said system comprising:

means for storing an initial vocabulary of words;

means for performing initial computations on said sequence of acoustic data frames and for producing, in response to said computations, an originally active vocabulary, containing those words from said initial vocabulary which are determined by said initial computations to be the most probable candidates for corresponding to said acoustic data frames;

means for remembering the words contained in said originally active vocabulary;

currently active vocabulary means for indicating which words in said originally active vocabulary belong to a currently active vocabulary;

means for causing said currently active vocabulary means to initially indicate that all the words in said originally active vocabulary are in said currently active vocabulary;

means for making a word match score corresponding to the probability that each word in said currently active vocabulary corresponds to said sequence of acoustic data frames, including means for making an estimation cycle for each successive data frame, in which for each word in said currently active vocabulary, a comparison is made between the acoustic model of said word and said frame and said word match score for said word is updated in response to said comparison;

means for causing said currently active vocabulary means to indicate that a given word is no longer in said currently active vocabulary when the word match score for said word becomes worse than a given threshold;

means for producing a start score corresponding to the probability that an acoustic data frame precedes the beginning of the utterance of the word to be recognized; and means for resetting said currently active vocabulary to include all the words remembered by said means for remembering as belonging in said original vocabulary and for performing said resetting when said start score is better than a given threshold.

76. A speech recognition system as described in claim 75, wherein:

said currently active vocabulary means includes means for keeping all the words in the currently active vocabulary as a linked list;

said means for causing said currently active vocabulary means to indicate that a given word is no longer in said currently active vocabulary includes means for causing said given word to be unlinked from said linked list; and said means for resetting said currently active vocabulary includes means for causing all the words remembered by said means for remembering as being in said originally active vocabulary to be relinked into said linked list.

77. A speech recognition system as described in claim 76, further including means for representing said initial vocabulary as a list of word records, each of which has a means for storing a pointer to another word record in said list; and said means for causing said currently active vocabulary means to originally indicate that all the words in said originally active vocabulary are in said currently active vocabulary includes means for causing said currently active vocabulary means to point to said word record representing a first word in said originally active vocabulary and to cause the pointer in the word record associated with each word in a said originally active vocabulary to point to the word record of the next word in said originally active vocabulary.

78. A speech recognition method for recognizing a word in a sequence of acoustic data frames, said method comprising:

storing an initial vocabulary of words;

performing initial computations on said sequence of acoustic data frames and for producing, in response to said computations, an originally active vocabulary, containing those words from said initial vocabulary which are determined by said initial computations to be the most probable candidates for corresponding to said acoustic data frames;

remembering the words contained in said originally active vocabulary;

indicating which words in said originally active vocabulary belong to a currently active vocabulary;

initially indicating that all the words in said originally active vocabulary are in said currently active vocabulary;

making a word match score corresponding to the probability that each word in said currently active vocabulary corresponds to said sequence of acoustic data frames, including making an estimation cycle for each successive data frame, in which for each word in said currently active vocabulary, a comparison is made between the acoustic model of said word and said frame and said word match score for said word is updated in response to said comparison;

indicating that a given word is no longer in said currently active vocabulary when the word match score for said word becomes worse than a given threshold;

producing a start score corresponding to the probability that an acoustic data frame precedes the beginning of the utterance of the word to be recognized; and resetting said currently active vocabulary to include all the words remembered by said remembering as belonging in said original vocabulary and for performing said resetting when said start score is better than a given threshold.

79. A speech recognition method as described in claim 78, wherein:

said indicating which words belong to a currently active vocabulary includes keeping all the words in the currently active vocabulary as a linked list;

said indicating that a given word is no longer in said currently active vocabulary includes causing said given word to be unlinked from said linked list; and said resetting of said currently active vocabulary includes causing all the words remembered by said remembering as being in said originally active vocabulary to be relinked into said linked list.

80. A speech recognition method as described in claim 79, further including representing said initial vocabulary as a list of word records, each of which has a pointer capable of pointing to another word record in said list; and said originally indicating that all the words in said originally active vocabulary are in said currently active vocabulary includes causing a pointer to point to said word record representing a first word in said originally active vocabulary and to cause the pointers in the word record associated with each word in a said originally active vocabulary to point to the word record of the next word in said originally active vocabulary when there is such a next word.

81. A likelihood processor for use in a speech recognition system to compute a score corresponding to the probabilistic match between a vector of parameters associated with a frame of acoustic data and a node model having for each parameter in said vector both an expected value and a weighting value corresponding to the expected deviation from said expected value, said processor comprising:

parameter supplying means for supplying a digital value corresponding to a given parameter of a given frame of data;

expected value supplying means for supplying a digital value corresponding to the expected value for said given parameter according to a given node model;

first hardware means, receiving inputs from both said parameter supplying means and said expected value supplying means, for computing the absolute value of the difference between said two inputs and for producing said absolute value as a digital output;

weighting value supplying means for supplying a digital weighting value corresponding to the expected deviation from said expected value for said given parameter according to said given node model;

memory means, receiving addressing inputs from both the output of said first hardware means and said weighting value supplying means, for storing, at each of a plurality of addresses formed by combining said two addressing inputs, a parameter match score corresponding to a probability that said given parameter value corresponds to said expected value, considering said weighting value, and for producing said score as a digital output;

a hardware adder having two inputs for receiving digital values and an output at which it produces a digital value corresponding to the sum of the values supplied to its inputs;

means for connecting the output of said memory means to one input of said adder;

latch means connected to the output of said adder for latching the value produced at said output; and means for supplying the value latched by said latch means to one of the inputs of said adder, whereby said hardware adder can produce a running total of said parameter match scores.

82. A likelihood processor as described in claim 81, wherein said first hardware means includes means for limiting the numerical value of its output to a limited range which is less than the range of absolute values made possible by the range of values of its inputs, whereby the memory space required in said memory means to correspond to the address space formed by combining the output of said hardware means and said weighting value is reduced.

83. A likelihood processor as described in claim 82, wherein said means for limiting the numerical value of the output of said first hardware means includes means for causing the numerical value of said output to be equal to a value at the high end of said limited range when the actual absolute value of the difference between the inputs of said hardware means exceeds said limited range.

84. A likelihood processor as described in claim 81, wherein said memory means stores, at each of said addresses, a parameter match score which corresponds to the sum of two portions, a first portion which corresponds to the product of the output of said first hardware means and said digital weighting value and a second portion which corresponds to the logarithm of said weighting value.

85. A likelihood processor for use in a speech recognition system to compute a score corresponding to the probabilistic match between a vector of parameters associated with a frame of acoustic data and a node model having for each parameter in said vector both an expected value and a weighting value corresponding to the expected deviation from said expected value, said processor comprising:
  parameter supplying means for supplying a digital value corresponding to a given parameter of a given frame of data;
  expected value supplying means for supplying a digital value corresponding to the expected value for said given parameter according to a given node model;
  subtracting means, receiving inputs from both said parameter supplying means and said expected value supplying means, for computing the absolute value of the difference between said two inputs and for producing said absolute value as a digital output;
  weighting value supplying means for supplying a digital weighting value corresponding to the expected deviation from said expected value for said given parameter according to said given node model;
  memory means, receiving addressing inputs from both the output of said subtracting means and said weighting value supplying means, for storing, at each of a plurality of addresses formed by combining said addressing inputs, a parameter match score corresponding to a probability that said given parameter value corresponds to said expected value given said weighting value and for producing said score as a digital output, said parameter match score having a value which corresponds to the sum of two portions, a first portion which corresponds to the product of the output of said subtracting means and said digital weighting value and a second portion which corresponds to the logarithm of said weighting value; and
  accumulator means for accumulating said parameter match scores associated with a given frame for a given node.

86. A likelihood processor for use in a speech recognition system to compute a score corresponding to the probabilistic match between a vector of parameters associated with a frame of acoustic data and a node model having for each parameter in said vector both an expected value for said parameter and a weighting value corresponding to the expected deviation from said expected value, said processor comprising:
  parameter supplying means for supplying a digital value corresponding to a given parameter of a given frame of data;
  expected value supplying means for supplying a digital value corresponding to the expected value for said given parameter according to a given node model;
  subtracting means, receiving inputs from both said parameter supplying means and said expected value supplying means, for computing the absolute value of the difference between said two inputs and for producing said absolute value as a digital output;
  weighting value supplying means for supplying a digital weighting value corresponding to the expected deviation from said expected value for said given parameter according to said given node model;
  memory means, receiving addressing inputs from both the output of said subtracting means and said weighting value supplying means, for storing, at each of a plurality of addresses formed by combining said addressing inputs, a parameter match score having a value corresponding to a probability that said given parameter value corresponds to said expected value given said weighting value and for producing said match score as a digital output; and
  accumulator means for accumulating said parameter match scores associated with a given frame for a given node;
  said subtracting means including means for limiting the numerical value of its output to a limited range which is less than the range of the absolute values made possible by the range of values of its inputs, whereby the memory space required in said memory means to correspond to the address space formed by combining the output of said subtacting means and said weighting value is reduced.

87. A likelihood processor as described in claim 86, wherein said means for limiting the numerical value of the output of said subtracting means includes means for causing the numerical value of said output to be equal to a value at the high end of said limited range when the actual absolute value of the difference between the inputs of said subtracting means exceeds said limited range.

88. A speech recognition system for recognizing a sequence of separately spoken words, said system comprising:
  means for responding to a given utterance by producing a best guess word which is the word considered by the system most likely to correspond to said utterance; and
  means for responding to the utterance of another word as confirmation that said best guess word is the word corresponding to said given utterance.

89. A speech recognition system as described in claim 88, wherein said means for responding to the utterance of another word as confirmation includes means for detecting an utterance and means for responding to any detection of another utterance by said means as confirmation that said best guess word is the word corresponding to said given utterance spoken before said another utterance.

90. A speech recognition system as described in claim 88, further including means for displaying said best guess word so a user can see it before uttering another word.

91. A speech recognition system as described in claim 90:
wherein said means for responding to an utterance includes means for producing in response to said given utterance one or more close call words which are considered by the system next most likely to correspond to said given utterance after said best guess word;
further including means for displaying said one or more close call words; and
further including means for responding to an input signal associated with a given close call word as confirmation that said given close word is the word corresponding to said given utterance.

92. A speech recognition system as described in claim 91, wherein said means for displaying one or more close call words further includes means for indicating which input signal is associated with said given close call word.

93. A speech recognition system as described in claim 91, wherein said means for responding to an input signal includes means for responding to an actuation of a keyboard key as said input signal.

94. A speech recognition system as described in claim 93, further including means for responding to an input signal associated with the rejection of said best guess word and said one or more close call words as confirmation that neither said best guess word nor any of said close call words was the word corresponding to said given utterance.

95. A speech recognition system as described in claim 94, wherein said means for responding to an input signal associated with the rejection of said best guess word and said one or more close call words includes means for removing the display of said best guess word and said one or more close call words in response to said input signal associated with said rejection.

96. A speech recognition system as described in claim 94, wherein said means for responding to an input signal associated with the rejection of said best guess word and said one or more close call words includes means for responding to an actuation of a keyboard key as said input signal associated with rejection.

97. A speech recognition system as described in claim 91, wherein said means for responding to the utterance of another word as confirmation that said best guess word was the intended word includes means for terminating the displaying of said one or more close call words.

98. A speech recognition system as described in claim 88, further including a language model means for helping it predict the likelihood that a certain utterance corresponds to one or more certain words based at least in part on the previous word recognized by said system, wherein said means for responding to the utterance of another word as confirmation that said best guess word is the word corresponding to said given utterance includes means for indicating to said language model means that said best guess word is the previous word for use of said language model means in helping to predict the likelihood that said another utterance corresponds to one or more certain words.

99. A speech recognition system as described in claim 98:
wherein said means for responding to a given utterance includes means for producing in response to said given utterance one or more close call words which are considered by the system next most likely, after said best guess word, to correspond to said given utterance;
further including means for displaying said one or more close call words;
further including means for responding to an input signal associated with a given close call word as confirmation that said given close call word is the word corresponding to said given utterance; and
wherein said means for responding to an input signal associated with a given close call word includes means for indicating to said language model means that said given close call word is the previous word for use of said language model means in helping to predict the likelihood that said another utterance corresponds to one or more certain words.

100. A speech recognition method for recognizing a sequence of spoken words, said method comprising:
responding to a given utterance by producing a best guess word which is the word considered by the method most likely to correspond to said utterance; and
responding to the utterance of another word as confirmation that said best guess word is the word corresponding to said given utterance.

101. A speech recognition method as described in claim 100, wherein said responding to the utterance of another word as confirmation includes detecting an utterance and responding to any detection of another utterance by said means as confirmation that said best guess word is the word corresponding to said given utterance spoken before said another utterance.

102. A speech recognition method as described in claim 100, further including displaying said best guess word so a user can see it before uttering another word.

103. A speech recognition method as described in claim 102:
wherein said responding to an utterance includes producing in response to said given utterance one or more close call words which are considered by the method next most likely to correspond to said given utterance after said best guess word;
further including displaying said one or more close call words; and
further including responding to an input signal associated with a given close call word as confirmation that said given close word is the word corresponding to said given utterance.

104. A speech recognition method as described in claim 103, wherein said displaying one or more close call words further includes indicating which input signal is associated with said given close call word.

105. A speech recognition method as described in claim 103, wherein said responding to an input signal includes responding to an actuation of a keyboard key as said input signal.

106. A speech recognition method as described in claim 105, further including responding to an input signal associated with the rejection of said best guess word and said one or more close call words as confirmation that neither said best guess word nor any of said close call words was the word corresponding to said given utterance.

107. A speech recognition method as described in claim 106, wherein said responding to an input signal associated with the rejection of said best guess word and said one or more close call words includes removing the display of said best guess word and said one or more close call words in response to said input signal associated with said rejection.

108. A speech recognition method as described in claim 106, wherein said responding to an input signal associated with the rejection of said best guess word and said one or more close call words includes responding to an actuation of a keyboard key as said input signal associated with rejection.

109. A speech recognition method as described in claim 103, wherein said responding to the utterance of another word as confirmation that said best guess word was the intended word includes terminating the displaying of said one or more close call words.

110. A speech recognition method as described in claim 100, further including using a language model to help in the prediction of a likelihood that a certain utterance corresponds to one or more certain words based at least in part on the previous word recognized by said method, wherein said responding to the utterance of another word as confirmation that said best guess word is the word corresponding to said given utterance includes indicating that said best guess word is the previous word for said use of said language model in helping to predict the likelihood that said another utterance corresponds to one or more certain words.

111. A speech recognition method as described in claim 110:
wherein said responding to a given utterance includes producing in response to said given utterance one or more close call words which are considered by the method next most likely, after said best guess word, to correspond to said given utterance;
further including displaying said one or more close call words;
further including responding to an input signal associated with a given close call word as confirmation that said given close call word is the word corresponding to said given utterance; and
wherein said responding to an input signal associated with a given close call word includes indicating that said given close call word is the previous word for said use of said language model in helping to predict the likelihood that said another utterance corresponds to one or more certain words.

112. A speech recognition system for recognizing a sequence of speech sounds, said system comprising:
means for responding to said sequence of speech sounds by producing a best guess word, which is the word considered by the system most likely to correspond to said sequence, and one or more close call words, which are considered by the system next most likely to correspond to said given sequence after said best guess word; and
means for displaying said best guess word so a user can see it;
means for displaying said one or more close call words so a user can see it; and
means for responding to an input signal associated with a given close call word as confirmation that said given close call word is the word corresponding to said given sequence of speech sounds, rather than said best guess word.

113. A speech recognition system as described in claim 112, wherein said means for displaying said best guess word includes means for displaying said word in the context of words spoken before or after said sequence of speech sounds and said means for displaying said one or more close call words further includes means for displaying said one or more close call words in close proximity to said best guess word, so that said close call words are also displayed in the context of words spoken before or after a sequence of speech sounds.

114. A speech recognition system as described in claim 112, wherein said means for displaying one or more close call words further includes means for displaying an indication which input signal is associated with said given close call word.

115. A speech recognition system as described in claim 112, wherein said means for responding to an input signal includes means for responding to an actuation of a keyboard key as said input signal.

116. A speech recognition system as described in claim 112, further including means for responding to an input signal associated with the rejection of both said best guess word and said one or more close call words as confirmation that neither said best guess word nor any of said close call words was the word corresponding to said given sequence of speech sounds.

117. A speech recognition system as described in claim 116, wherein said means for responding to an input signal associated with the rejection of both said best guess word and said one or more close call words includes means for removing the display of said best guess word and said one or more close call words in response to said input signal associated with said rejection.

118. A speech recognition system as described in claim 117, wherein said means for responding to an input signal associated with the rejection of both said best guess word and said one or more close call words includes means for responding to an actuation of a keyboard key as said input signal associated with rejection.

119. A speech recognition system as described in claim 112:
further including means for using a language model to help in the prediction of a likelihood that a certain utterance corresponds to one or more certain words based at least in part on the previous word recognized by said system; and
wherein said means for responding to an input signal associated with a given close call word includes means for indicating that said given close call word is the previous word for said use of said language model in helping to predict the likelihood that said another utterance corresponds to one or more certain words.

120. A speech recognition method for recognizing a sequence of speech sounds, said method comprising:
responding to said sequence of speech sounds by producing a best guess word, which is the word considered by the method most likely to correspond to said sequence, and one or more close call words, which are considered by the method next most likely to correspond to said given sequence after said best guess word; and
displaying said best guess word so a user can see it;
displaying said one or more close call words so a user can see it; and
responding to an input signal associated with a given close call word as confirmation that said given close call word is the word corresponding to said given sequence of speech sounds, rather than said best guess word.

121. A speech recognition method as described in claim 120, wherein said displaying of said best guess word includes displaying said word in the context of words spoken before or after said sequence of speech sounds and said displaying of said one or more close call words further includes displaying said one or more close call words in close proximity to said best guess word, so that said close call words are also displayed in the context of words spoken before or after a sequence of speech sounds.

122. A speech recognition method as described in claim 120, wherein said displaying of one or more close call words further includes displaying an indication which input signal is associated with said given close call word.

123. A speech recognition method as described in claim 120, wherein said responding to an input signal includes responding to an actuation of a keyboard key as said input signal.

124. A speech recognition method as described in claim 120, further including responding to an input signal associated with the rejection of both said best guess word and said one or more close call words as confirmation that neither said best guess word nor any of said close call words was the word corresponding to said given sequence of speech sounds.

125. A speech recognition method as described in claim 124, wherein said responding to an input signal associated with the rejection of both said best guess word and said one or more close call words includes removing the display of said best guess word and said one or more close call words in response to said input signal associated with said rejection.

126. A speech recognition method as described in claim 125, wherein said responding to an input signal associated with the rejection of both said best guess word and said one or more close call words includes responding to an actuation of a keyboard key as said input signal associated with rejection.

127. A speech recognition method as described in claim 120:
further including using a language model to help in the prediction of a likelihood that a certain utterance corresponds to one or more certain words based at least in part on the previous word recognized by said method; and
wherein said responding to an input signal associated with a given close call word includes indicating that said given close call word is the previous word for said use of said language model in helping to predict the likelihood that said another utterance corresponds to one or more certain words.

* * * * *